United States Patent [19]
Ouchi et al.

[11] Patent Number: 5,991,371
[45] Date of Patent: *Nov. 23, 1999

[54] COMMUNICATION APPARATUS

[75] Inventors: Tetsuya Ouchi, Tajimi; Makoto Yamada, Gifu; Fumihiro Minamizawa, Toyoake; Tetsuya Aoki, Nagoya, all of Japan

[73] Assignee: Brother Kogyo Kabushiki Kaisha, Nagoya, Japan

[*] Notice: This patent is subject to a terminal disclaimer.

[21] Appl. No.: 08/982,317

[22] Filed: Dec. 1, 1997

Related U.S. Application Data

[63] Continuation of application No. 08/353,295, Dec. 5, 1994, abandoned.

[30] Foreign Application Priority Data

| Dec. 7, 1993 | [JP] | Japan | 5-306482 |
| Dec. 7, 1993 | [JP] | Japan | 5-306483 |
| Dec. 7, 1993 | [JP] | Japan | 5-306484 |
| Dec. 7, 1993 | [JP] | Japan | 5-306905 |
| Dec. 7, 1993 | [JP] | Japan | 5-306906 |
| Dec. 7, 1993 | [JP] | Japan | 5-306907 |
| Jun. 8, 1994 | [JP] | Japan | 6-126028 |

[51] Int. Cl.$^6$ .................................................. H04M 11/00
[52] U.S. Cl. ............................. 379/90.01; 379/100.15
[58] Field of Search .......................... 379/67.1, 70, 82, 379/88.08, 88.11, 88.13, 88.14, 88.19, 90.01, 93.05, 93.08, 93.33, 100.01, 100.15, 100.16, 100.17, 156, 167, 173, 177, 179, 181, 182, 183, 201, 233, 245, 246, 251, 252, 258, 268, 350, 352, 354, 373, 374, 375, 376, 387

[56] References Cited

U.S. PATENT DOCUMENTS

| 3,946,146 | 3/1976 | Brown et al. . |
| 4,646,347 | 2/1987 | Liu . |
| 4,802,202 | 1/1989 | Takahashi et al. . |
| 4,995,075 | 2/1991 | Angiolillo-bent et al. . |
| 4,998,273 | 3/1991 | Nichols . |
| 5,029,202 | 7/1991 | Doernbach, Jr. . |
| 5,040,209 | 8/1991 | Greenberg et al. . |
| 5,073,922 | 12/1991 | Okada . |
| 5,119,418 | 6/1992 | Dupillier . |
| 5,142,569 | 8/1992 | Peters et al. . |
| 5,200,992 | 4/1993 | Yoshino . |
| 5,200,994 | 4/1993 | Sasano et al. . |
| 5,253,289 | 10/1993 | Tanaka . |
| 5,267,307 | 11/1993 | Izumi et al. . |
| 5,307,059 | 4/1994 | Connary et al. . |
| 5,317,629 | 5/1994 | Watanabe . |
| 5,333,190 | 7/1994 | Eyster . |

(List continued on next page.)

FOREIGN PATENT DOCUMENTS 4-48855  2/1992  Japan .

*Primary Examiner*—Scott Weaver
*Attorney, Agent, or Firm*—Oliff & Berridge, PLC

[57] ABSTRACT

A communication apparatus including (A) a data obtaining device which obtains a plurality of sets of own-call-number data each set of which identifies a corresponding one of a plurality of different own call numbers allotted to the communication apparatus according to a common numbering rule, each of the different own call numbers identifying the communication apparatus from other communication apparatuses to which other call numbers different from the own call numbers are allotted according to the common numbering rule; and (B) one or both of (b1) an information receiver which can receive information from the other communication apparatuses and (b2) an information transmitter which can transmit information to the other communication apparatuses, the information receiver and/or the information transmitter being operable in a plurality of different manners corresponding to the different own call numbers, respectively, such that the information receiver and/or transmitter operate in one of the different manners which corresponds to one of the different own call numbers identified by each set of own-call-number data obtained by the data obtaining device.

22 Claims, 51 Drawing Sheets

606

| REGISTERED CODE-NUMBER TABLE MEMORY | | |
|---|---|---|
| CODE NUMBER 1 (TELEPHONE) | EXTERNAL-LINE CALL-SIGNAL PATTERN 1 | MEMORY POINTER 1 |
| | EXTENSION-LINE CALL-SIGNAL PATTERN 1 | MEMORY POINTER 2 |
| CODE NUMBER 2 (TELEPHONE) | EXTERNAL-LINE CALL-SIGNAL PATTERN 2 | MEMORY POINTER 3 |
| | EXTENSION-LINE CALL-SIGNAL PATTERN 2 | MEMORY POINTER 4 |
| CODE NUMBER 3 (FACSIMILE) | EXTERNAL-LINE CALL-SIGNAL PATTERN 3 | MEMORY POINTER 5 |
| | EXTENSION-LINE CALL-SIGNAL PATTERN 3 | MEMORY POINTER 6 |
| CODE NUMBER 4 (FACSIMILE) | EXTERNAL-LINE CALL-SIGNAL PATTERN 4 | MEMORY POINTER 7 |
| | EXTENSION-LINE CALL-SIGNAL PATTERN 4 | MEMORY POINTER 8 |

U.S. PATENT DOCUMENTS

| | | |
|---|---|---|
| 5,425,089 | 6/1995 | Chan et al. . |
| 5,442,692 | 8/1995 | Yamazaki et al. . |
| 5,446,784 | 8/1995 | MacTaggart . |
| 5,481,599 | 1/1996 | MacAllister et al. . |
| 5,537,657 | 7/1996 | King, III . |
| 5,544,235 | 8/1996 | Ardon . |
| 5,563,932 | 10/1996 | Tachibana et al. . |

FIG. 5

| RAM | |
|---|---|
| IDENTIFIED CODE-NUMBER MEMORY | 140 |
| SELECTED-MODE MEMORY | 142 |
| CODE NUMBER-RELATED MEMORY | 144 |
| TRANSMISSION MEMORY | 148 |
| RECEPTION MEMORY | 150 |
| INPUT CODE-NUMBER MEMORY | 152 |
| RECORDING MEMORY | 154 |
| READING MEMORY | 156 |
| FIRST SIGNAL-PATTERN MEMORY | 158 |
| SECOND SIGNAL-PATTERN MEMORY | 160 |
| PRIOR SIGNAL-STATE MEMORY | 162 |
| CURRENT SIGNAL-STATE MEMORY | 164 |
| FIRST COUNTER | 166 |
| SECOND COUNTER | 168 |
| THIRD COUNTER | 170 |
| FIRST FLAG | F1 |
| SECOND FLAG | F2 |
| THIRD FLAG | F3 |

| ROM | |
|---|---|
| MAIN CONTROL ROUTINE MEMORY | 192 |
| MODE SELECTION ROUTINE MEMORY | 194 |
| CALL-SIGNAL REGISTRATION ROUTINE MEMORY | 196 |
| INFORMATION RECEPTION ROUTINE MEMORY | 198 |
| PAGING ROUTINE MEMORY | 200 |
| PAGING CALL-NUMBER STORING ROUTINE MEMORY | 202 |
| FACSIMILE TRANSMISSION ROUTINE MEMORY | 204 |
| ANSWERING MESSAGE STORING ROUTINE MEMORY | 206 |
| RECEIVED MESSAGE OUTPUT ROUTINE MEMORY | 208 |
| INFORMATION-STORED-IN-EMERGENCY OUTPUT ROUTINE MEMORY | 210 |
| OPERATION REPORT OUTPUT ROUTINE MEMORY | 212 |
| CODE-NUMBER REGISTRATION ROUTINE MEMORY | 214 |
| FACSIMILE OPERATION ROUTINE MEMORY | 216 |
| ANSWERING TELEPHONE ROUTINE MEMORY | 218 |
| RECEIVED MESSAGE TRANSMISSION ROUTINE MEMORY | 219 |
| POLLING TRANSMISSION ROUTINE MEMORY | 220 |
| RETRIEVAL TRANSMISSION ROUTINE MEMORY | 222 |
| FACSIMILE RECEPTION ROUTINE MEMORY | 224 |
| TRANSMITTER-IDENTIFYING-INFORMATION STORING ROUTINE MEMORY | 226 |
| TRANSMITTAL-LETTER STORING ROUTINE MEMORY | 228 |
| ⋮ | |

←——124

| REGISTERED-CODE-NUMBER TABLE MEMORY | | |
|---|---|---|
| CODE NUMBER 1 | SIGNAL PATTERN 1 | MEMORY POINTER 1 |
| CODE NUMBER 2 | SIGNAL PATTERN 2 | MEMORY POINTER 2 |
| CODE NUMBER 3 | SIGNAL PATTERN 3 | MEMORY POINTER 3 |
| CODE NUMBER 4 | SIGNAL PATTERN 4 | MEMORY POINTER 4 |
| CODE NUMBER 5 | SIGNAL PATTERN 5 | MEMORY POINTER 5 |
| CODE NUMBER 6 | SIGNAL PATTERN 6 | MEMORY POINTER 6 |
| ⋮ | ⋮ | ⋮ |

FIG.41

| RAM | 554 |
|---|---|
| FIRST SIGNAL-PATTERN MEMORY | 580 |
| SECOND SIGNAL-PATTERN MEMORY | 582 |
| PRIOR SIGNAL-STATE MEMORY | 584 |
| CURRENT SIGNAL-STATE MEMORY | 586 |
| SELECTED-MODE MEMORY | 588 |
| CALL-SIGNAL CHECK MEMORY | 589 |
| FIRST COUNTER | 590 |
| SECOND COUNTER | 592 |
| THIRD COUNTER | 594 |
| FIRST FLAG | G1 |
| SECOND FLAG | G2 |
| THIRD FLAG | G3 |
| FOURTH FLAG | G4 |
| FIFTH FLAG | G5 |
| SIXTH FLAG | G6 |
| SEVENTH FLAG | G7 |
| EIGHTH FLAG | G8 |
| NINTH FLAG | G9 |
| ⋮ | |

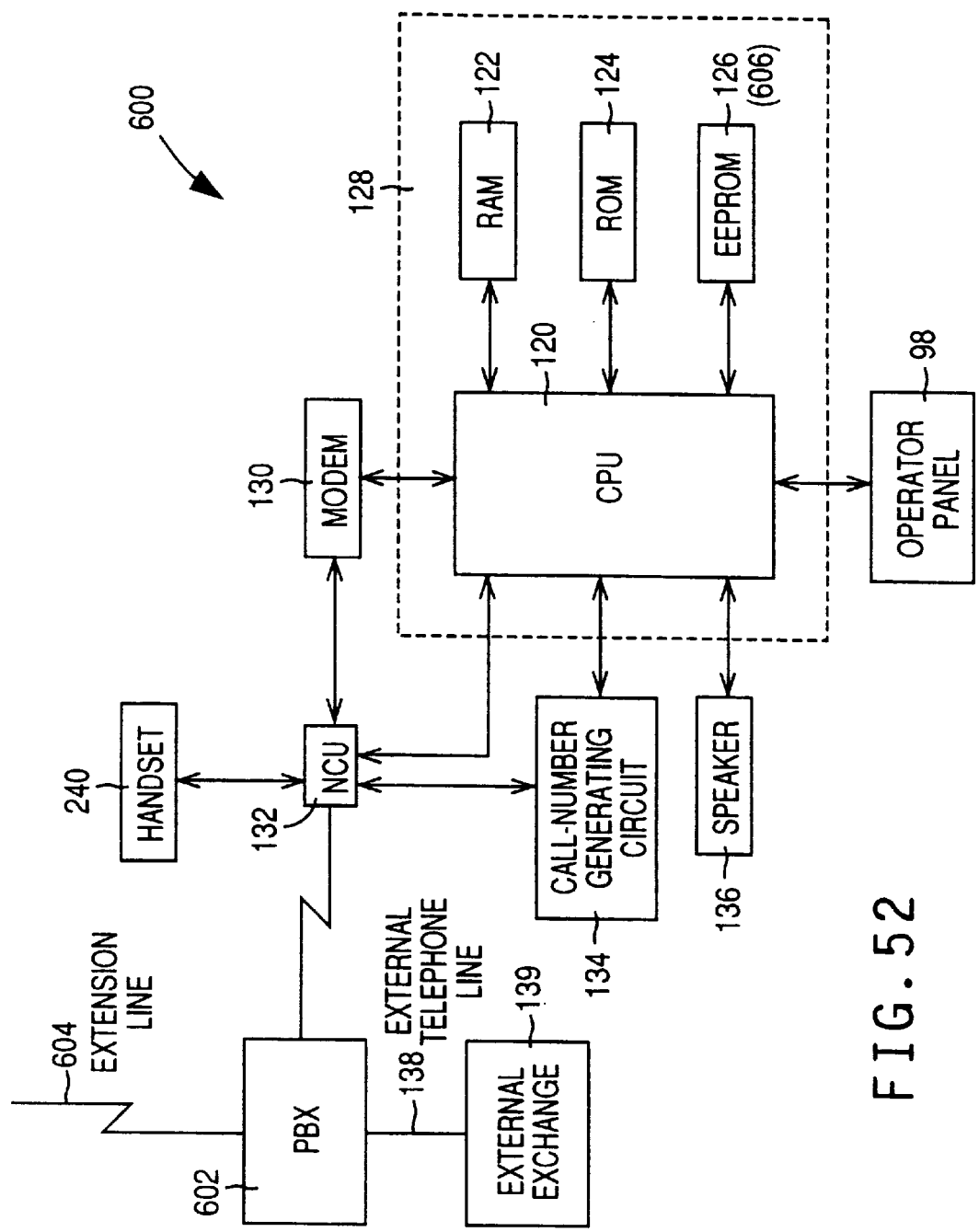

| REGISTERED CODE-NUMBER TABLE MEMORY | | |
|---|---|---|
| CODE NUMBER 1 (TELEPHONE) | EXTERNAL-LINE CALL-SIGNAL PATTERN 1 | MEMORY POINTER 1 |
| | EXTENSION-LINE CALL-SIGNAL PATTERN 1 | MEMORY POINTER 2 |
| CODE NUMBER 2 (TELEPHONE) | EXTERNAL-LINE CALL-SIGNAL PATTERN 2 | MEMORY POINTER 3 |
| | EXTENSION-LINE CALL-SIGNAL PATTERN 2 | MEMORY POINTER 4 |
| CODE NUMBER 3 (FACSIMILE) | EXTERNAL-LINE CALL-SIGNAL PATTERN 3 | MEMORY POINTER 5 |
| | EXTENSION-LINE CALL-SIGNAL PATTERN 3 | MEMORY POINTER 6 |
| CODE NUMBER 4 (FACSIMILE) | EXTERNAL-LINE CALL-SIGNAL PATTERN 4 | MEMORY POINTER 7 |
| | EXTENSION-LINE CALL-SIGNAL PATTERN 4 | MEMORY POINTER 8 |

COMMUNICATION APPARATUS

This is a Continuation of application Ser. No. 08/353,295 filed Dec. 5, 1994 now abandoned. The entire disclosure of the prior application(s) is hereby incorporated by reference herein in its entirety.

BACKGROUND OF THE INVENTION

1. Field of the Invention

The present invention relates to a communication apparatus which responds to a plurality of different call signals supplied thereto via a single communication line or channel.

2. Related Art Statement

A call signal is used when one of a plurality of communication apparatuses calls another of the communication apparatuses. For example, in the case where a first telephone set requests an exchange of a telephone company to call a second telephone set, the exchange supplies a call signal to the second telephone set to place the second telephone set in an operational state thereof in which a user of the second telephone set can talk with a user of the first telephone set. More specifically, the second telephone set produces a calling sound in response to the call signal supplied thereto, so that when the user of the second telephone set picks up a handset, he or she can talk with the user of the first telephone set.

In the case where a single communication apparatus is used with a single communication line, for example, a single telephone set is used with a single telephone line, the exchange of the telephone company supplies a single sort of call signal. However, in the case where a plurality of communication apparatuses are used with a single communication line, for example, a telephone set and a facsimile machine are used with a single telephone line, the exchange of the telephone company is required to supply different sorts of call signals to the telephone set and the facsimile machine, respectively, via the single telephone line.

Different sorts of call signals are also needed in the case where wire communication is carried out between or among two or more communication apparatuses which are connected with each other such that they are always communicatable with each other, or in the case where wireless communication is carried out between or among two or more wireless communication apparatuses.

There is known a telephone company which offers the service of allotting a plurality of different call numbers to a single communication line according to a common numbering rule employed by the company.

Subscribers of the telephone company can enjoy this service by using a facsimile machine or a telephone set in relation with each of the different own call numbers. In this case, a greater number of facsimile machines or telephone sets may be used with a smaller number of communication lines. Otherwise, the subscribers can enjoy the service by using a telephone and facsimile (T/F) apparatus which possesses both the telephone and facsimile functions and has means for automatically switching the T/F apparatus between those two functions. In the latter case, one of the different own call numbers may exclusively be used in relation with the facsimile function and another of the own call numbers, or the other own call number, may exclusively be used in relation with the telephone function. An example of the T/F apparatus is disclosed in Japanese Patent Application laid open under Publication No. 4-48855.

The identification of each one of the different call numbers allotted to the single communication line, from the other call numbers, is carried out by supplying, to the communication line, different call signals corresponding to the different call numbers, respectively. For example, a basic call signal and a modified call signal obtained by adding a different signal to the basic call signal may be employed to this end. Otherwise, different call signals having different signal patterns may be used.

There is known the "distinctive ringing" service or "dial-in" service wherein different call numbers are identified by different call signals having different signal patterns, respectively. In the distinctive ringing service, the signal pattern of each call signal supplied via a single communication line to a facsimile machine is directly utilized by the called facsimile machine to ring, i.e., produce a calling sound. That is, the ringing device of the called facsimile machine produces a calling sound having a sound pattern corresponding to the signal pattern of the call signal supplied thereto. Thus, different calling sounds having different sound patterns are produced by a single facsimile machine in response to different call signals, respectively. The user of the facsimile machine can identify which call number is being used to call the facsimile machine, by hearing the sound pattern of the calling sound being produced by the ringing device. Owing to the distinctive ringing service, the user can easily judge whether his or her necessary information is being received by the facsimile machine.

Even though different call signals are supplied to call a single facsimile machine in relation with different call numbers allotted thereto and different calling sounds having different sound patterns are produced by the facsimile machine according to the different signal patterns of the call signals, each of various proper functions of the facsimile machine responds in the only and same manner, irrespective of whichever call number is being used to call the facsimile machine. For example, the facsimile machine transmits the only and same transmitter-identifying information to a calling facsimile machine, whichever call number may be used by the calling facsimile machine. In those events, therefore, the facsimile machine functions as if the machine had the only and same call number in spite of actually having two or more own call numbers allotted thereto by the telephone company. Thus, the user cannot effectively utilize the different own call numbers given to the facsimile machine.

U.S. Pat. No. 5,200,992 discloses a facsimile machine which has an outside-line call number allotted thereto according to a first or "public" numbering rule employed by a telephone company, and an extension-line call number allotted thereto according to a second or "private" numbering rule employed by the user of that facsimile machine and other facsimile machines to which the first facsimile machine in question is connected via the extension lines. When the facsimile machine is called using the outside-line call number by an outside facsimile machine, the called machine sends back or transmits the outside-line call number to the calling machine so as to inform that the called machine is receiving image information from the calling machine. Similarly, when the facsimile machine is called using the extension-line call number by another facsimile machine of the user, the called machine transmits the extension-line call number to the calling machine for the same purpose.

However, the above-identified facsimile machine cannot function as if the machine had two or more outside-line call numbers, or two or more extension-line call numbers. When the prior machine is called through the outside lines, the only and same outside-line call number can be used to call the machine. Similarly, when the prior machine is called through the extension lines, the only and same extension-line call number can be used to call the machine.

SUMMARY OF THE INVENTION

It is therefore an object of the present invention to provide a communication apparatus or system which effectively utilizes a plurality of call numbers allotted thereto according to a common numbering rule.

The above object has been achieved by the present invention. According to a first aspect of the present invention, there is provided a communication apparatus comprising a data obtaining device which obtains a plurality of sets of own-call-number data each set of which identifies a corresponding one of a plurality of different own call numbers allotted to the communication apparatus according to a common numbering rule, each of the different own call numbers identifying the communication apparatus from other communication apparatuses to which other call numbers different from the own call numbers are allotted according to the common numbering rule; and at least one of (a) an information receiver which can receive information from the other communication apparatuses and (b) an information transmitter which can transmit information to the other communication apparatuses, the at least one of the information receiver and the information transmitter being operable in a plurality of different manners corresponding to the different own call numbers, respectively, such that the at least one of the information receiver and transmitter operates in one of the different manners which corresponds to the one of the different own call numbers identified by the each set of own-call-number data obtained by the data obtaining device.

In the communication apparatus constructed as described above, at least one of the information receiver and transmitter operates in one of the different manners which corresponds to one of the different own call numbers identified by each set of own-call-number data obtained by the data obtaining device. Thus, a user of the present communication apparatus can use the single communication apparatus as if a plurality of communication apparatuses were used, thus enjoying a lower purchasing and running cost than in the case where a plurality of communication apparatuses are actually purchased and used. The data obtaining device obtains at least two sets of own-call-number data for two or more own call numbers of the communication apparatus. The data obtaining device may not obtain all the sets of own-call-number data for all the own call numbers of the communication apparatus. In the case where the present communication apparatus is called using an own call number the own-call-number data for which cannot be identified by the present communication apparatus, the information receiver and/or transmitter may either not operate in any manner, or operate in one of the different manners. In the second case where the information receiver and/or transmitter operates in one of the different manners, one or more own call numbers the set or sets of own-call-number data for which cannot be identified by the data obtaining device may be handled as if those call numbers were a single registered call number, so that the receiver or transmitter operates in the only and same manner corresponding to the single registered call number.

According to a preferred feature of the first aspect of the invention, the data obtaining device comprises a data input device which is operable by a user for inputting at least one of the sets of own-call-number data. The data input device may comprise a keyboard including numeral keys. A set of own-call-number data may comprise one or more digit numbers (referred to as the "code number") input through operation of an appropriate one or ones of the numeral keys. The communication apparatus may further comprise a data memory which stores or registers the code number input by the user. The data memory may comprise an EEPROM. The data input device may include selecting means for selecting one of the different own call numbers which is identified by an arbitrary number input through the keyboard, based on the code number stored in the memory, so that the receiver or transmitter operates in one of the different manners which corresponds to the selected one own call number.

According to another feature of the first aspect of the invention, the data obtaining device comprises a signal detector which detects, as at least one of the sets of own-call-number data, at least one of a plurality of different own call signals which are transmitted or supplied to the communication apparatus. The different own call signals identify the different own call numbers, respectively. The signal detector may detect the at least one of different own call signals transmitted or supplied to the communication apparatus via a single communication line. The communication line may be a wired line such as a telephone line, or a wireless line. The signal detector may comprise an NCU (network control unit). The communication apparatus may further comprise a signal memory which stores the at least one of different own call signals detected by the signal detector. The data obtaining device may further comprise selecting means for selecting one of the different own call numbers which is identified by a call signal detected by the signal detector, based on the at least one of different own call signals stored in the signal memory, so that the receiver or transmitter operates in one of the different manners which corresponds to the selected one own call number. Signal-pattern data, or other sorts of data, each representing an own call signal may be stored in the signal memory. The signal-pattern data may comprise the number of ON and OFF periods of the call signal and/or the time or times of ON or OFF period or periods of the same. In the last case, a call signal having an ON or OFF period whose time is different from that of a call signal stored in the signal memory, can be identified as being not identical with the call signal stored or registered, even if the respective profiles or shapes of the two call signals are similar to each other. Thus, the identification of a call signal supplied to the present communication apparatus is carried out with high accuracy. A call signal, name or identification of a call signal, or a set of signal-pattern data may be stored in the signal memory, when the present apparatus is purchased or when being produced in a factory. Other methods and/or occasions in which a call signal is stored may be employed.

According to yet another feature of the first aspect of the invention, the communication apparatus further comprises a plurality of memories which are related with the plurality of own call numbers, respectively and in which a plurality of batches of sound or image information are stored, respectively. The communication apparatus may, or may not, include a memory related with one or more own call numbers (e.g., non-registered own call number or numbers) whose own-call-number data cannot be obtained by the data obtaining device. However, since an important call may be made using a non-registered own call number, it is preferred that the communication apparatus include a memory related with the non-registered call number or numbers.

According to yet another feature of the first aspect of the invention, the at least one of the information receiver and transmitter comprises a telephone set, the different own call numbers comprising a plurality of different own telephone numbers allotted to the telephone set according to the common numbering rule. The telephone set may comprise a telephone function of a telephone and facsimile (T/F) apparatus. The telephone set may be operated in at least one of various manual or automatic telephone operations such as an answering telephone operation, a received-message transferring operation, and a memo-message transmitting operation.

According to a further feature of the first aspect of the invention, the at least one of the information receiver and transmitter comprises a facsimile machine, the different own call numbers comprising a plurality of different own facsimile numbers allotted to the facsimile machine according to the common numbering rule. The facsimile machine may comprise a facsimile function of a T/F apparatus. The facsimile machine may be operated in at least one of various manual or automatic facsimile operations such as a paging operation, a received-information transferring operation, an information-stored-in-emergency output operation, an operation report output operation, etc.

According to a second aspect of the present invention, there is provided a communication system comprising the communication apparatus according to the first aspect of the invention, and a first exchanger which is connected, via a single communication line, to the communication apparatus, the first exchanger connecting the communication apparatus with a first group of other communication apparatuses to which different call numbers are allotted according to a first numbering rule.

In the communication system constructed as described above, the first exchanger connects the communication apparatus with a first group of other communication apparatuses to which different call numbers are allotted according to a first numbering rule. The present communication system enables the communication apparatus in accordance with the first aspect of the invention, to function as if a plurality of communication apparatuses were used with respect to the first group of other communication apparatuses.

According to a preferred feature of the second aspect of the invention, the first exchanger connects the communication apparatus with the first group of communication apparatuses comprising the other communication apparatuses to which the other call numbers different from the different own call numbers of the communication apparatus are allotted according to the common numbering rule as the first number rule.

According to another feature of the second aspect of the invention, the communication system further comprises a second exchanger which is provided in the single communication line, the second exchanger connecting the communication apparatus with a second group of other communication apparatuses to which different call numbers are allotted according to a second numbering rule different from the first numbering rule. The first group of other communication apparatuses may be external- or outside-line communication apparatuses, and the second group of other communication apparatuses may be internal- or extension-line communication apparatuses. The first exchanger may be an exchange of a telephone company, and the second exchanger may be a private branch exchange of the user who possesses the communication apparatus in accordance with the first aspect of the invention and the extension-line communication apparatuses. The communication apparatus may comprise a telephone set as the at least one of the information receiver and transmitter, the different own call numbers allotted to the communication apparatus according to the common numbering rule comprising a plurality of different own telephone numbers allotted to the telephone set according to at least one of the first and second numbering rules. The communication apparatus may comprise a facsimile machine as the at least one of the information receiver and transmitter, the different own call numbers allotted to the communication apparatus according to the common numbering rule comprising a plurality of different own facsimile numbers allotted to the facsimile machine according to at least one of the first and second numbering rules. The communication apparatus may comprise a telephone set and a facsimile machine as the at least one of the information receiver and transmitter, the different own call numbers allotted to the communication apparatus according to the common numbering rule comprising at least one own telephone number allotted to the telephone set according to at least one of the first and second numbering rules and at least one own facsimile number allotted to the facsimile machine according to the at least one of the first and second numbering rules and different from the at least one own telephone number allotted to the telephone set.

According to yet another feature of the second aspect of the invention, the telephone set operates in a first one of the different manners which corresponds to each of (a) a first one of the different own telephone numbers allotted to the telephone set according to the first numbering rule and (b) a first one of the different own telephone numbers allotted to the telephone set according to the second numbering rule, and operates in a second one of the different manners which corresponds to each of (a) a second one of the different own telephone numbers allotted to the telephone set according to the first numbering rule and (b) a second one of the different own telephone numbers allotted to the telephone set according to the second numbering rule. Alternatively, it is possible to modify the communication system such that the telephone set operate in a first one of the different manners which corresponds to a first one of the different own telephone numbers allotted to the telephone set according to the first numbering rule, and operate in a second one of the different manners which corresponds to a first one of the different own telephone numbers allotted to the telephone set according to the second numbering rule and such that the telephone set operate in a third one of the different manners which corresponds to a second one of the different own telephone numbers allotted to the telephone set according to the first numbering rule, and operate in a fourth one of the different manners which corresponds to a second one of the different own telephone numbers allotted to the telephone set according to the second numbering rule. Similar features may be achieved on the facsimile machine as the transmitter and receiver of the communication apparatus.

According to a third aspect of the present invention, there is provided a communication method comprising the steps of allotting a plurality of different own call numbers to a communication apparatus according to a common numbering rule, each of the different own call numbers identifying the communication apparatus from other communication apparatuses to which other call numbers different from the own call numbers are allotted according to the common numbering rule, the communication apparatus comprising at least one of (a) an information receiver which can receive information from the other communication apparatuses and (b) an information transmitter which can transmit information to the other communication apparatuses; obtaining a plurality of sets of own-call-number data each set of which identifies a corresponding one of the different own call numbers; and operating the at least one of the information receiver and the information transmitter in a plurality of different manners corresponding to the different own call numbers, respectively, such that the at least one of the information receiver and transmitter operates in one of the different manners which corresponds to the one of the different own call numbers identified by the each set of own-call-number data.

The communication method arranged as described above enjoys the same advantages as the above-described advantages of the communication apparatus or system in accordance with the first or second aspect of the invention.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings in which:

FIG. 5 is a diagrammatic view of a random access memory (RAM) of the T/F apparatus of FIG. 1;

FIG. 7 is a diagrammatic view of a read only memory (ROM) of the T/F apparatus of FIG. 1;

FIG. 41 is a diagrammatic view corresponding to FIG. 5, showing a random access memory (RAM) of the T/F apparatus of FIG. 39;

FIG. 52 is a diagrammatic view corresponding to FIG. 4, showing the construction of a T/F apparatus as a fourth embodiment of the present invention;

FIG. 53 is a diagrammatic view corresponding to FIG. 9, showing a registered-code-number table memory of an EEPROM of the T/F apparatus of FIG. 52.

DETAILED DESCRIPTION OF THE PREFERRED EMBODIMENTS

Figure 1:
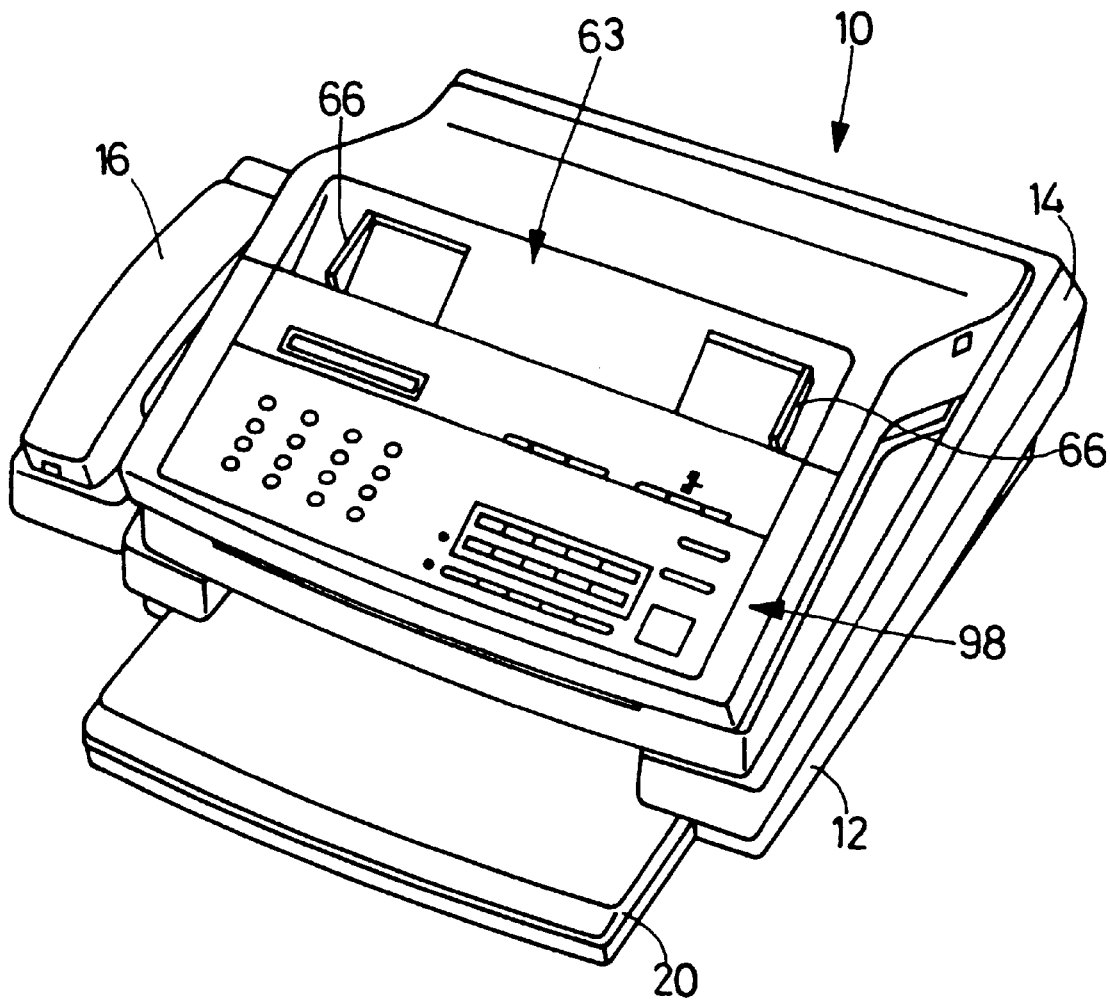
FIG. 1 is a perspective view of an answering telephone and facsimile (T/F) apparatus as a first embodiment of the present invention.

Referring first to FIG. 1, there is shown an answering telephone and facsimile (T/F) apparatus 10 to which the present invention is applied. The present T/F apparatus 10 has two or more own telephone numbers for the telephone set or function thereof, and two or more own facsimile numbers for the facsimile machine or function thereof. Those telephone and facsimile numbers are different from one another, and are allotted to the T/F apparatus 10 according to a common numbering rule employed by a telephone company. This is the "distinctive ringing" service offered by the telephone company. A user of the T/F apparatus 10 is a subscriber of the telephone company.

As shown in FIG. 1, the present T/F apparatus 10 includes a lower housing 12 and an upper housing 14 which cooperate with each other to provide an entire housing of the apparatus 10.

Figure 2:
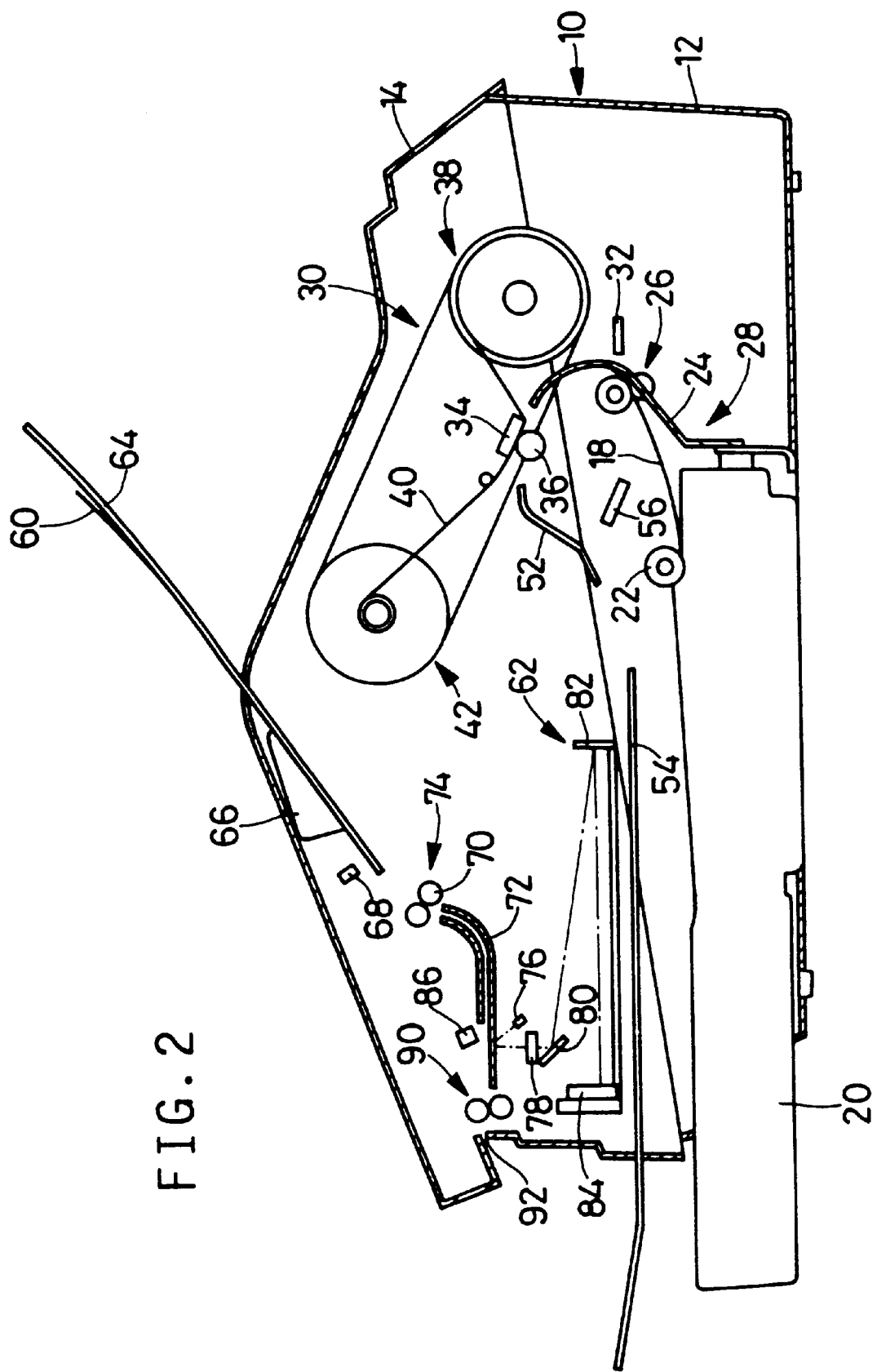
FIG. 2 is a cross-sectional view of the T/F apparatus of FIG. 1.

The T/F apparatus 10 includes a handset 12 which rests on the lower housing 12. As shown in FIG. 2, the lower housing 12 is adapted to receive a sheet cassette 20 which is capable of storing a multiplicity of recording sheets 18 as information-recording media. The recording sheets 18 are taken one by one out of the sheet cassette 20 by a sheet-supplying roller 22, and subsequently each recording sheet 18 is fed to a recording device 30 by a sheet-feeding device 28 which includes a first sheet guide member 24 and a pair of sheet-feeding rollers 26, so that images such as characters, symbols, and/or figures are recorded on the recording sheet 18 by the recording device 30. Reference numeral 32 designates a first sheet-end sensor which detects the leading end of the recording sheet 18 taken from the sheet cassette 20. The time of detection of the leading end of the sheet 18 by the sensor 32 is utilized to determine the time of starting of the image recording on the sheet 18 by the recording device 30.

The recording device 30 is supported by the upper housing 14. The recording device 30 includes a thermal recording head 34, a rotatable platen 36 which is opposed to the recording head 34, and an ink-ribbon device 38. The recording head 34 has a number of heat-generating elements arranged in an array extending perpendicularly to the direction of feeding of the recording sheet 18. The platen 36 is rotatable about a center line thereof by being driven by a drive device (not shown), and the recording sheet 18 is fed forward by the rotation of the platen 36. The ink-ribbon device 38 includes a heat-sensitive ink ribbon 40 having a width corresponding to the effective recording range of the recording head 34, and a ribbon-feeding device 42 for feeding the ink ribbon 40.

While the ink ribbon 40 is fed in synchronism with the feeding of the recording sheet 18, the recording head 34 presses the ink ribbon 40 against the recording sheet 18 on the platen 36, and the heat-generating elements of the head 34 generate heat, when appropriate, so that images are recorded on the sheet 18 with the ink thermally fused on the ribbon 40. The image-recorded sheet 18 is fed to a sheet tray 54 by being guided by a second sheet guide member 52. Thus, the image-recorded sheet 18 is discharged from the T/F apparatus 10. Reference numeral 56 designates a second sheet-end sensor which detects the trailing end of the image-recorded sheet 18. In the case where two or more recording sheets 18 are used in series, the second sheet 18 following the first sheet 18 is taken out of the sheet cassette 20 after the second sensor 56 has detected the trailing end of the first sheet 18. Thus, the occurrence of jamming of the second sheet 18 is effectively prevented.

The present T/F apparatus 10 also includes a reading device 62 which reads, from an original sheet 60, original images to be transmitted to a calling or called facsimile machine as described later. The reading device 62 is supported by the upper housing 14. The original 60 is set on an original support member 64 which is detachable from an original inlet 63 of the upper housing 14. The original 60 set on the support member 64 is guided by, and between, a pair of first original guide members 66, 66 shown in FIG. 1. An original sensor 68 supported by the upper housing 14 identifies whether any original sheet 60 remains on the support member 64. A plurality of original sheets 60 are fed one by one to the reading device 62 by an original-feeding device 74 which includes a pair of original-feeding rollers 70 and a second original guide member 72.

The reading device 62 includes a light source 76 which emits light toward the original 60, a lens 78 which converges the light reflected from the original 60, a first and a second mirror 80, 82 each of which reflects the light converged by the lens 78, and a line-image sensor 84 which receives the light incident thereto from the second mirror 82. The line-image sensor 84 intermittently reads each line of image from the original 60 while the original 60 is fed by the original-feeding device 74. Reference numeral 86 designates a third sheet-end sensor which detects the leading end of the original 60. The time of detection of the leading end of the original 60 by the sensor 86 is utilized to control the line-image reading operation of the sensor 84. After the original images have been read from the original 60, the original 60 is fed to a pair of original-discharging rollers 90 and is discharged, out of the T/F apparatus 10, from an original outlet 92 of the upper housing 14.

Figure 3:
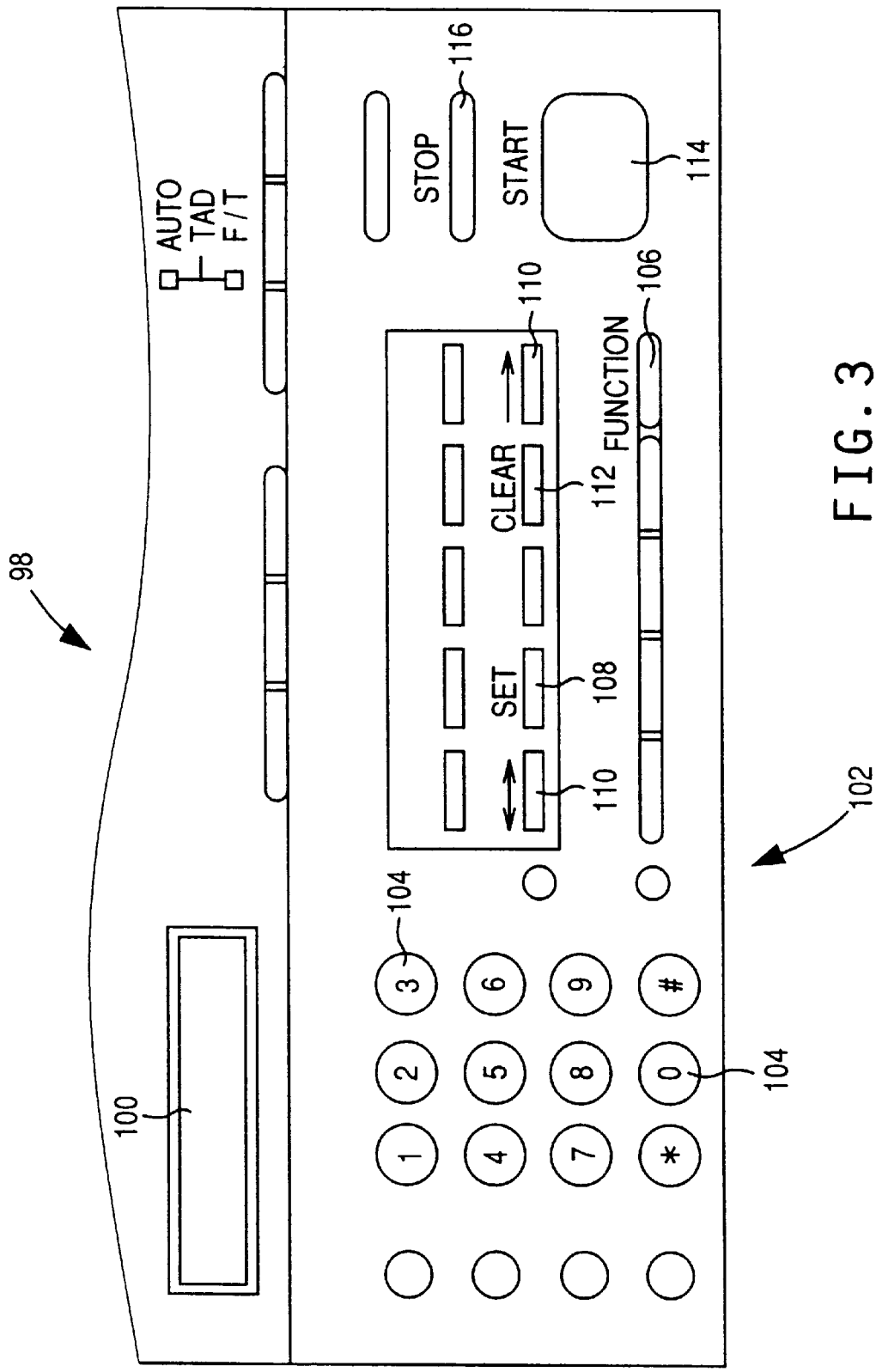
FIG. 3 is a view of an operator panel of the T/F apparatus of FIG. 1.

As shown in FIG. 1, an operator panel 98 is provided on the top of the upper housing 14. As shown in FIG. 3, the operator panel 98 includes a liquid crystal display (LCD) 100 and a keyboard 102. The keyboard 102 includes numeral keys (labelled "0" to "9", "X", and "#") 104, a function key ("FUNCTION") 106, a set key ("SET") 108, two cursor keys ("←" and "→") 110, 110, a clear key ("CLEAR") 112, a start key ("START") 114, and a stop key ("STOP") 116.

The FUNCTION key 106 is pushed by a user to start displaying, on the LCD 100, the respective names of various operation modes which are selectable on the present T/F apparatus 10. The cursor keys 110 are primarily used to move a cursor (not shown) rightward or leftward on the LCD 100, and each of the cursor keys 110 is additionally used to provisionally select the mode whose name is currently displayed on the LCD 100, in a manner described later. The SET key 108 is used to finally establish or fix the provisional selection of the mode by the cursor key 110. The CLEAR key 112 is used to cancel the provisional selection of the mode by the cursor key 110. The START key 114 is used to command the T/F apparatus 10 to register an own call signal corresponding to an own call number of the apparatus 10, in a manner described later. The STOP key 116 is used to command the apparatus 10 to quit registering an own call signal.

Figure 4:
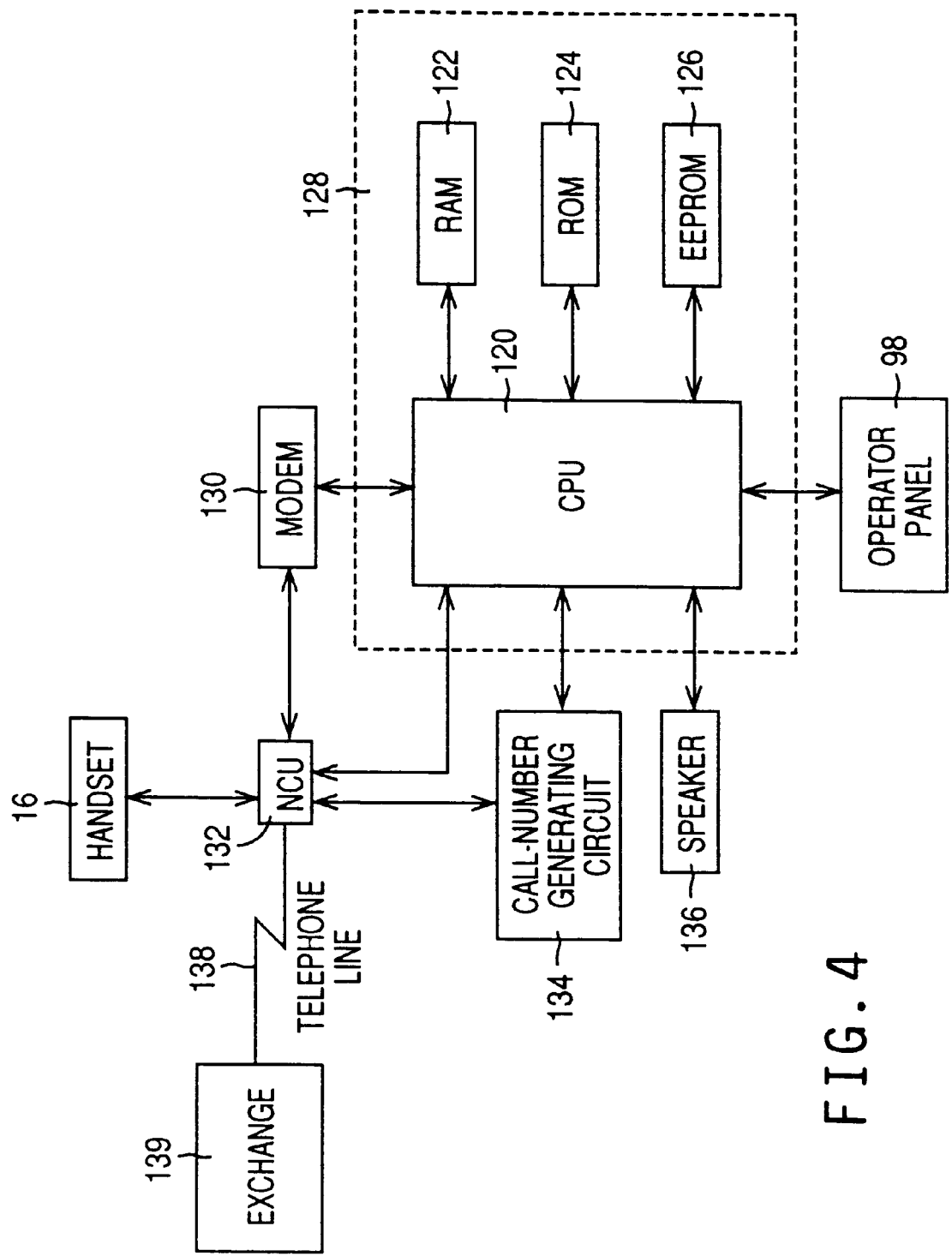
FIG. 4 is a diagrammatic view of the construction of the T/F apparatus of FIG. 1.

As shown in FIG. 4, the present T/F apparatus 10 has a computer 128 which includes a central processing unit (CPU) 120 and additionally includes a random access memory (RAM) 122, a read only memory (ROM) 124, and an electrically erasable and programmable read only memory (EEPROM) 126 each of which is connected to the CPU 120. Various operations of the T/F apparatus 10 are carried out by the computer 128. The CPU 120 of the computer 128 is connected to a modem 130, a network control unit (hereinafter, referred to as "NCU") 132, the operator panel 98, a call number-generating circuit 134, and a speaker 136. The NCU 132 is connected, via a single telephone line 138 as an external communication line, to an exchange 139 of the previously-mentioned telephone company. The T/F apparatus 10 is connected via the exchange 139 to other telephone sets and other facsimile machines to which other telephone numbers different from the own telephone numbers of the T/F apparatus 10 and other facsimile numbers different from the own facsimile numbers of the apparatus 10 are allotted according to the common numbering rule employed by the telephone company.

As shown in FIG. 5, the RAM 122 includes an identified code-number memory 140, a selected-mode memory 142, a code-number-related memory 144, a transmission memory 148, a reception memory 150, an input code-number memory 152, a recording memory 154, a reading memory 156, a first and a second signal-pattern memory 158, 160, a prior and a current signal-state memory 162, 164, a first, a second, and a third counter 166, 168, 170, and a first, a second, and a third flag F1, F2, F3.

The identified code-number memory 140 temporarily stores a code number corresponding to an own call signal, when the T/F apparatus 10 receives the own call signal from the exchange 139 via the telephone line 138. As described previously, four or more different own call numbers including two or more different own telephone numbers and two or more different own facsimile numbers are allotted to the present, single T/F apparatus 10 according to the common numbering rule employed by the telephone company. The exchange 139 of the telephone company supplies, to the T/F apparatus 10, four or more different own call signals corresponding to the four or more different own call numbers of the apparatus 10, respectively. The four or more own call signals have different signal patterns and are identifiable from each other. When the T/F apparatus 10 is called using one of the own call numbers of the apparatus 10 by a user of one of other communication apparatuses (e.g., other telephone sets, other facsimile machines, and other T/F apparatuses), the exchange 139 supplies a corresponding own call signal to the apparatus 10 to call the apparatus 10. Different call numbers different from the four or more different own call numbers of the T/F apparatus 10 are allotted to the above-indicated other communication apparatuses according to the common numbering rule employed by the telephone company. When the user registers, in the T/F apparatus 10, one or more of the four or more own call signals corresponding to the four or more own call numbers of the apparatus 10, he or she is required to register, in the apparatus 10, one or more code numbers corresponding to the one or more own call signals registered, respectively, in a call-signal registration mode described later.

The selected mode memory 142 stores mode data representing one or more operation modes which are currently selected on the T/F apparatus 10.

The code-number related memory 144 includes (a) a registered-code-number related memory 144*a* which stores various sorts of information in relation with each of one or more code numbers registered on the T/F apparatus 10, i.e., each of one or more own call signals registered on the apparatus 10, and (b) a non-registered-code-number related memory 144*b* which stores various sorts of information in relation with all numbers which have not been registered as code numbers on the apparatus 10, i.e., the other own call signals which have not been registered on the apparatus 10 but which will be able to be registered on the apparatus 10. The non-registered-code-number related memory 144*b* is originally provided in the T/F apparatus 10, and remains even after all the own call signals have been registered on the apparatus 10.

The transmission memory 148 temporarily stores information to be transmitted by the T/F apparatus 10, without any relation with a specific code number, i.e, a specific own call number.

The reception memory 150 temporarily stores information which has been received by the T/F apparatus 10, without any relation with a specific code number or own call number.

The input code-number memory 152 temporarily stores a code number when the user inputs the code number in the T/F apparatus 10.

The recording memory 154 temporarily stores, before recording by the recording device 30, image information which has been received and decoded by the T/F apparatus 10.

The reading memory 156 temporarily stores image data which have been read from the original 60 by the reading device 62.

The first and second signal-pattern memories 158, 160, prior and current signal-state memories 162, 164, first to third counters 166, 168, 170, and first to third flags F1, F2, F3 are used in the call-signal registration mode described later, and those memories will be detailed in the description of that mode.

Figure 6:
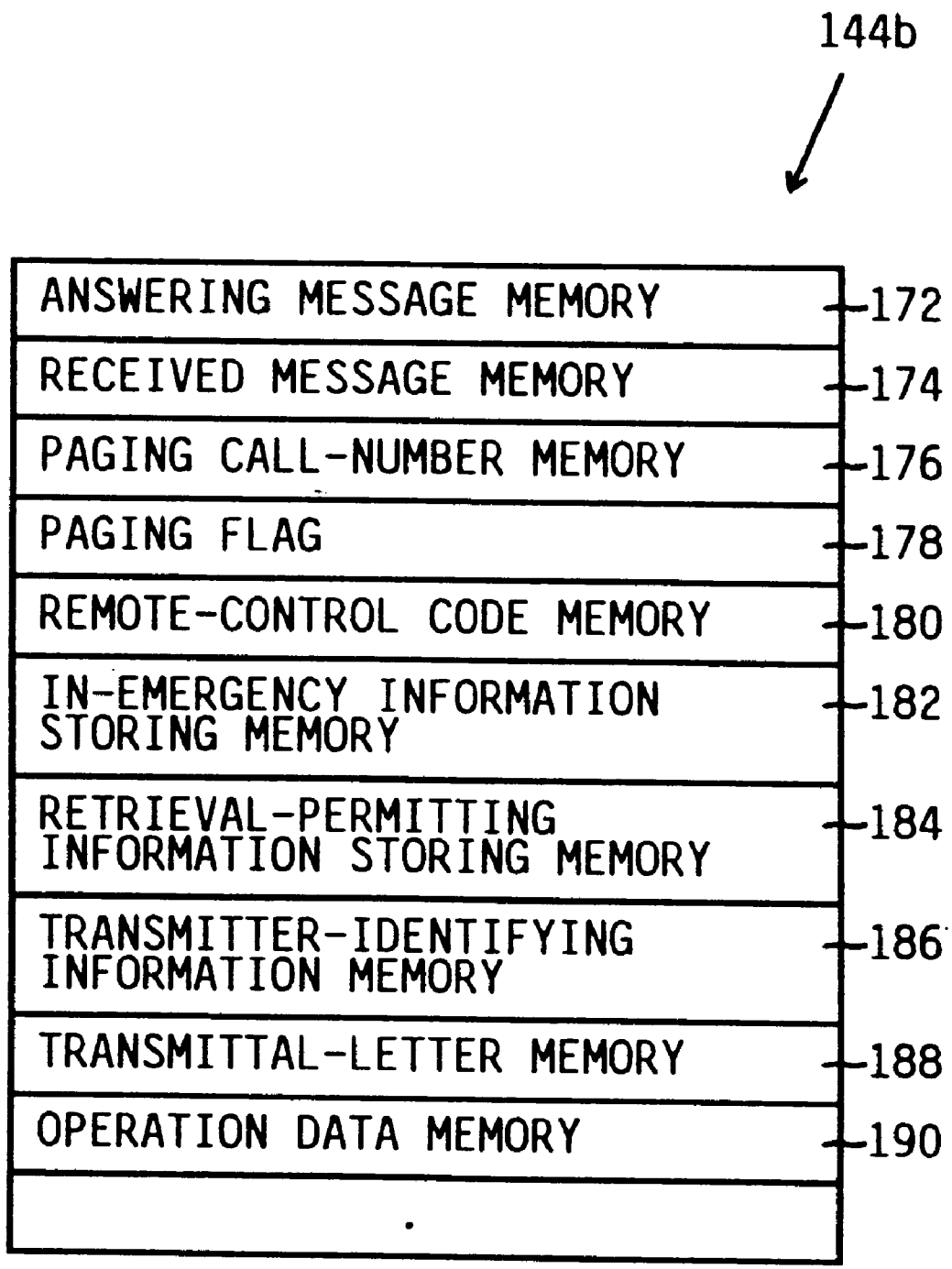
FIG. 6 is a diagrammatic view of a code number-related memory of the RAM of FIG. 5.

As shown in FIG. 6, the non-registered-code-number related memory 144b of the code-number related memory 144 includes, commonly for all non-registered code numbers, i.e., all the non-registered own call signals, an answering message memory 172, a received message memory 174, a paging call-number memory 176, a paging flag 178, a remote-control code memory 180, an in-emergency information storing memory 182, a retrieval-permitting information storing memory 184, a transmitter-identifying information memory 186, a transmittal-letter memory 188, and an operation data memory 190.

Each registered-code-number related memory 144a of the code-number related memory 144 includes, for a corresponding code number, i.e., a corresponding own call signal, each registered in the T/F apparatus 10, various memories 172–190 which are identical with the above-described memories 172–190 of the non-registered-code-number related memory 144b.

Each answering message memory 172 stores an answering message which is to be transmitted by the T/F apparatus 10 in an answering telephone mode described later.

Each received message memory 174 stores a message which has been received by the T/F apparatus 10 in the answering telephone mode.

Each paging call-number memory 176 stores a call number of a communication apparatus which is called or paged by the T/F apparatus 10 to inform a user of the paged apparatus, of the fact that the apparatus 10 has received a message and stored it in a corresponding received message memory 174.

Each paging flag 178 is referred to in judging whether or not to page a communication apparatus whose call number is stored in a corresponding paging call-number memory 176.

Each remote-control code memory 180 stores a remote-control code which is compared with a command code (e.g., DTMF (dual tone multifrequency) signal) which is transmitted from a calling telephone set to cause the T/F apparatus 10 to carry out a pre-scribed operation which will be described later.

Each in-emergency information storing memory 182 (hereinafter, referred to as the "emergency memory" 182) automatically stores information which is received by the T/F apparatus 10 when the recording sheets 18 have been used up, i.e., when no recording sheet 18 remains in the sheet cassette 20.

Each retrieval-permitting information storing memory 184 (hereinafter, referred to as the "retrieval memory" 184) stores information which is received by the T/F apparatus 10 in a retrieval reception mode thereof wherein the received information is not recorded on the recording sheets 18 but is stored in this memory 184.

Each transmitter-identifying information memory 186 stores image information identifying a facsimile transmitter, such as a corresponding code number, or a corresponding own facsimile number, each registered on the T/F apparatus 10. The transmitter-identifying information stored in the form of image information is easily coded and added to the information to be transmitted by the apparatus 10, whichever coding method may be used for the information transmission.

Each transmittal-letter memory 188 stores image information representing a letter of transmittal which is automatically added to the information to be transmitted by the T/F apparatus 10. The transmission information may be image information representing the original images obtained from the original 60. The transmittal letter stored in the form of image information is easily coded each time the transmittal letter is transmitted by the apparatus 10.

Each operation data memory 190 stores operation data relating to the information receiving and transmitting operations of the facsimile machine of the T/F apparatus 10 in relation with a corresponding registered code number, i.e., a corresponding registered own facsimile number of the apparatus 10. For example, the memory 190 stores, as the operation data, one or more of (a) the date and time-of-day of information reception or transmission, (b) the facsimile number of an information transmitter or receiver, (c) the time duration of information reception or transmission, (d) the number of the recording sheets 18 used, (e) the result (success or failure) of information reception or transmission, and (f) the charge or fee of information reception or transmission.

As shown in FIG. 7, the ROM 124 includes a main control routine memory 192, a mode selection routine memory 194, a call-signal registration routine memory 196, an information reception routine memory 198, a paging routine memory 200, a paging call-number storing routine memory 202, a facsimile transmission routine memory 204, an answering message storing routine memory 206, a received message output routine memory 208, an information-stored-in-emergency output routine memory 210, an operation report output routine memory 212, a code-number registration routine memory 214, a facsimile operation routine memory 216, an answering telephone routine memory 218, a received message transmission routine memory 219, a polling transmission routine memory 220, a retrieval transmission routine memory 222, a facsimile reception routine memory 224, a transmitter-identifying-information storing routine memory 226, and a transmittal-letter storing routine memory 228.

The main control routine memory 192 stores a main control program or routine to control the overall operation of the T/F apparatus 10, including switching the apparatus 10 between the telephone and facsimile functions thereof.

The mode selection routine memory 194 stores a control routine to control the T/F apparatus 10 when the user selects one or more of the various operation modes of the apparatus 10.

The call-signal registration routine memory 196 stores a control routine to control the T/F apparatus 10 when the user registers one or more of the own call signals corresponding to the own call numbers of the apparatus 10 and one or more code numbers corresponding to the one or more own call signals registered, respectively.

The information reception routine memory 198 stores a control routine to control the T/F apparatus 10 to receive information in relation with each registered own call signal, i.e., registered own call number corresponding to the registered own call signal.

The paging routine memory 200 stores a control routine to control the T/F apparatus 10 to inform a user of a communication apparatus having a pre-stored paging call number, of the fact that the apparatus 10 has received and stored a voice message.

The paging call-number storing routine memory 202 stores a control routine to control the T/F apparatus 10 when the user stores a paging call number of a communication apparatus to be paged, in relation with each registered code number, i.e., registered own call number corresponding to the registered code number.

The facsimile transmission routine memory 204 stores a control routine to control the T/F apparatus 10 to transmit image information representing the original images read from the original 60 set on the original support member 64.

The answering message storing routine memory 206 stores a control routine to control the T/F apparatus 10 when the user stores an answering voice message in relation with each registered code number.

The received message output routine memory 208 stores a control routine to control the T/F apparatus 10 when the user operates the apparatus 10 to output a received voice message via the speaker 136.

The information-stored-in-emergency output routine memory 210 stores a control routine to control the T/F apparatus 10 when the user operates the apparatus 10 to record the image information which had automatically been stored when no recording sheet 18 remained in the sheet cassette 20, on recording sheets 18 newly supplied.

The operation report output routine memory 212 stores a control routine to control the T/F apparatus 10 when the user wishes the apparatus 10 to record, on the recording sheets 18, an operation report concerning the information receiving and transmitting operations of the facsimile machine of the apparatus 10, in relation with each registered code number.

The code-number registration routine memory 214 stores a control routine to control the T/F apparatus 10 when the user registers a code number corresponding to an own call signal being registered in the apparatus 10.

The facsimile operation routine memory 216 stores a control routine to control the T/F apparatus 10 to automatically receive or transmit image information in relation with each registered own call signal.

The answering telephone routine memory 218 stores a control routine to control the T/F apparatus 10 to automatically transmit, in relation with each registered own call signal, an answering voice message when the apparatus 10 in the answering telephone mode thereof receives a voice message from a user of a calling telephone set.

The received message transmission routine memory 219 stores a control routine to control the T/F apparatus 10 to automatically transmit, in relation with each registered own call signal, a received and stored voice message when the apparatus 10 in the answering telephone mode thereof receives a command code from a calling telephone set. The voice message is transmitted to the calling telephone set.

The polling transmission routine memory 220 stores a control routine to control the T/F apparatus 10 to automatically transmit, in relation with each registered own call signal, the image information representing the original images of the original 60 currently set on the original support member 64, when the apparatus 10 in a polling transmission mode thereof receives a command code from a calling facsimile machine. The image information is transmitted to the calling facsimile machine.

The retrieval transmission routine memory 222 stores a control routine to control the T/F apparatus 10 to automatically transmit, in relation with each registered own call signal, the image information which has been stored in a corresponding retrieval memory 184, when the apparatus 10 in a retrieval transmission mode thereof receives a command code from a calling facsimile machine. The image information is transmitted to the calling facsimile machine.

The facsimile reception routine memory 224 stores a control routine to control the T/F apparatus 10 to automatically receive image information in relation with each registered own call signal.

The transmitter-identifying-information storing routine memory 226 stores a control routine to control the T/F apparatus 10 when the user stores, in relation with each registered code number, the image data identifying a facsimile transmitter which transmits image information to which this image information is added. The identification information may comprise one of the own call numbers which corresponds to each registered code number, and/or the registered own code number itself.

The transmittal-letter storing routine memory 228 stores a control routine to control the T/F apparatus 10 when the user stores, in relation with each registered code number, the image information representing a letter of transmittal which is added to the image information (e.g., original images) to be transmitted by the apparatus 10.

Figures 8, 9:
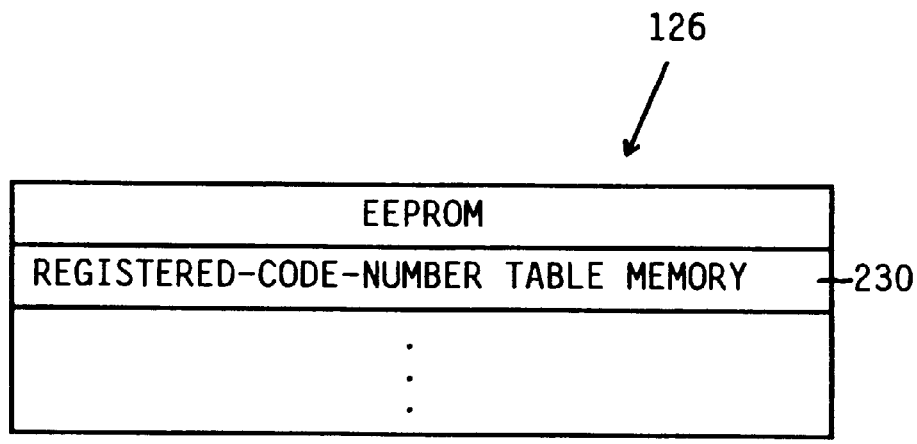
FIG. 8 is a diagrammatic view of an EEPROM (electrically erasable and programmable ROM) of the T/F apparatus of FIG. 1.
FIG. 9 is a diagrammatic view of a registered-code-number table memory of the EEPROM of FIG. 8.

As shown in FIG. 8, the EEPROM 126 includes a registered-code-number table memory 230.

As shown in FIG. 9, the registered-code-number table memory 230 stores, together with and in relation with each registered code number, (a) the signal pattern of a corresponding registered own call signal and (b) a memory pointer indicating the respective addresses of the various memories 172–190 of a corresponding registered-code-number related memory 144a. When the user inputs a registered code number through the operator panel 98 into the T/F apparatus 10, the computer 128 automatically selects one or more of the memories 172–190 corresponding to the input code number. Based on the signal pattern of a registered own call signal received and detected by the apparatus 10, the computer 128 automatically identifies a corresponding registered code number from the table memory 230.

The modem 130 includes a modulating and demodulating mechanism which modulates digital signals into analog signals which in turn are sent out via the NCU 132 to the telephone line 138, and which demodulates analog signals supplied from the telephone line 138, into digital signals. The modem 130 also includes a sound-digitizing mechanism which converts sound analog signals into sound digital signals and a sound-reproducing mechanism which reproduces sound analog signals from sound digital signals.

The NCU 132 has a dialing function and a signal-detecting function, so that the NCU 132 transmits signals in a manner compatible with the telephone line 138 and detects signals supplied from the telephone line 138. Thus, the NCU 132 mediates information between the modem 130 and the telephone line 138.

The handset 16 is connected to the NCU 132, so that the user of the T/F apparatus 10 may talk, through the handset 16, with a user of a calling or called telephone set.

The operator panel 98 may be used by the user to input various sorts of information into the T/F apparatus 10 while the computer 128 carries out one or more of the various control routines pre-stored in the ROM 124. The operator panel 98 displays information as an output of the computer 128.

The call-number-generating circuit 134 generates or produces a call number to call another telephone set or facsimile machine. When the user inputs a call number through the operator panel 98, the CPU 120 supplies the input call number to the generating circuit 134. When the T/F apparatus 10 in the answering telephone mode pages another communication apparatus having a paging call number stored in a paging call-number memory 176 corresponding to a registered call signal or code number, the CPU 120 automatically reads in the stored paging call number of that communication apparatus from the corresponding paging call-number memory 176, so that the CPU 120 supplies the paging call number to the generating circuit 134. The generating circuit 134 generates information representing the call number supplied from the CPU 120, so that the call-number information is supplied to the telephone line 138 via the NCU 132.

The speaker 136 is controlled by the CPU 120 to output a received sound message stored in a received message memory 174 corresponding to a registered code number input by the user through the operator panel 98.

The present T/F apparatus 10 serves as both an answering telephone set and a facsimile machine. Next, there will be described the structural features of the apparatus 10 for serving as the answering telephone set, by reference to the diagrammatic view of FIG. 10, and the structural features of the same 10 for the facsimile machine by reference to the diagrammatic view of FIG. 11.

Figure 10:
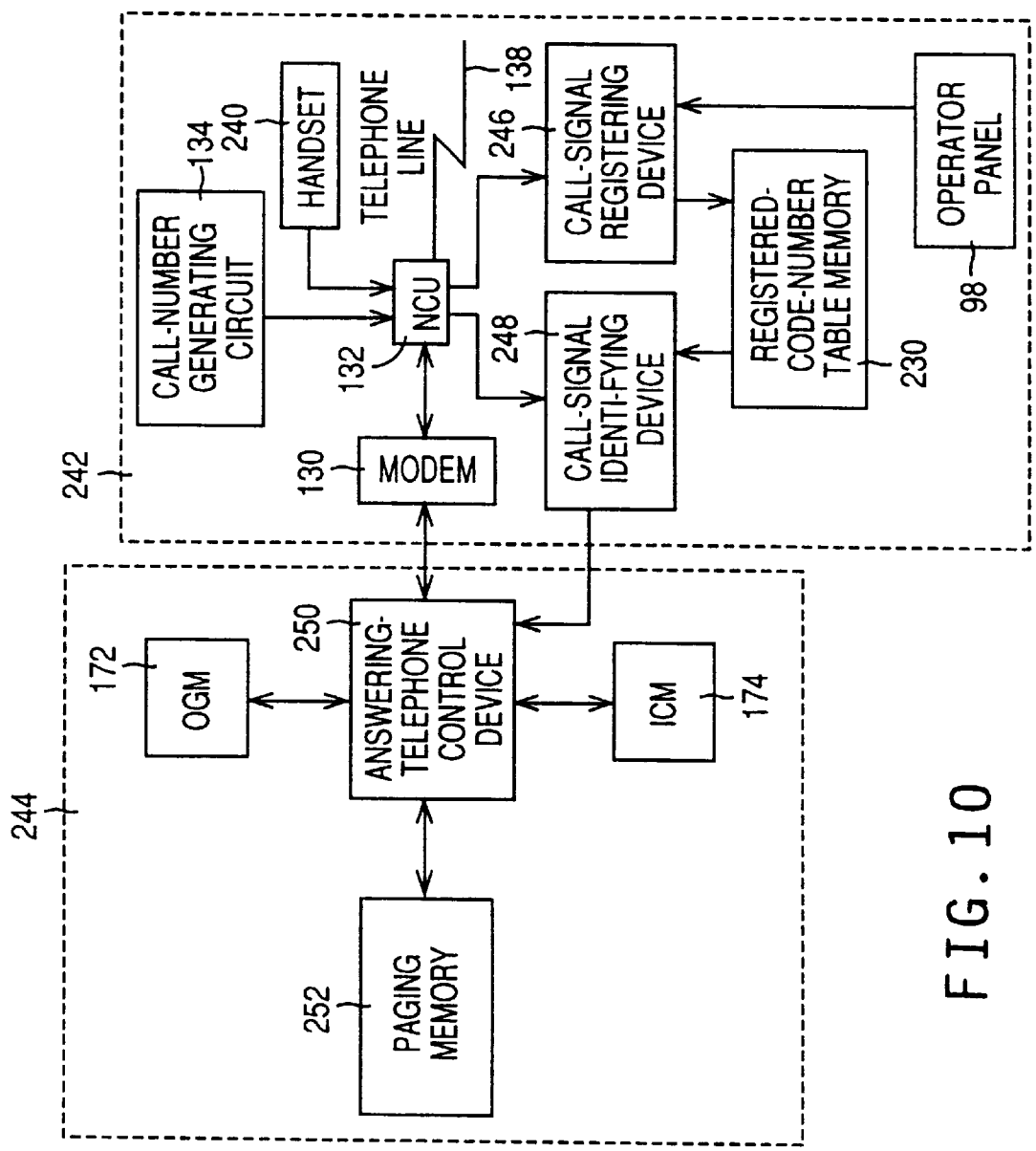
FIG. 10 is a diagrammatic view of an answering telephone set or function of the T/F apparatus of FIG. 1.

As shown in FIG. 10, the answering telephone set of the T/F apparatus 10 includes a signal-processing part 242 and an answering-telephone part 244. The signal-processing part 242 receives signals from, and transmits signals to, the telephone line 138, and can identify or register an own call signal supplied to the apparatus 10. The answering-telephone part 244 operates for carrying out the various answering-telephone operations of the apparatus 10 in response to an own call signal received by the signal-processing part 242.

The signal-processing part 242 includes the NCU 132 connected to the telephone line 138, the modem 130, the handset 16, the call-number generating circuit 134, a call-signal registering device 246, a call-signal identifying device 248, the operator panel 98 connected to the signal registering device 246, and the registered-code-number table memory 230 connected to the signal registering device 246 and the signal identifying device 248.

The call-signal registering device 246 operates for registering an own call signal detected by the NCU 132, and the call-signal identifying device 248 identifies an own call signal detected by the NCU 132.

The NCU 132 detects an own call signal supplied from the telephone line 138, and sends the signal information to the handset 16, the signal registering device 246, and the signal identifying device 248. If the user picks up the handset 16 when the NCU 132 is detecting the call signal, the user can talk with a user of a calling telephone set. In the case where nobody picks up the handset 16, if the T/F apparatus 10 is currently placed in the call-signal registration mode, the signal registering device 246 carries out the call-signal registration program or routine stored in the memory 196. On the other hand, if not, the signal identifying device 248 carries out the information reception routine stored in the memory 198.

The signal registering device 246 is connected to the operator panel 246 and the registered-code-number table memory 230. If a code number is input through the operator panel 98 when an own call signal corresponding to one of the own call numbers allotted to the T/F apparatus 10 by the telephone company is being detected by the NCU 132 in the signal-code registration mode, the code number input is automatically registered in relation with the signal pattern of the call signal in the table memory 230 according to the signal-code registration routine.

The registered-code-number table memory 230 is connected to the signal identifying device 248. The code number or numbers registered in the table memory 230 is/are referred to by the signal identifying device 248 according to the information reception routine, so that a registered code number corresponding to an own call signal detected by the NCU 132 is identified in the table memory 230 and the identified code number is supplied to the answering-telephone part 244.

The answering-telephone part 244 is connected to the modem 130, so that the telephone part 244 receives or transmits information from or to the telephone line 138 via the NCU 132 and the modem 130.

The answering-telephone part 244 includes an answering-telephone control device 250 which controls, in relation with each code number supplied from the signal identifying device 248, the T/F apparatus 10 for reading an answering message from a corresponding memory 172, storing a received message in a corresponding memory 174, and/or paging a communication apparatus having a paging call number stored in a corresponding memory 176 so as to inform that the apparatus 10 has stored the received message in the corresponding memory 174. The answering-telephone part 244 has a paging memory 252 which includes the paging flags 178 as well as the paging call-number memories 176 all for the registered and non-registered own code signals supplied to the T/F apparatus 10. The answering message memories 172 are indicated at "OGM (outgoing message)" and the received message memories 174 are indicated at "ICM (incoming message)", in FIG. 10.

Figure 11:
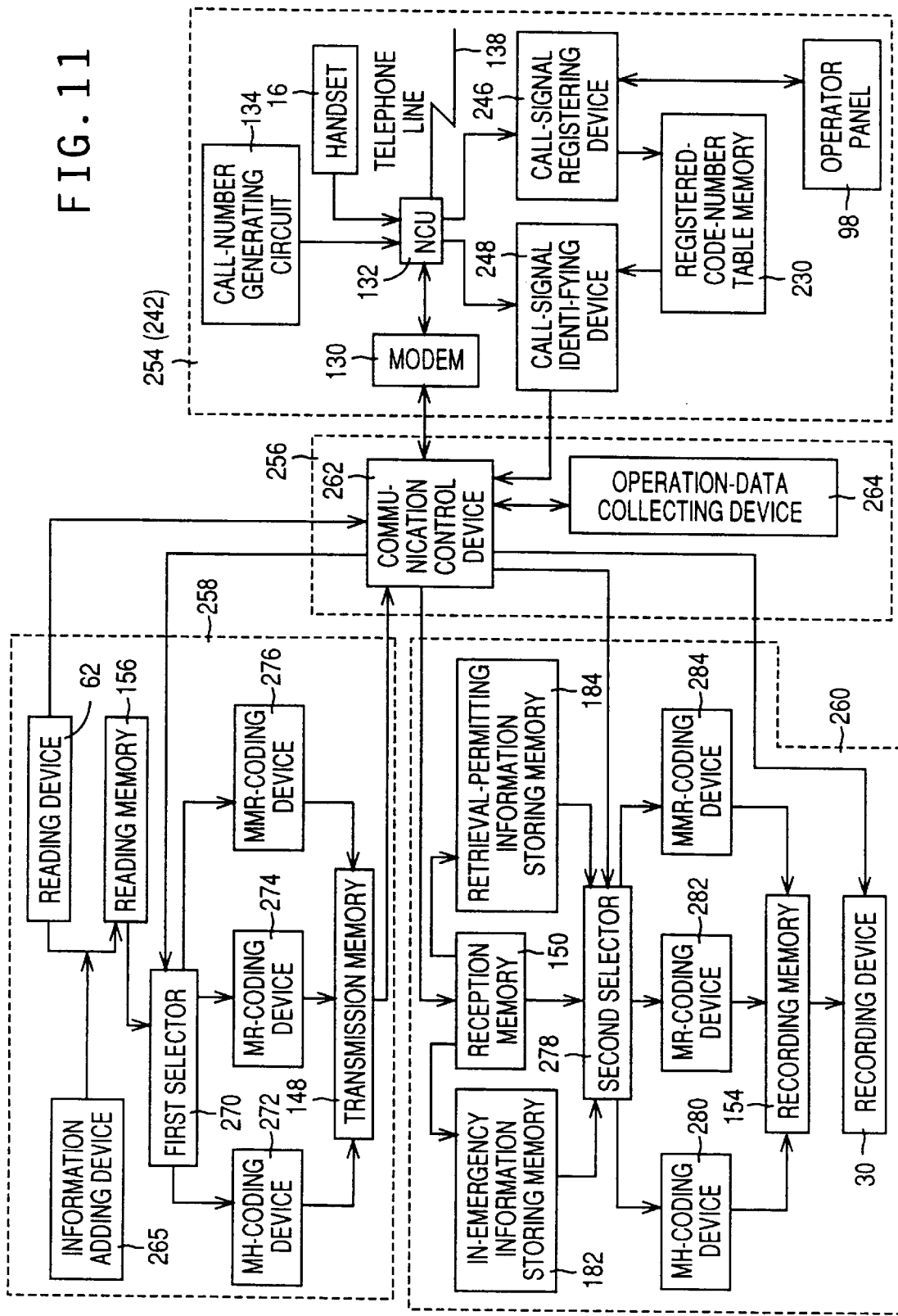
FIG. 11 is a diagrammatic view of a facsimile machine or function of the T/F apparatus of FIG. 1.

As shown in FIG. 11, the facsimile machine of the T/F apparatus 10 includes a signal-processing part 254, a communication control part 256, an information-transmitting part 258, and an information-receiving part 260.

The signal-processing part 254 of the facsimile machine is the same as the signal-processing part 242 of the telephone set shown in FIG. 10. That is, the T/F apparatus 10 employs the signal-processing part 242 (254) for both the telephone and facsimile functions. A repetitive description of the signal-processing part 254 is omitted. The code number or numbers registered in the registered-code-number table memory 230 is/are referred to by the call-signal identifying device 248 according to the information reception routine, so that a registered code number corresponding to an own call signal detected by the NCU 132 is identified and the identified code number is supplied to the communication control part 256. The control part 256 is connected to the modem 130, so that the control part 256 receives or transmits information from or to the telephone line 138 via the NCU 132 and the modem 130. The control part 256 controls the information transmitting and receiving parts 258, 260 based on each identified code number supplied from the signal identifying device 248 and information supplied from the modem 130.

The communication control part 256 includes a communication control device 262 and an operation-data collecting device 258. The control device 262 controls the information transmitting and receiving parts 258, 260, and the collecting device 258 collects and stores operation data including various parameters relating to the information receiving and transmitting operations of the facsimile machine of the T/F apparatus 10.

The information transmitting part 258 includes an information adding device 265, the reading device 62, the reading memory 156, a first selector 270, an MH-coding device 272, an MR-coding device 274, an MMR-coding device 276, and the transmission memory 148.

The information adding device 265 operates for adding transmitter-identifying information (e.g., code number) and/ or a letter of transmittal, each corresponding to a code number supplied from the signal-processing part 254, to image information which has been read by the reading device 62 and which is to be transmitted to another facsimile machine. The reading memory 156 stores image information representing the original images read by the reading device 62. The first selector 270 is controlled to select one of three different image-information coding methods corresponding to the three coding devices 272–276, respectively. The communication control device 262 controls the first selector 270 to select one of the three coding devices 272–276, based on information which is supplied from a calling or called facsimile machine and which represents a decoding method employed by the facsimile machine.

The MH-, MR-, or MMR-coding device 272–276 codes and compresses image information in a corresponding coding method, respectively. The transmission memory 148 temporarily stores transmission information which has been coded by the coding device 272–276. The information adding device 265 adds, to the image information obtained by the reading device 62, image information representing additional information including transmitter-identifying information and/or a letter of transmittal corresponding to each code number supplied from the signal-processing part 254. The reading memory 156 temporarily stores the transmission information including the additional information. One of the three coding devices 272–276 selected by the first selector 270 codes the transmission information. After having temporarily been stored in the transmission memory 148, the transmission information is sent out to the telephone line 138 via the communication control part 256 and the signal processing part 254.

The information receiving part 260 includes the reception memory 150, the in-emergency information storing memories 182, the retrieval-permitting information recording memories 184, a second selector 278, an MH-decoding device 280, an MR-decoding device 282, an MMR-decoding device 284, the recording memory 154, and the recording device 30.

The second selector 278 is controlled by the communication control device 262 to select one of three different image-information decoding methods corresponding to the three decoding devices 280–284, respectively. The control device 262 controls the second selector 278 to select one of the three decoding devices 280–284, so as to decode the coded information received and stored in the memory 150, 182, or 184 and record the decoded information on the recording sheets 18. One of the three decoding devices 280–284 is selected based on information which is supplied from a calling or called facsimile machine and which represents a coding method employed by the facsimile machine.

The MH-, MR-, or MMR-decoding device 280–284 decodes the received information which had been coded in an MH-, an MR-, or an MMR-coding method, respectively. The recording device 30 records, on the recording sheets 18, the decoded information stored in the recording memory 154.

The reception memory 150 temporarily stores the received coded information supplied from the telephone line 138 via the communication control device 262. In the case where some recording sheets 18 remain and the T/F apparatus 10 is not placed in a retrieval-permitting information storing mode, the control device 262 controls the second selector 278 to select an appropriate one of the three decoding devices 280–284 to decode the information stored in the reception memory 150. The decoded information is stored in the recording memory 154, and then recorded on the recording sheets 18 by the recording device 30.

In the case where the information-receiving part 260 receives information while the T/F apparatus 10 is placed in either an in-emergency information storing state or the retrieval-permitting information storing mode, the received information is stored in the memory 182, or the memory 184, in relation with a code number corresponding to an own call signal identified by the signal-processing part 254. If the received own call signal corresponds to a registered code number, the received information is stored in a corresponding memory 182 or memory 184 of the registered-code-number related memory 144a. On the other hand, if the received own call signal is not a registered one, i.e., a non-registered one, the received information is stored in the memory 182 or memory 184 of the non-registered-code-number related memory 144b. The received information stored in the memory 144a or memory 144b is maintained until the control device 262 issues a control command to the recording device 30 to read the information therefrom and record the same on the recording sheets 18.

There will be described the various operations of the present T/F apparatus 10 constructed as described above, by reference to the flow charts of FIGS. 12–32.

Figure 12:
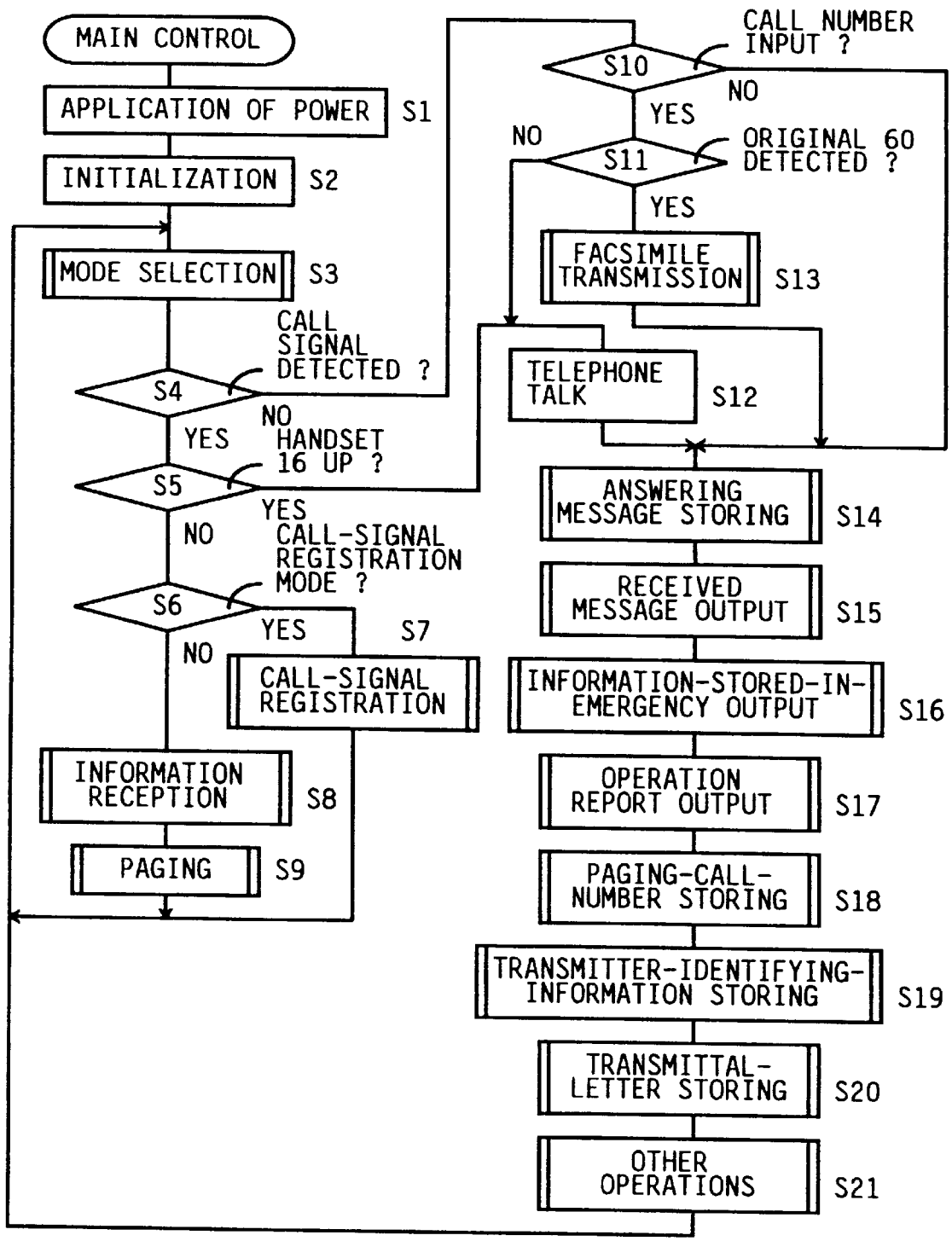
FIG. 12 is a flow chart representing a main control routine according to which the T/F apparatus of FIG. 1 operates.

First, at Step S1 of the main control routine of FIG. 12, an electric power is applied to the T/F apparatus 10 and, at Step S2, initialization is carried out on the apparatus 10. Step S2 is followed by Step S3, i.e., mode selection routine of FIG. 13 in which one or more operation modes are selected on the apparatus 10. The various operation modes selectable on the apparatus 10 are as follows: answering-telephone mode, call-signal registration mode, facsimile automatic reception mode, facsimile manual reception mode, paging-call-number storing mode, answering-message storing mode, received-message output mode, information-stored-in-emergency output mode, operation-report output mode, polling transmission mode, retrieval transmission mode, retrieval-permitting information storing mode, transmitter-identifying information storing mode, and transmittal-letter storing mode.

Subsequently, at Step S4, the CPU 120 of the computer 128 judges whether the NCU 132 has detected an own call signal supplied thereto from the exchange 139 via the telephone line 138. Each call signal takes a high and a low voltage state which are lower than a stationary voltage level of the telephone line 138 with no information being transmitted thereby. Therefore, if the voltage of the signal detected by the NCU 132 from the telephone line 138 is found as being lower than the stationary level, it means that a call signal is being supplied to the T/F apparatus 10 and, if not, no call signal is being received. If a positive judgment is made at Step S4, i.e., if an own call signal has been detected by the NCU 132, the control of the CPU 120 goes to Step S5 to judge whether the handset 16 has been picked up by the user.

If a positive judgment is made at Step S5, that is, if the handset 16 is picked up, then the control of the CPU 120 goes to Step S12. On the other hand, if a negative judgment is made at Step S5, i.e., if the handset 16 remains resting on the lower housing 12, the control goes to Step S6 to judge whether the call-signal registration mode has been selected on the T/F apparatus 10, i.e., whether the apparatus 10 is currently placed in the call-signal registration mode. If a positive judgment is made at Step S6, the control goes to Step S7, i.e., call-signal registration routine of FIGS. 14 and 15 and then returns to Step S3 and the following steps. If a negative judgment is made at Step S6, the control goes to Step S8, i.e., information reception routine and then to Step S9, i.e., paging routine. In the latter case, thereafter, the control of the CPU 120 returns to Step S3 and the following steps.

On the other hand, if a negative judgment is made at Step S4, the control goes to Step S10 to judge whether the user has input a call number into the T/F apparatus 10 through the keyboard 102 which is being monitored according to a keyboard monitor routine (not shown), based on keyboard-monitor information indicating whether or not the individual numeral keys 104 have been pushed by the user. If the user has started pushing appropriate ones of the numeral keys 104 to input a call number into the T/F apparatus 10, the CPU 120 waits for the SET key 108 to be pushed following the keying-in of the last digit of the call number. If a positive judgment is made at Step S10, i.e., if a call number has been input, then the control goes to Step S11 to judge whether any original 60 is set on the original support member 64, based on a detection signal supplied from the original sensor 68. If a positive judgment is made at Step S11, the control goes to Step S13, i.e., facsimile transmission routine of FIG. 25. Step S13 is followed by Step S14. On the other hand, if a negative judgment is made at Step S11, the control goes to Step S12 in which the user of the T/F apparatus 10 can talk with a user of a called telephone set identified by the call number input by the former or first user. Meanwhile, if the handset 16 is put down on the lowering housing 12 and thus the T/F apparatus 10 is disconnected from the telephone line 138, the control of the CPU 120 goes to Step S14. Additionally, if a negative judgment is made at Step S10, i.e., no call number is input, the control directly goes to Step S14.

At Steps S14, S15, S16, S17, S18, S19, S20, and S21, the CPU 120 carries out the answering-message storing routine, received-message output routine, information-stored-in-emergency output routine, operation-report output routine, paging-call-number storing routine, transmitter-identifying-information storing routine, a transmittal-letter storing routine, and other routines, respectively. Thereafter, the control of the CPU 120 goes back to Step S3 and the following steps.

Figure 13:
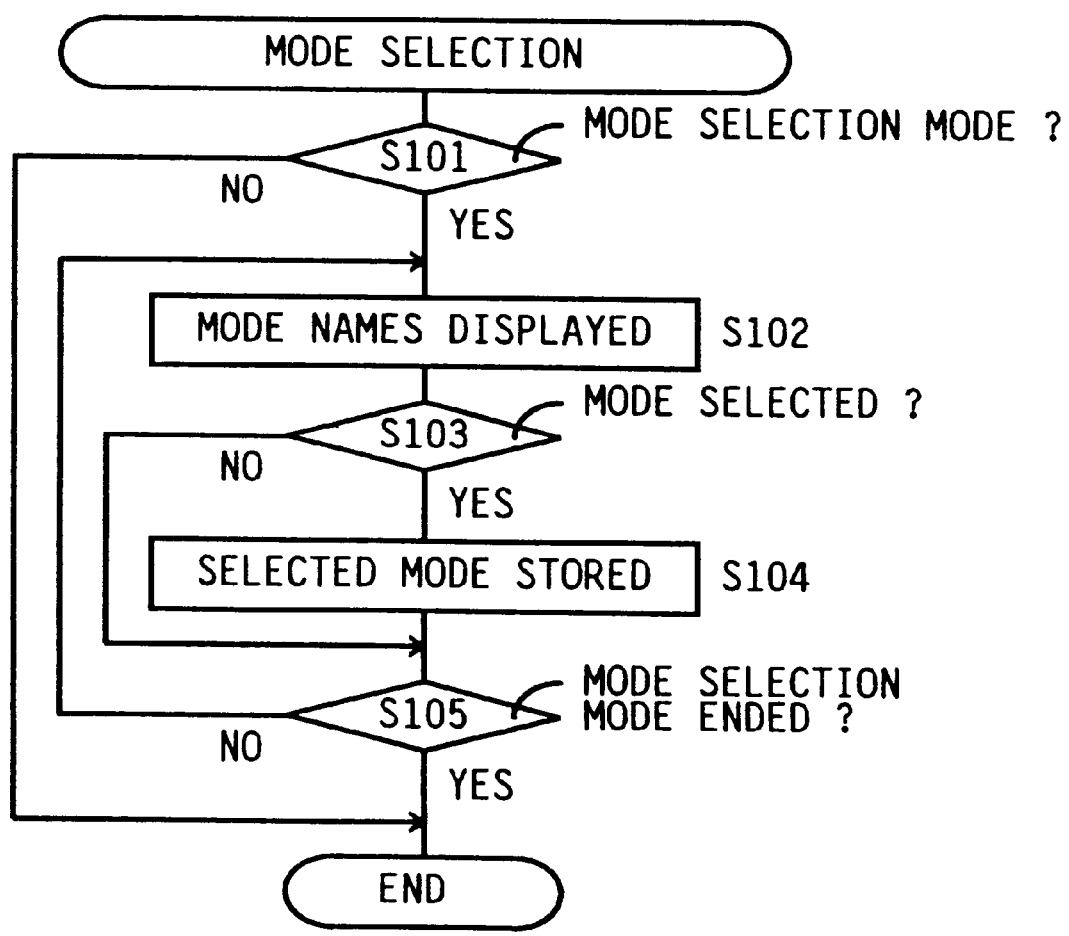
FIG. 13 is a flow chart representing a mode selection routine according to which one or more operation modes is/are selected on the T/F apparatus of FIG. 1.

Next, there will be described the mode selection routine of Step S3 of the main control routine of FIG. 12, by reference to the flow chart of FIG. 13.

First, at Step S101, the CPU 120 judges whether the T/F apparatus 10 is currently placed in the mode selection mode, based on the keyboard-monitor information including data indicating whether the FUNCTION key 106 has been pushed to establish the mode selection mode. If the FUNCTION key 106 is pushed by the user and therefore a positive judgment is made at Step S101, the control of the CPU 120 goes to Step S102 to control the LCD 100 to sequentially display the respective names of the various operation modes selectable on the T/F apparatus 10, each for a predetermined period of time, in a predetermined cyclic order. Step S102 is followed by Step S103 to judge whether one operation mode has been selected. If the keyboard 102 is operated to input a mode-selection command while the name of a certain mode is displayed on the LCD 100 and therefore a positive judgment is made at Step S103, the control goes to Step S104 to select or establish that mode currently displayed on the LCD 100. After a mode has been selected at Step S104, or if no mode-selection command is input at Step S103, the control goes to Step S105 to judge whether the mode selection mode has been ended, based on the information supplied from the keyboard 102. If a negative judgment is made at Step S105, the control returns to Step S102 and the following steps. On the other hand, if a positive judgment is made at Step S105, the current control cycle of this routine is ended. Meanwhile, if a negative judgment is made at Step S101, i.e. if the T/F apparatus 10 is not placed in the mode selection mode, this routine is ended without any further operation.

For example, in the event that the answering-telephone mode is selected on the T/F apparatus 10, first, the FUNCTION key 106 is pushed to select the mode selection mode, so that the respective names of the various operation modes are displayed in the cyclic order on the LCD 100. If a mode-selection key (e.g., cursor key 110 and SET key 108) of the keyboard 102 is pushed while the name of the answering telephone mode is indicated on the LCD 100, the answering telephone mode is selected or established on the T/F apparatus 10. So long as the keyboard 102 is not operated to input an end command, two or more modes may be selected in series in the same manner as described above. The thus selected mode or modes is/are stored in the selected mode memory 142 of the RAM 122. However, it is possible to adapt the T/F apparatus 10 to change, on the LCD 100, the respective names of the various operation modes in response to a change command which is input by the user through the keyboard 102.

Next, there will be described the call-signal registration routine of Step S7 of FIG. 12, by reference to FIGS. 14 and 15.

Figure 33:
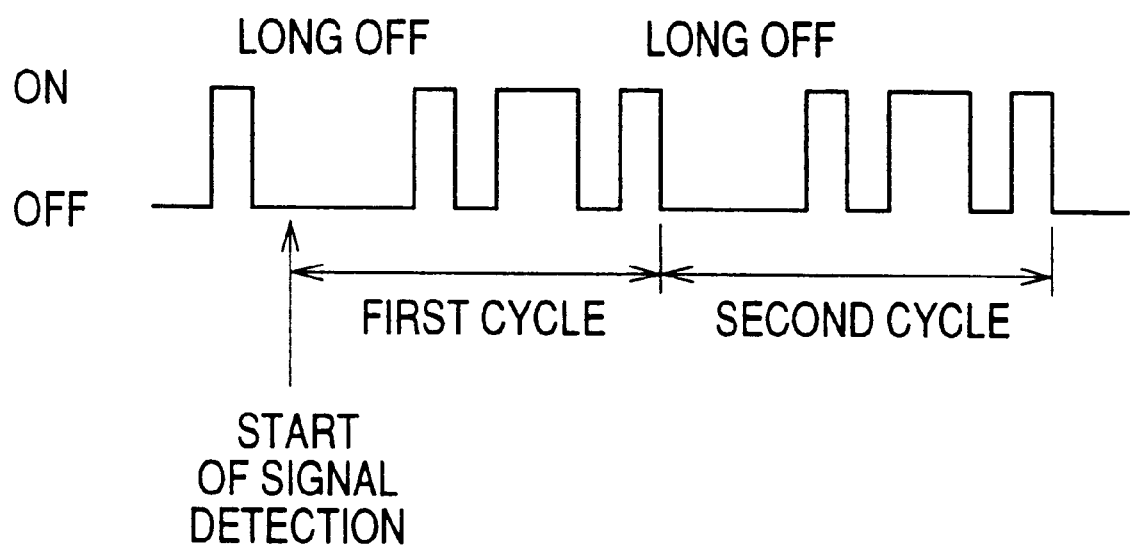
FIG. 33 is a graph showing the ON state, OFF state, and LONG-OFF state of a call signal supplied to the T/F apparatus of FIG. 1 to call the apparatus.

The registration of an own call signal is carried out by first measuring, following detection of a "LONG-OFF" period shown in FIG. 33, the respective times of "ON" and "OFF" periods, then comparing the measured ON and OFF times of a first cycle with the corresponding measured times of a second cycle following the first cycle, and finally storing, in the EEPROM 126, the respective averages of the ON and OFF times of the two cycles if each pair of compared ON or OFF times are essentially identical with each other within a permissible range of measurement errors. Thus, the signal pattern of an own call signal is registered in the T/F apparatus 10.

First, at Step S201, the CPU 120 of the computer 128 judges whether the first flag F1 is set at one, i.e., F1=1. The state of F1=1 indicates that the respective patterns of successively detected two cycles of an own call signal are essentially identical with each other and that the T/F apparatus 10 waits for inputting of a user's command to register the pattern of the own call signal. Upon initialization of the apparatus 10, the first flag F1 had been reset to zero, i.e., F1=0. Therefore, a negative judgment is made at Step S201, and the control of the CPU 120 goes to Step S202 to control the LCD 100 to display a message indicating that the detection of an own call signal has been started.

Step S202 is followed by Step S203 to judge whether the handset 16 has been picked up. When the handset 16 is being picked up, the T/F apparatus 10 is connected to the telephone line 138, so that the T/F apparatus 10 permits the user to talk with a user of a calling telephone set. If a negative judgment is made at Step S203, the control of the CPU 120 goes to Step S204 to judge whether the own call signal being detected is taking a high voltage, i.e., taking an "ON" state.

If a positive judgment is made at Step S204, the control goes to Step S205 to judge whether the second flag F2 is set at one, i.e., F2=1. The state of F2=1 indicates that a LONG-OFF period has been detected. Upon initialization of the T/F apparatus 10, the second flag F2 had been reset to zero, i.e., F2=0. Therefore, a negative judgment is made at Step S205, and the control of the CPU 120 goes to Step S206 to reset a content, C2, of the second counter 168 to zero, i.e., C2=0. Then, the control of the CPU 120 returns to Step S3 of the main control routine of FIG. 12.

So long as an ON state of the own call signal is detected, Steps S201 to s206 are repeated. If the own call signal is taking an ON state when the detection of the call signal is started, or the own call signal takes an ON state following an "OFF" state after the call-signal detection has been started, a negative judgment is made at Step S204, so that the control of the CPU 120 goes to Step S212 to store, in the current signal-state memory 164, data indicating that the own call signal is currently taking an OFF state. Simultaneously, data which have been stored up to then in the current signal-state memory 164 are transferred to the prior signal-state memory 162. Subsequently, the control of the CPU 120 goes to Step S213 to add one to the content C2 of the second counter 168. Thus, the time measurement of an OFF state or period is started.

Step S213 is followed by Step S214 to judge whether the own call signal was taking an ON state in the preceding control cycle in accordance with the present routine, i.e., call-signal registration routine, based on the data stored in the prior signal-state memory 162. If the own call signal was taking an OFF state upon starting of this routine, a negative judgment is made at Step S214, so that the control of the CPU 120 goes to Step S218 to judge whether a LONG-OFF period has been detected, by comparing the content C2 of the second counter 168 with a reference value or time, $C_A$. If the counter content, i.e., measured time C2 is not smaller than the reference time $C_A$, a positive judgment is made at Step S218. The reference time $C_A$ is shorter than the time of a LONG-OFF period shown in FIG. 33, but is longer than the time of any OFF period other than the LONG-OFF period. Shortly after the starting of a call-signal registration operation, a negative judgment is made at Step S218, so that the control of the CPU 120 goes back to Step S3 of FIG. 12.

If the own call signal was taking an ON state upon starting of this call-signal registration and then changed to an OFF state, a positive judgment is made at Step S214, so that the control of the CPU 120 goes to Step S215 to judge whether the second flag F2 is set at F2=1. At this stage, however, a LONG-OFF period has not been detected, and therefore a negative judgment is made at Step S215. Then, the control goes back to Step S3 of FIG. 12.

So long as an OFF state of the own call signal is detected, Steps S201 to S204, S212, and S213 are repeated and a negative judgment is repetitively made at Step S214, so that at Step S218 the content C2 of the second counter 168 is successively incremented. Unless this OFF state is a LONG-OFF period, the own call signal will change to an ON state before the negative judgments made at Step S218 change to a positive one. In that case, a positive judgment is made at Step S204, and at Step S205 a negative judgment is made because a LONG-OFF period has not been detected yet. Then, the control of the CPU 120 goes to Step S206 to reset or clear the content C2 of the second counter 168 representing the measured time of the current OFF state or period. Thus, the measured time of this OFF period is discarded.

Steps S201 to S206, S212 to S214, and S218 are repeated until a LONG-OFF period is detected. Meanwhile, if an OFF state of the own call signal which continues for a time not less than the reference time $C_A$ is detected, a positive judgment is made at Step S218, so that the control of the CPU 120 goes to Step S219 to judge whether the third flag F3 is set at one, i.e., F3=1. The third flag F3 is referred to in judging whether to increment a content, C3, of the third counter 170 upon detection of a LONG-OFF period. Upon initialization of the T/F apparatus 10, the third flag F3 has been reset to zero, i.e., F3=0. At this stage, therefore, a negative judgment is made at Step S219, so that the control of the CPU 120 goes to Step S220 to set the third flag F3 to F3=1 and then goes to Step S221 to set the second flag F2 to F3=1, thereby indicating that a LONG-OFF period has been detected, and add one to the content C3 of the third counter 170, thereby counting the number of detected LONG-OFF periods.

Figure 14:
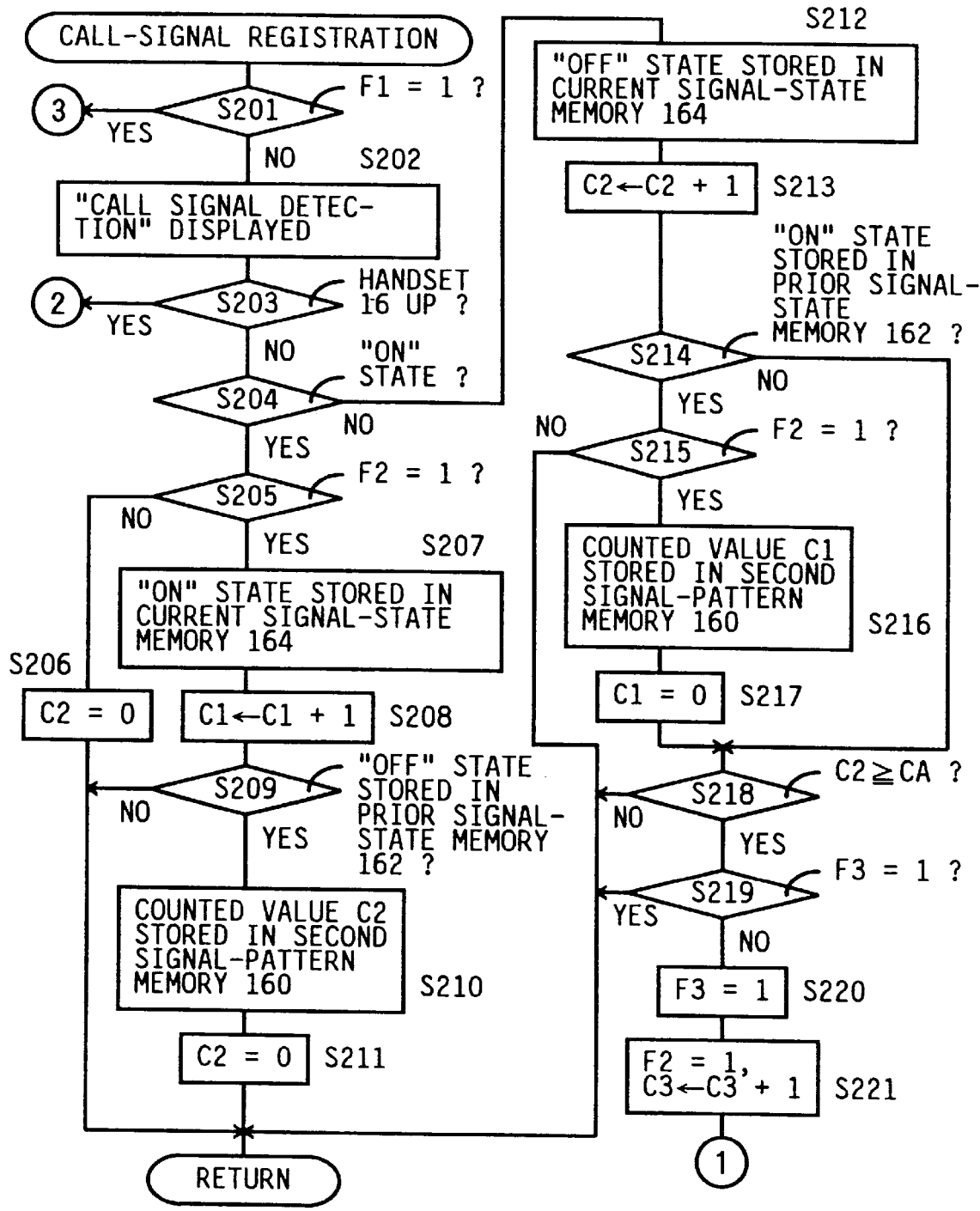
FIG. 14 is a flow chart representing a first half of a call-signal registration routine according to which one or more call signals is/are registered on the T/F apparatus of FIG. 1.
Figure 15:
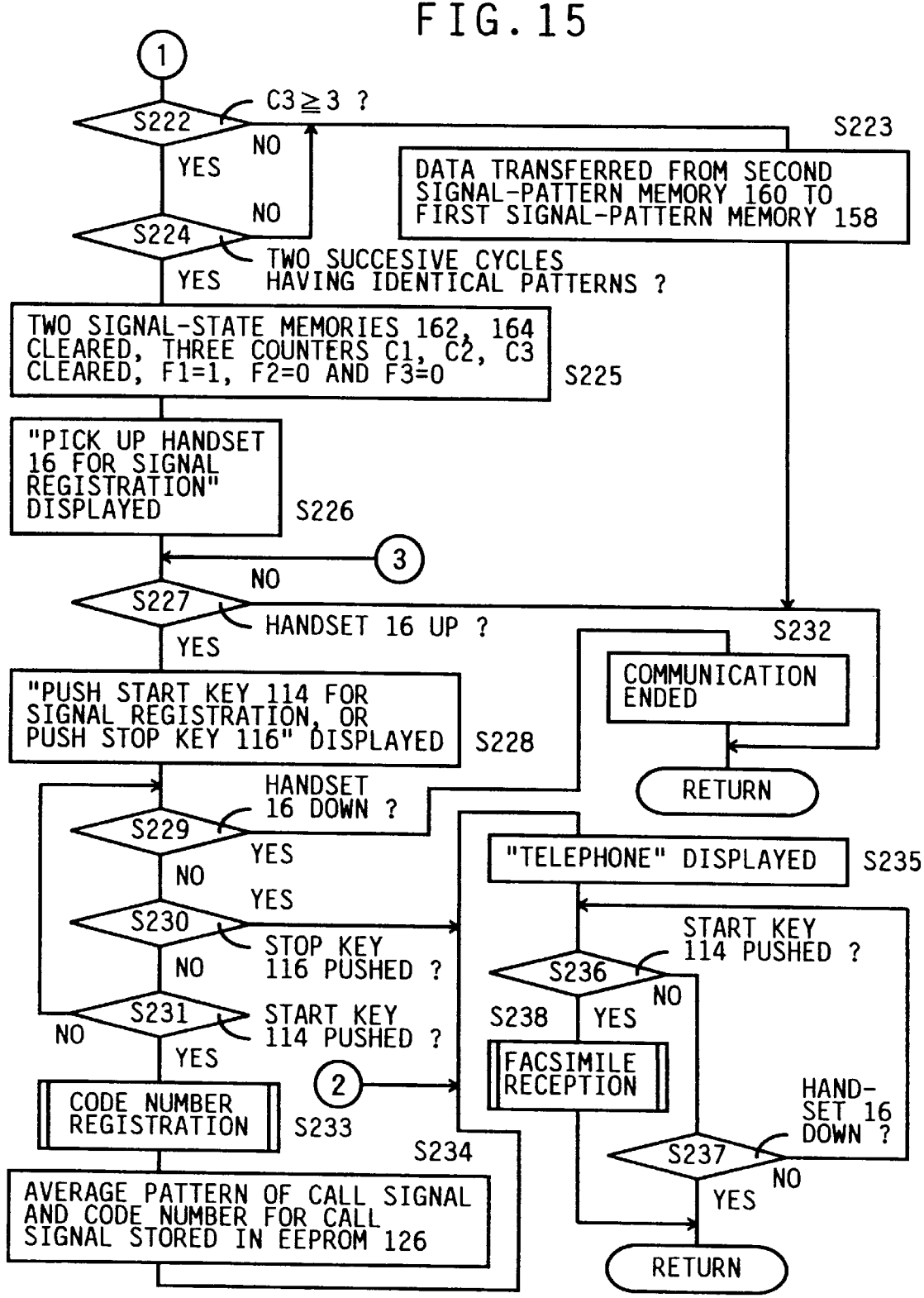
FIG. 15 is a flow chart representing a second half of the call-signal registration routine of FIG. 14.

Step S221 of FIG. 14 is followed by Step S222 of FIG. 15 where the CPU 120 judges whether the content C3 of the third counter 170 is not less than three, i.e., whether the respective patterns of two cycles of an own call signal have been detected. At this stage, a negative judgment is made at Step S222, so that the control of the CPU 120 goes to Step S223 to transfer data stored in the second signal-pattern memory 160 into the first signal-pattern memory 158. Since, however, the data of the first and second signal-pattern memories 158, 160 had been cleared upon initialization of the T/F apparatus 10, no data is stored in the second memory 160 at the time when a LONG-OFF period is first detected. In the current control cycle, therefore, no data is transferred from the second memory 160 to the first memory 158. Then, the control of the CPU 120 goes back to Step S3 of the main control routine of FIG. 12.

Since the time of a LONG-OFF period is longer than the reference time $C_A$, Steps S201 to S204, S212 to S214, S218, and S219 are repeated even after the negative judgments made at Step S218 have changed to a positive one, until the own call signal takes an ON state following the LONG-OFF period.

If the own call signal changes from a LONG-OFF period to an ON state, a positive judgement is made at Step S205 because the second flag F2 has been set to F2=1, so that the control of the CPU 120 goes to Step S207 to store, in the current signal-state memory 164, data indicating that the own call signal is currently taking an ON state, and then goes to Step S208 to add one to a content, C1, of the first counter 166 to start measuring the time of the ON state or period. Step S208 is followed by Step S209 to judge whether the own call signal was taking an OFF state (this OFF state may be a LONG-OFF period or a shorter OFF period) before the current ON state. If the own call signal has changed from an OFF state to an ON state, a positive judgement is made at Step S209, so that the control of the CPU 120 goes to Step S210 to store the content C2 of the second counter 168 in a first memory area of the second signal-pattern memory 160 and reset the third flag F3 to F3=0, and then goes to Step S211 to clear the content C2 of the second counter 168 to zero.

So long as the own call signal being detected continues to take an ON state, Steps S201 to S205, and S207 to S209 are repeated, so that the first counter 166 measures the time of the ON state or period. Meanwhile, if the own call signal changes from the ON state to an OFF state, the positive judgments made at Step S204 change to a negative one, so that the CPU 120 carries out Steps S212 to S215. Since a LONG-OFF period has been detected, a positive judgment is made at Step S215, so that the control goes to Step S216 to store the content C1 of the first counter 166, i.e., the measured time of the ON period, in a second memory area of the second signal-pattern memory 160, and then goes to Step S217 to clear the content C1 of the first counter 166.

Since this OFF state is not a LONG-OFF period, this OFF state or period changes to an ON state before a positive judgment is made at Step S218. Therefore, a positive judgment is made at Step S204, and the measured time of the OFF period is stored in a third memory area of the second signal-pattern memory 160. Thus, the time or times of ON period or periods and the time or times of OFF period or periods, each contained in the pattern of an own call signal, are measured and stored. If a second LONG-OFF period is detected, a positive judgment is made at Step S218. At that time, the third flag F3 has been reset to F3=0, and therefore a negative judgment is made at Step S219, so that at Step S221 one is added to the content C3 of the third counter 170. Thus, the number of detected LONG-OFF periods is counted. Step S221 is followed by Step S222. In this case, a negative judgment is made, so that the control of the CPU 120 goes to Step S223 to transfer the data stored in the second signal-pattern memory 160, i.e., the measured times of the ON and OFF periods of the first cycle, into the first signal-pattern memory 158.

Then, the respective times of ON and OFF periods of the second cycle following the first cycle are measured in the same manner as described above for the first cycle, and stored in the second signal-pattern memory 160. If a third LONG-OFF period is detected, a positive judgment is made at Step S222, so that the control of the CPU 120 goes to Step S224 to judge whether the measured times of the ON and OFF periods of the first cycle are essentially identical with the corresponding ON and OFF times of the second cycle. That is, the respective times of ON and OFF periods of the first cycle stored in the first signal-pattern memory 158 are compared with the respective times of ON and OFF periods of the second cycle stored in the second signal-pattern memory 160. If the respective times of the first cycle are essentially identical with the corresponding times of the second cycle within a permissible range of measurement errors, a positive judgment is made at Step S224.

If a negative judgment is made at Step S224, the control of the CPU 120 goes to Step S223 to transfer the data stored in the second signal-pattern memory 160 to the first signal-pattern memory 158. For example, in the event that the NCU 132 had started measuring the time of a LONG-OFF period from an intermediate point thereof as shown in FIG. 33 and the measured time is longer than the reference time $C_A$, the measured OFF period is identified or counted as a LONG-OFF period and the measured time is stored as the time of a LONG-OFF period. Since, however, the stored time of the LONG-OFF period is shorter than the correct time of a LONG-OFF period, a negative judgment is made at Step S224. In this case, the respective times of ON and OFF periods of a third cycle following the second cycle are measured and stored in the second signal-pattern memory 160. In this way, the ON- and OFF-period measurements of an own call signal are continued until a positive judgment is made at Step S224.

If the respective times of ON and OFF periods of a first cycle are essentially identical with the corresponding times of a second cycle following the first cycle, that is, if a positive judgment is made at Step S224, then the control of the CPU 120 goes to Step S225 to clear the respective contents of the first to third counters 166 to 170, each to zero, reset the second and third flags F2, F3 to F2=0 and F3=0, respectively, clear the first and second signal-pattern memories 158, 160, each to zero, clear the prior and current signal-state memories 162, 164, each to zero, and set the first flag F1 to F1=1, thereby indicating that the respective patterns of two successive cycles of an own call signal are essentially identical with each other.

Step S225 is followed by Step S226 to control the LCD 100 to display a message indicating that if the user wishes to register the detected own call signal, the user is requested to pick up the handset 16. At the following Step S227, the CPU 120 judges whether the handset 16 has been picked up. If a negative judgment is made at Step S227, the control goes back to Step S3 of FIG. 12. Steps S3–S6, S201, and S227 are repeated until the handset 16 is picked up.

If a positive judgment is made at Step S227, the control of the CPU 120 goes to Step S228 to control the LCD 100 to display a message indicating that if the user pushes the START key 114 the detected own call signal is registered and if the user pushes the STOP key 116 the detected own call signal is not registered. Step S228 is followed by Step S229 to judge whether the handset 16 has been put down on the lower housing 12. If a positive judgment is made at Step S229, the control goes to Step S232 to disconnect the T/F apparatus 10 from the telephone line 138 and end this communication, and then goes back to Step S3 of FIG. 12. On the other hand, if a negative judgment is made at Step S229, the control goes to Step S230 to judge whether the STOP key 116 has been pushed. If a negative judgment is made at Step S230, the control goes to Step S231 to judge whether the START key 114 has been pushed.

Steps S229 to S231 are repeated until the detection of one of (a) the putting-down of the handset 16, (b) the pushing of the STOP key 116, and (c) the pushing of the START key 114. If the handset 16 is put down, Step S232 is carried out in the manner as described above.

On the other hand, if the user does not wish to register the detected own call signal and pushes the STOP key 116, the control of the CPU 120 goes to Step S235 to command the LCD 100 to display a message of "TELEPHONE" indicating that the telephone line 138 is alive. In this case, the user of the telephone set of the T/F apparatus 10 can talk with the user of the calling telephone set via the telephone line 138, or otherwise the facsimile machine of the apparatus 10 can receive image information from a calling facsimile machine. Step S235 is followed by Step S236 to judge whether the START key 114 has been pushed to input a user's command to receive the facsimile information. If a negative judgment is made at Step S236, the control of the CPU 120 goes to Step S237 to judge whether the handset 16 has been put down to input a user's command to end this communication. On the other hand, if a negative judgment is made at Step S236, the control goes to Step S238 that is the same as Step S703 described later.

In the case where the T/F apparatus 10 is placed in the call-signal registration mode, the apparatus 10 is automatically placed in the facsimile manual information reception mode, irrespective of whichever mode or modes has or have been selected from various facsimile automatic information reception modes of the apparatus 10. Therefore, if the user of the apparatus 10 can hear the voices of the user of the calling telephone set through the handset 16 being picked up, the former user can talk with the latter user. Meanwhile, if not, the former user can judge that the facsimile machine of the apparatus 10 is being called, so that the user pushes the START key 114 to receive the facsimile information transmitted from the calling facsimile machine.

If the START key 114 is pushed and a positive judgment is made at Step S231, the control of the CPU 120 goes to Step S233, i.e., code-number registration routine where a code number for the own call signal being registered is stored in the input code-number memory 152 as described later. Step S233 is followed by Step S234 to calculate the average of (a) each of the ON and OFF times of the first cycle stored in the first signal-pattern memory 158 and (b) a corresponding one of the ON and OFF times of the second cycle stored in the second signal-pattern memory 160, and store the calculated averages as pattern data representing the signal pattern of the own call signal, in the registered-code-number table memory 230 of the EEPROM 126. Additionally, the CPU 120 reads the code number stored in the input code-number memory 152 at Step S233, and stores data representing the code number, in relation with the pattern data representing the signal pattern of the own call signal, in the registered-code-number table memory 230. Thereafter, the input code-number memory 152 is initialized or cleared. Thus, at Step S234, the signal pattern of an own call signal is registered in the form of pattern data including the respective counted values of the ON and OFF periods each of which is measured beginning at the time of transition from an ON state to an OFF state or the time of transition from an OFF state to an ON state, and the registered own call signal is related with the code number selected and input by the user. In the present embodiment, two or more call signals can be registered for the telephone set or function of the T/F apparatus 10, and two or more call signals can be registered for the facsimile machine or function of the apparatus 10. Each of the own call signals include three ON periods, and three OFF periods one of which is a LONG-OFF period, as shown in FIG. 33. Step S234 is followed by Step S235 and the following steps. Thus, this routine is ended, and the control of the CPU 120 goes back to Step S3 of the main control routine of FIG. 12.

Figure 16:
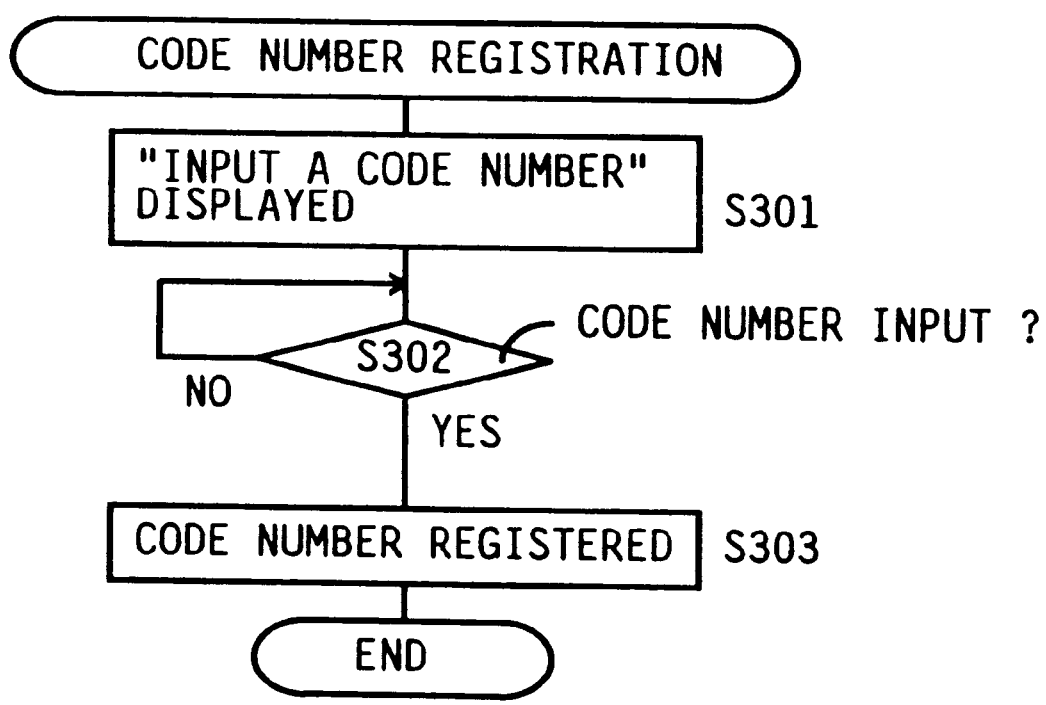
FIG. 16 is a flow chart representing a code-number registration routine according to which one or more code numbers is/are registered on the T/F apparatus of FIG. 1.

Next, the code-number registration routine of Step S233 of FIG. 15 will be described by reference to the flow chart of FIG. 16.

At Step S301, the CPU 120 controls the LCD 100 to display a message of "INPUT A CODE NUMBER". Step S301 is followed by Step S302 to judge whether a code number has been input in relation with the signal pattern of an own call signal being registered. The user can select and input, as a code number to be registered, an arbitrary number such as a one-digit number or a number identical with an own call number corresponding to the own call signal being registered. However, the user cannot use, as a code number, a number identical with a pre-scribed special number which is allotted to the non-registered-code-number related memory 144b. This special number can be used as a common number corresponding to one or more own call signals which have not been registered. In the present embodiment, this special number is handled as if it were a registered code number.

Step S301 is followed by Step S302 to judge whether one or more of the numeral keys 104 has or have been pushed to input a code number and thereafter the SET key 108 has been pushed to finally fix the inputting of the code number. If a positive judgment is made at Step S302, the control of the CPU 120 goes to Step s303 to store, in the input code-number memory 152, the code number thus input by the user.

Figure 17:
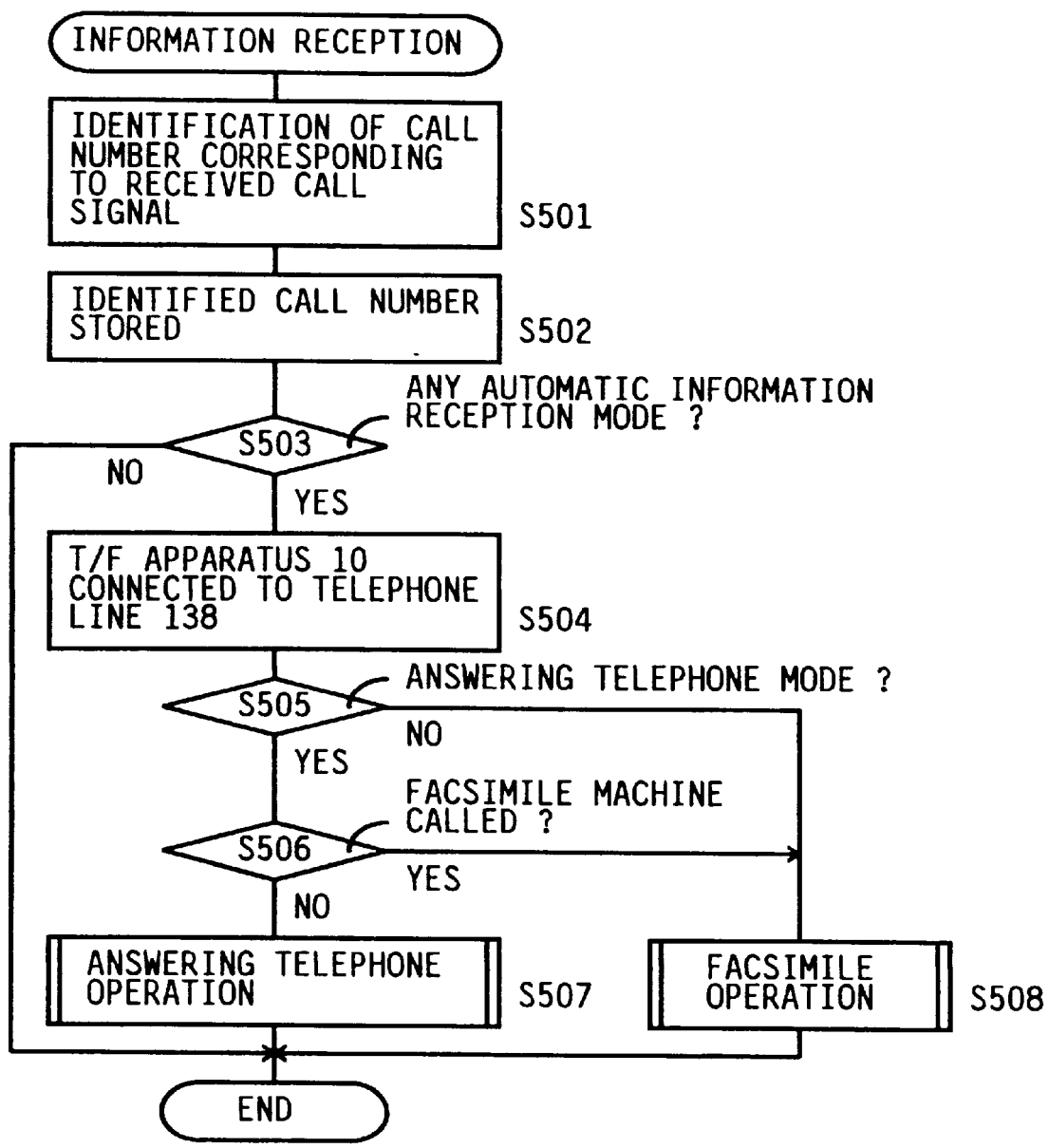
FIG. 17 is a flow chart representing an information reception routine according to which information is received by the T/F apparatus of FIG. 1.

Next, there will be described the information reception routine of Step S8 of the main control routine of FIG. 12, by reference to the flow chart of FIG. 17.

Initially, at Step S501, the CPU 120 of the computer 128 obtains the signal pattern of an own call signal which is received by the T/F apparatus 10 via the telephone line 138, in a manner similar to that described for the call-signal registration routine of Step S7 by reference to FIGS. 14 and 15. In this routine, however, the CPU 120 obtains, as the signal pattern or pattern data, the respective times of ON and OFF periods of one cycle of the own call signal unlike the call-signal registration routine wherein the respective patterns of two cycles of an own call signal are obtained. The thus obtained pattern of the received own call signal is compared with each of the respective patterns of the own call signals registered in the registered-code-number table memory 230, so that one of the registered code numbers which corresponds to the pattern of the received own call signal is identified. Hereinafter, this operation will be referred to as the identification of a call number.

If the pattern of the received own call signal is not identical with any of the signal patterns registered in the table memory 230, that is, if the T/F apparatus 10 is receiving an own call signal corresponding to one of the non-registered own call numbers thereof, the CPU 120 produces data indicating that the received own call signal has no corresponding registered code number.

Step S501 is followed by Step S502 to store the registered code number identified based on the received call signal at Step S501, in the identified code-number memory 140. If the received own call signal is a non-registered one, the CPU 120 stores the special number pre-allotted to the non-registered-code-number related memory 144b, in the identified code-number memory 140.

At the following Step S503, the CPU 120 refers to the selected mode memory 142 and judges whether one or more of various facsimile or telephone automatic information reception modes has or have been established on the T/F apparatus 10. The various facsimile automatic information reception modes and the answering telephone mode are the automatic information reception modes. Therefore, if one or more of the facsimile automatic information reception modes and the answering telephone mode has or have been established, a positive judgment is made at Step S503, so that the control of the CPU 120 goes to Step S504 to connect the T/F apparatus 10 to the telephone line 138. On the other hand, if none of the automatic information reception modes has been selected, a negative judgment is made at Step S503 and the current control cycle of this routine is ended.

Step S504 is followed by Step S505 to judge whether the answering telephone mode has been established. If a positive judgment is made at Step S505, the control of the CPU 120 goes to Step S506 to judge whether the received own call signal is calling the facsimile machine of the T/F apparatus 10, or calling the telephone set of the apparatus 10. If the facsimile machine is being called in the answering telephone mode and a positive judgment is made at Step S506, the control of the CPU 120 proceeds with Step S508, i.e., facsimile operation routine. On the other hand, if a negative judgment is made at Step S506, i.e., if the telephone set is being called, the control goes to Step S507, i.e., answering telephone routine. Following Step S508 or S507, the current control cycle of this routine is ended. If a negative judgment is made at Step S505, i.e. if the answering telephone mode has not been selected, the control goes to Step S508 to carry out the facsimile operation routine. In this case, too, the control cycle of this routine is ended.

Figure 18:
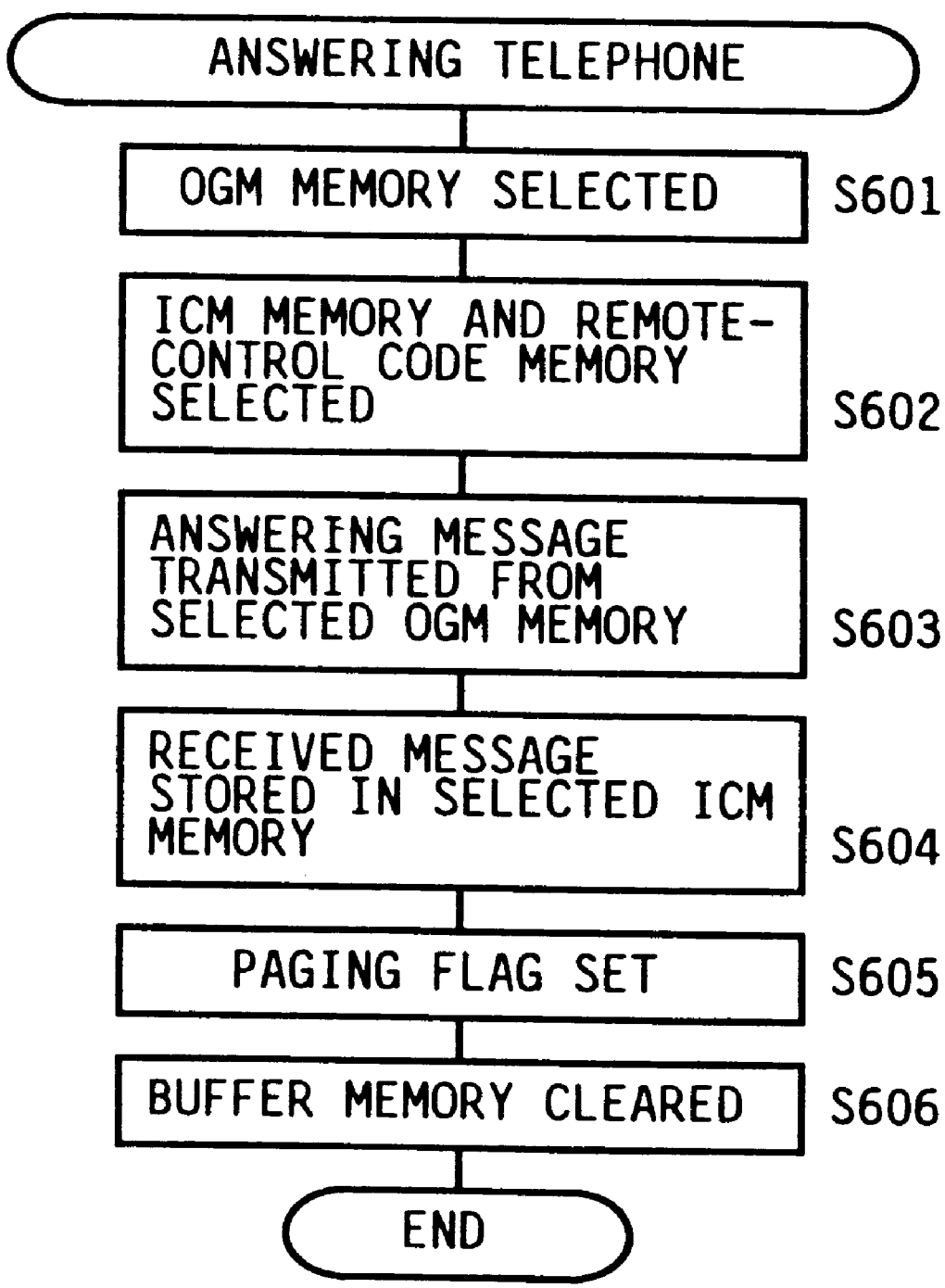
FIG. 18 is a flow chart representing an answering telephone routine according to which the T/F apparatus of FIG. 1 operates as an answering telephone set.

The answering telephone routine of Step S507 of FIG. 17 will be described by reference to the flow chart of FIG. 18.

At Step S601, the CPU 120 selects one of the answering message memories 172 which corresponds to the code number stored in the identified code-number memory 140, and stores the address of the selected memory 172 in a buffer memory (not shown) thereof. Step S602 is followed by Step S602 to selects one of the received message memories 174, and one of the remote-control code memories 180, each of which corresponds to the identified code number stored in the memory 140, and stores the respective addresses of the selected memories 174, 180 in the buffer memory.

At the following Step S803, the CPU 120 refers to the buffer memory, and reads an answering message (indicated at "OGM" in FIG. 18) from the selected answering message memory 172 corresponding to the identified code number. The CPU 120 additionally transmits the answering message to the calling telephone. While transmitting the answering message, the CPU 120 periodically judges whether a DTMF signal is being supplied to the T/F apparatus 10 from the calling telephone set. If the DTMF signal is received, the CPU 120 compares the received DTMF signal with a remote-control code stored in the selected remote-control code memory 180 corresponding to the identified code number. In the case where no DTMF signal is supplied or the received DTMF is different from the stored remote-control code, the T/F apparatus 10 continues to transmit the answering message. If the transmission of the answering message has been completed, the control of the CPU 120 goes to Step S604.

At Step S604, the CPU 120 refers to the buffer memory, and selects one of the received message memories 174 which corresponds to the identified code number. The CPU 120 stores a received message transmitted from the calling telephone set, in the selected memory 174. Step S604 is followed by Step S605 to set one of the paging flags 178 which corresponds to the identified code number, to an ON state thereof. At the following Step S606, the CPU 120 clears the buffer memory, and thus the current control cycle of this routine is ended.

Figure 19:
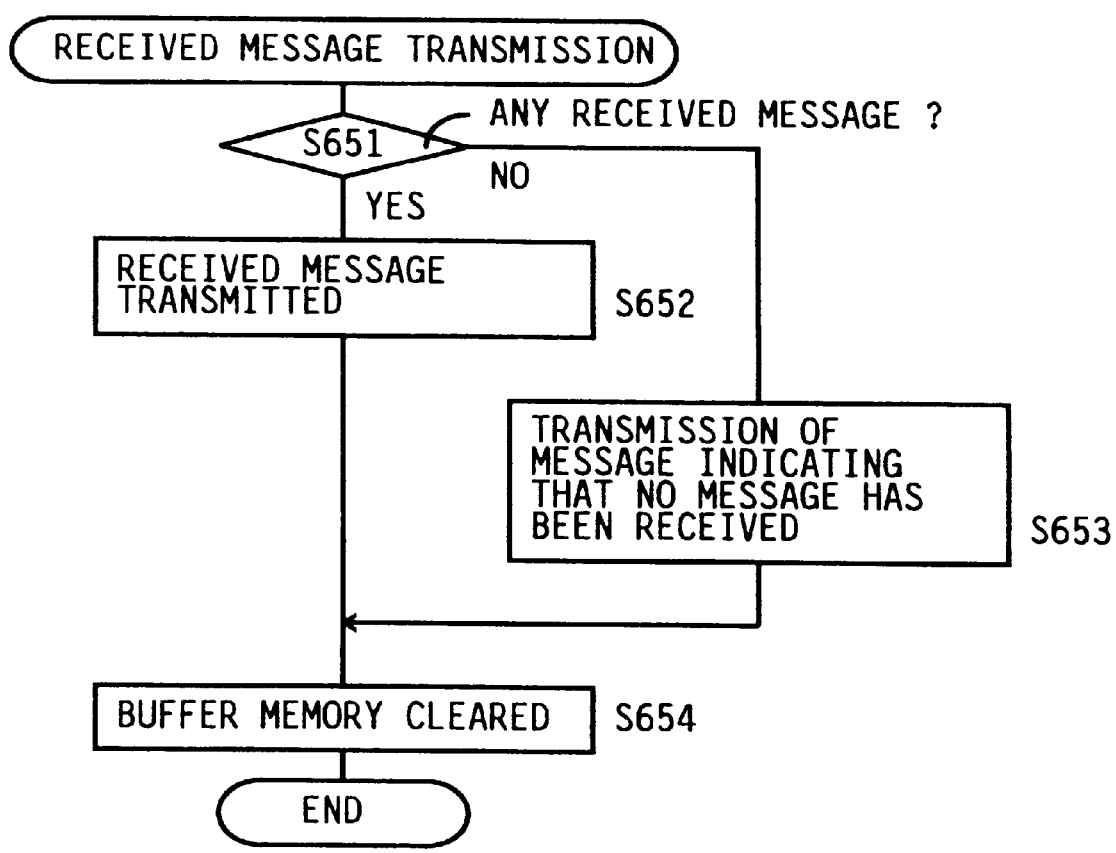
FIG. 19 is a flow chart representing a received-message transmission routine according to which a received message is transmitted by the T/F apparatus of FIG. 1.

On the other hand, if a DTMF signal is received by the T/F apparatus 10 while Step S603 is being carried out and the received DTMF signal is found to be identical with the remote-control code stored in the remote-control code memory 180 corresponding to the identified code number, the transmission of the answering message is interrupted, and the control of the CPU 120 proceeds with the received message transmission routine of FIG. 19.

First, at Step S651, the CPU 120 refers to the buffer memory which has stored the address of the received message memory 174 corresponding to the identified code number, and judges whether a received message or messages has or have been stored in the addressed memory 174. If a positive judgment is made at Step S651, the control goes to Step S652 to read the message or messages from the memory 174 and transmit the sound information to the calling telephone set. If a negative judgment is made at Step S651, the control goes to Step S653 to transmit a sound message indicating that no message has been received or stored. Step S652 or S653 is followed by Step s64 to clear the buffer memory of the RAM 122. Thus, the control cycle of this routine is finished.

Figure 20:
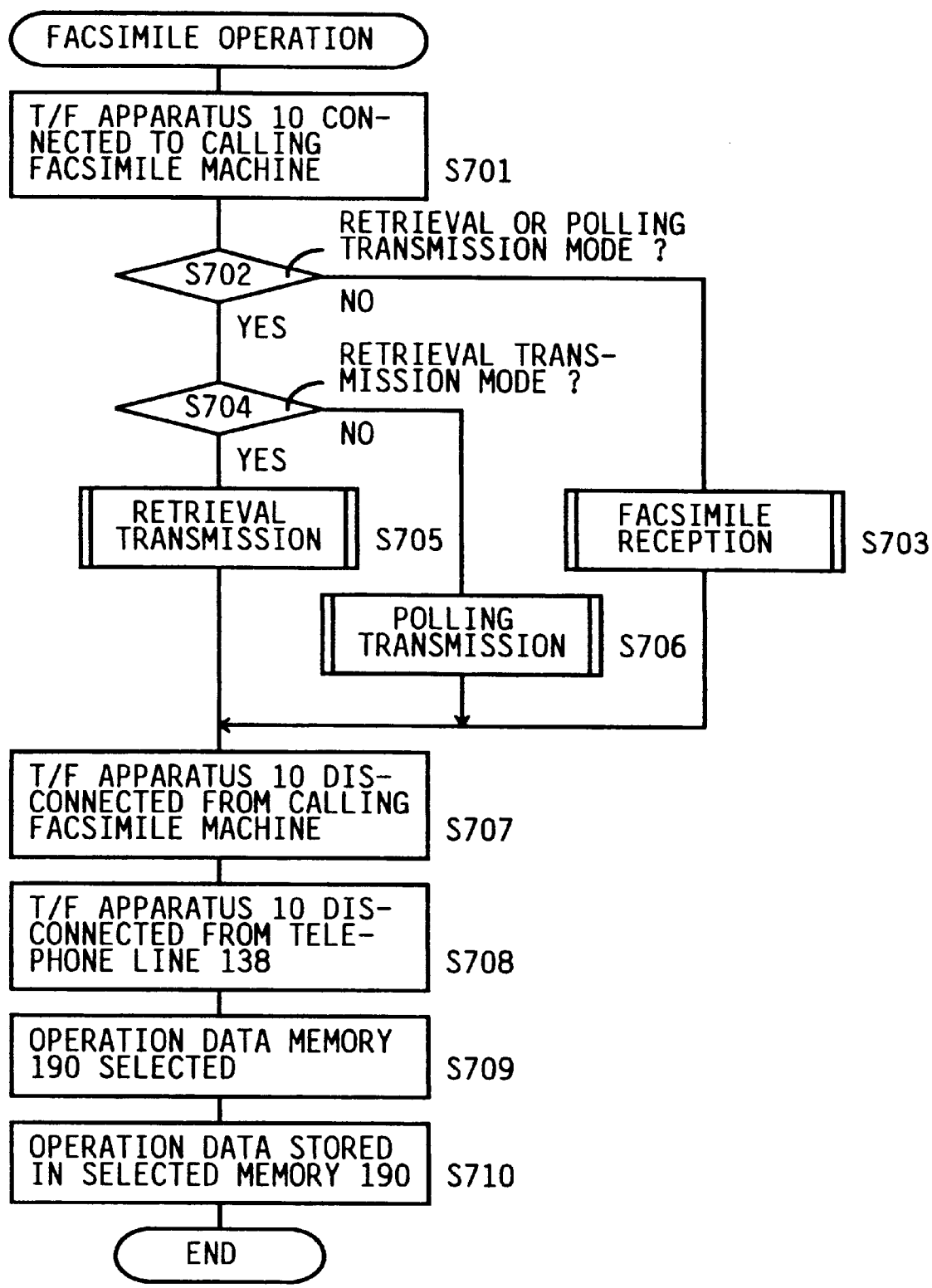
FIG. 20 is a flow chart representing a facsimile operation routine according to which the T/F apparatus of FIG. 1 operates as a facsimile machine.

Next, there will be described the facsimile operation routine of Step S508 of FIG. 17, by reference to the flow chart of FIG. 20.

At Step S701, the CPU 120 of the computer 128 connects the facsimile machine of the T/F apparatus 10 to the calling facsimile machine, according to a known facsimile-to-facsimile communication procedure. Step S701 is followed by Step S702 to refer to the selected mode memory 142 and judge whether one or both of the retrieval transmission mode and the polling transmission mode has or have been selected. If a positive judgment is made at Step S702, the control goes to Step S704 to judge whether the retrieval transmission mode has been selected. If a negative judgment is made at Step S702, the control goes to Step S703, i.e., facsimile reception routine of FIG. 21. Step S703 is followed by Step S707.

Figure 22:
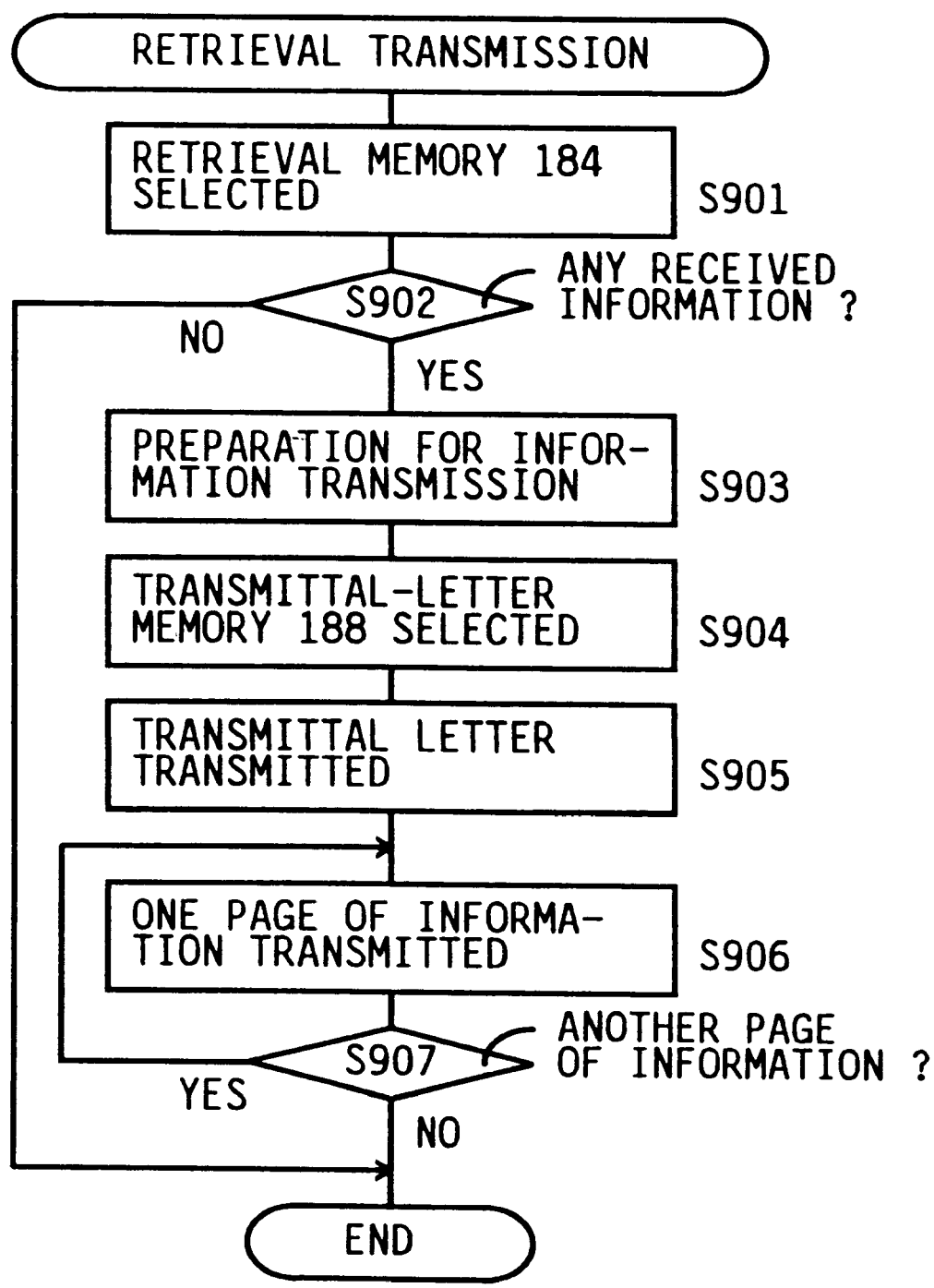
FIG. 22 is a flow chart representing a retrieval transmission routine according to which retrieval transmission is carried out by the T/F apparatus of FIG. 1.

If a positive judgment is made at Step S704, the control goes to Step S705, i.e., retrieval transmission routine of FIG. 22. Step S705 is followed by Step S707. On the other hand, if a negative judgment is made at Step S704, the control goes to Step S706, i.e., polling transmission routine of FIG. 23. Step S706 is followed by Step S707. At Step S707, the CPU 120 disconnects the T/F apparatus 10 from the calling facsimile machine and, at Step S708, the CPU 120 disconnects the T/F apparatus 10 from the telephone line 138.

At the following Step S709, the CPU 120 selects one of the operation-data memories 190 which corresponds to the code number identified based on the own call signal supplied to the T/F apparatus 10. Step S709 is followed by Step S710 to store operation data relating to the information reception or transmission of the facsimile machine of the apparatus 10. Thus, the control cycle of this routine is ended.

Figure 21:
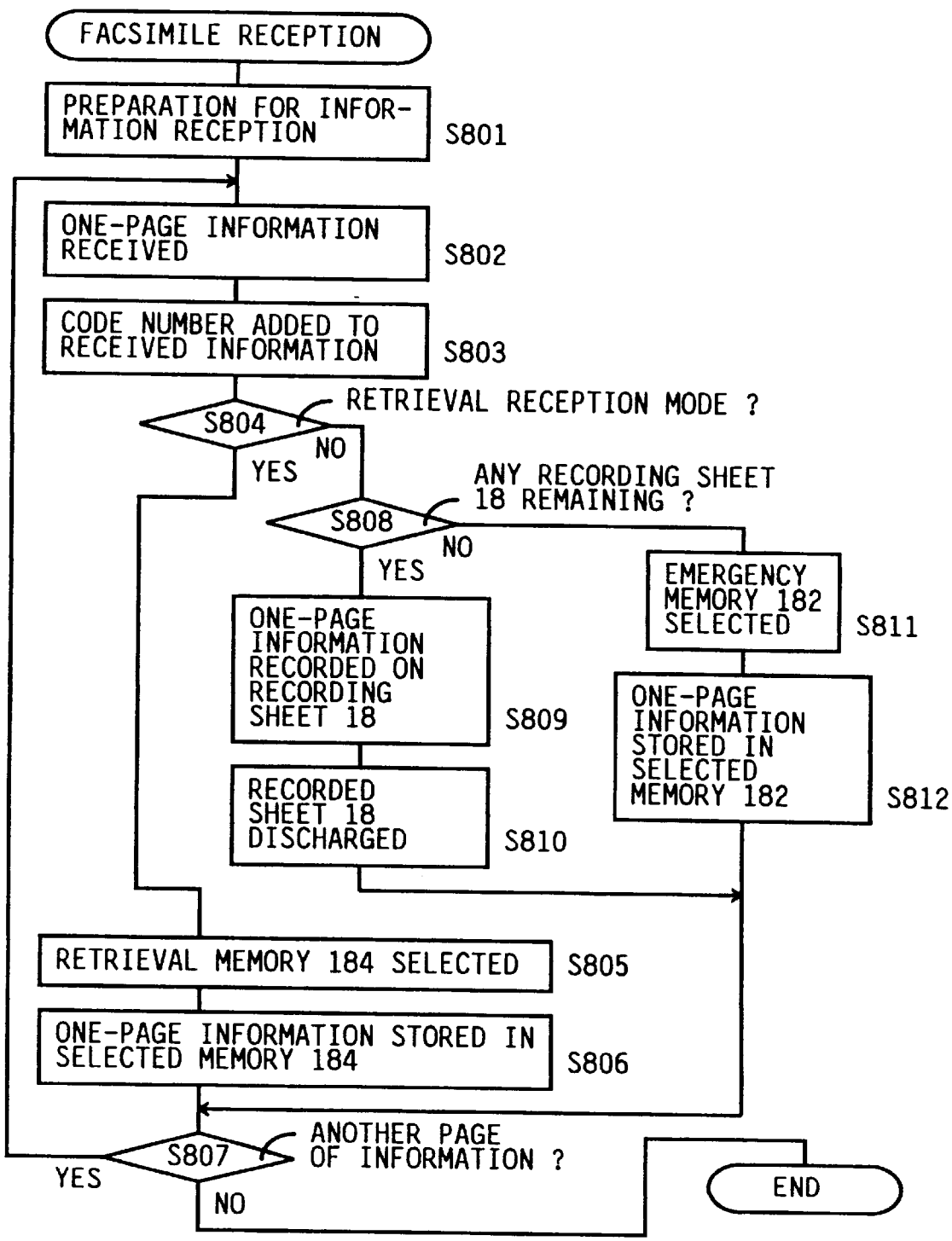
FIG. 21 is a flow chart representing a facsimile reception routine according to which image information is received by the T/F apparatus of FIG. 1.

Next, there will be described the facsimile reception routine of Step S703 of FIG. 20, by reference to the flow chart of FIG. 21.

At Step S801, the CPU 120 prepares for receiving information from the calling facsimile machine, according to a known facsimile information reception procedure. Step S801 is followed by Step S802 to store, in the reception memory 150, the received, coded image information corresponding to one page, i.e., one recording sheet 18. At the following Step S803, the CPU 120 adds image information representing the identified code number, to the image information stored in the reception memory 150. Since the received information is the coded information, the code-number information is coded in a coding method compatible with the received information. Step S803 is followed by Step S804 to judge whether the retrieval-permitting information storing mode ("retrieval" mode) has been selected. If a positive judgment is made at Step S804, the control goes to Step S805 and, on the other hand, if a negative judgement is made the control goes to Step S808. At Step S805, the CPU 120 selects one of the retrieval memories 184 which corresponds to the identified code number, and at Step S806 the CPU 120 stores the one-page coded information and the coded code-number information in the selected memory 184.

Meanwhile, at Step S808, the CPU 120 judges whether any recording sheet 18 remains in the sheet cassette 20, i.e., whether images can be recorded on a recording sheet 18. If a positive judgment is made at Step S808, the control goes to Step S809 to record the one-page image information on the recording sheet 18 and subsequently to Step S810 to discharge the image-recorded sheet 18 out of the T/F apparatus 10. At Step S808, a negative judgment is made, e.g., if the first sheet-end sensor 32 does not detect the leading end of a recording sheet 18 for a predetermined time duration, e.g., 10 seconds, after the CPU 120 commands the sheet-supplying roller 22 to take a recording sheet 18 from the sheet cassette 20.

On the other hand, if a negative judgment is made at Step S808, i.e., if no recording sheet 18 remains in the sheet cassette 20, the control goes to Step S811 to select one of the emergency memories 182 which corresponds to the identified code number, and then to Step S812 to store the one-page coded information and the coded code-number information in the selected memory 182.

Step S806, S810, or S812 is followed by Step S807 to judge whether the T/F apparatus has received another page of information. If a positive judgment is made at Step S807, the control of the CPU 120 goes back to Step S802 and the following steps and, on the other hand, if a negative judgment is made the control cycle of this routine is ended.

The retrieval transmission routine of Step S705 of FIG. 20 will be described by reference to the flow chart of FIG. 22.

At Step S901, the CPU 120 selects one of the retrieval-permitting information storing ("retrieval") memories 184 which corresponds to the identified code number stored in the identified code-number memory 140. At the following Step S902, the CPU 120 judges whether any received information has been stored in the selected memory 184. If no information has been stored, i.e., if a negative judgment is made at Step S902, then the current control cycle of this routine is ended. On the other hand, if a positive judgment is made at Step S902, the control of the CPU 120 goes to Step S903 to prepare for transmitting image information according to a known facsimile information transmission procedure. The CPU 120 operates for converting the received information stored in the selected memory 184 by the coding method determined in the information transmission procedure, and storing the converted or coded information in the transmission memory 148. More specifically, the CPU 120 operates for (a) decoding the received information stored in the selected memory 184, into decoded image information, (b) temporarily storing the image information in the recording memory 154, (c) copying and transferring the image information from the recording memory 154 into the reading memory 156, (d) coding the image information by the determined coding method, and (e) storing the coded image information in the transmission memory 148.

At Step S904, the CPU 120 selects one of the transmittal-letter memories 188 which corresponds to the identified code number. Step S904 is followed by Step S905 to code the image information representing a letter of transmittal stored in the selected memory 188 and transmits the coded information to the calling facsimile machine. The coding of the image information is carried out by the same coding method as that determined at Step S903. At the following Step S906, the CPU 120 operates for transmitting one page of information stored in the selected retrieval memory 184. Step S906 is followed by Step S907 to judge whether another page of information remains in the selected retrieval memory 184. If a negative judgment is made at Step S907, the current control cycle of this routine is finished. Since the received information stored in each retrieval memory 184 includes the information representing the identified code number which information has been added at Step 803 of the facsimile reception routine of FIG. 21, the code-number information is added to each page of information transmitted from the T/F apparatus 10.

Figure 23:
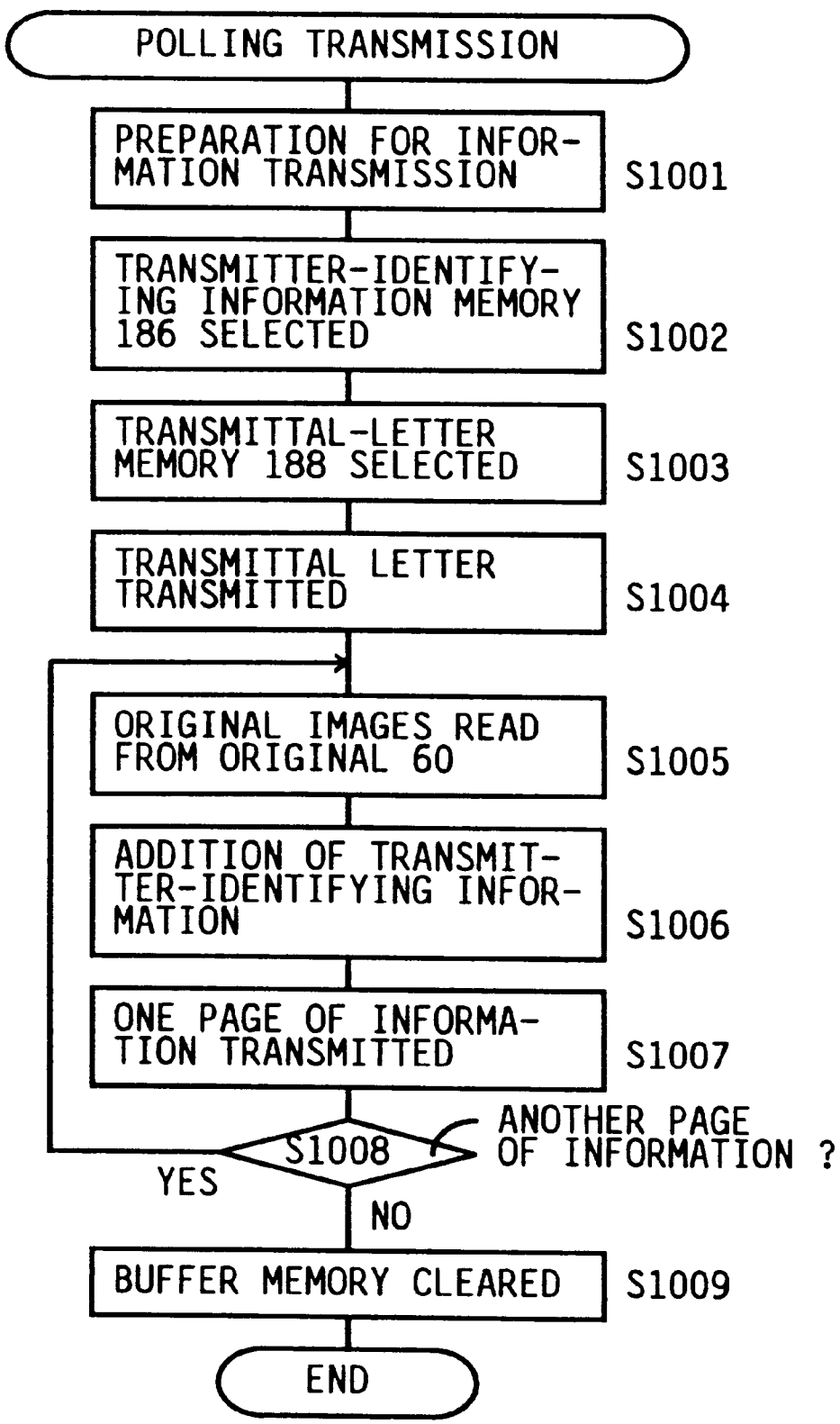
FIG. 23 is a flow chart representing a polling transmission routine according to which polling transmission is carried out by the T/F apparatus of FIG. 1.

The polling transmission routine of Step S706 of FIG. 20 will be described by reference to the flow chart of FIG. 23.

At Step S1001, the CPU 120 prepares for transmitting image information according to a known facsimile information transmission procedure. At the following Step S1002, the CPU 120 selects one of the transmitter-identifying information memories 186 which corresponds to the identified code number stored in the identified code-number memory 140, and stores the address of the selected memory 186 in the buffer memory thereof. Step S1002 is followed by Step S1003 to select one of the transmittal-letter memories 188 which corresponds to the identified code number.

At the following Step S1004, the CPU 120 operates for coding the image information representing a letter of transmittal stored in the selected memory 188, and transmits the coded information to the calling facsimile machine. Step S1004 is followed by Step S1005 to read the original images from the original 60 set on the original support 64, and store the read transmission information in the reading memory 156. At the following Step S1006, the CPU 120 operates for reading the transmitter-identifying information stored in the selected memory 186, based on the address of the selected memory 186 stored in the buffer memory, and adding the read information to the information stored in the reading memory 156. Step S1006 is followed by Step S1007 to code, using an appropriate one of the coding devices 272, 274, 276, the information stored in the reading memory 156 and store the coded information in the transmission memory 148. Then, one page of the information is transmitted to the calling facsimile machine.

At the following Step S1008, the CPU 120 judges whether any original sheet 60 remains on the original support 64, based on the detection signal supplied from the original sensor 68. If a positive judgment is made at Step S1008, the control of the CPU returns to Step S1005 and the following steps. On the other hand, if a negative judgment is made, the control goes to Step S1009 to clear the buffer memory. Thus, the control cycle of this routine is ended.

Next, the paging routine of Step S9 of the main control routine of FIG. 12 will be described by reference to the flow chart of FIG. 24.

At Step S1101, the CPU 120 selects one of the paging call-number memories 176 which corresponds to the identified code number stored in the identified code-number memory 140, and stores the address of the selected memory 176 in the buffer memory. Step S1101 is followed by Step S1102 to judge whether a paging call number has been stored in the selected memory 176. If a positive judgment is made at Step S1102, the control of the CPU 120 goes to Step S1103 to judge whether the paging flag 178 corresponding to the selected memory 176 has been set to the ON state thereof. If a positive judgment is made at Step S1103, the control goes to Step S1104 to read the paging call number stored in the selected memory 176, based on the address of the selected memory 176 stored in the buffer memory, and call a communication apparatus having the read paging call number. Step S1104 is followed by Step S1105 to issue a beep sound when the communication apparatus is actually called. On the other hand, if a negative judgment is made at Step S1102 or Step S1103, or if Step S1105 finishes, the control of the CPU 120 goes to Step S1106 to clear the contents of the buffer memory. Thus, the current control cycle of this routine is finished.

Figure 25:
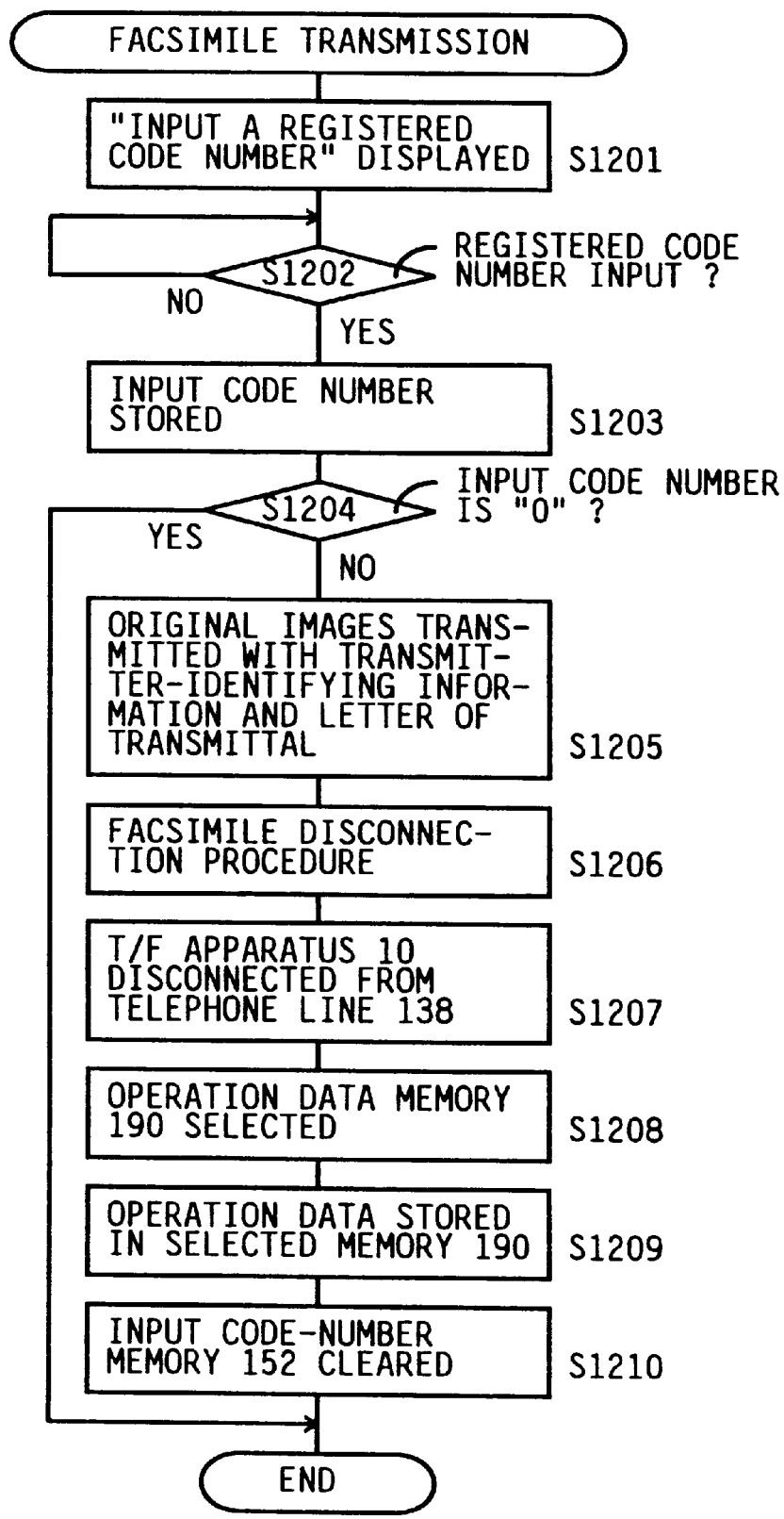
FIG. 25 is a flow chart representing a facsimile transmission routine according to which image information is transmitted by the T/F apparatus of FIG. 1.

The facsimile transmission routine of Step S13 of the main control routine of FIG. 12 will be described by reference to FIG. 25.

At Step S1201, the CPU 120 operates for displaying, on the LCD 100, a message "INPUT A REGISTERED CODE NUMBER". At the following Step S1202, the CPU 120 judges whether an appropriate one or ones of the numeral keys 104 has or have been pushed to input a code number which has been registered on the T/F apparatus 10. If the user inputs a registered code number and pushes the SET key 108 to finally fix the input code number, i.e., if a positive judgment is made at Step S1202, the control of the CPU 120 goes to Step S1203 to store the input code number in the input code-number memory 152. Step S1203 is followed by Step S1204 to judge whether the input code number is zero. The numeral "O" is used to cancel the input code number. If a positive judgment is made at Step S1204, the current control cycle of this routine is ended. On the other hand, if a negative judgment is made at Step S1204, the control goes to Step S1205 to transmit image information representing the original images of the original 60 currently set on the original support 64, together with the letter of transmittal and the transmitter-identifying information each of which corresponds to the input code number stored in the input code-number memory 152, in the same manner as described above for the polling transmission routine of FIG. 23. When no original sheet 60 is left on the original support 64, the control of the CPU 120 goes to Step S1206 to proceed a facsimile disconnection procedure to disconnect the facsimile machine of the T/F apparatus 10 from the called facsimile machine. Then, at Step S1207, the CPU 120 operates for disconnecting the apparatus 10 from the telephone line 138.

Step S1207 is followed by Step S1208 to select one of the operation data memories 190 which corresponds to the input code number stored in the input code-number memory 152. At the following Step S1209, the CPU 120 stores the operation data relating to this information transmission, in the selected memory 190. Step S1209 is followed by Step S1210 to clear the input code-number memory 152. Thus, the current control cycle is ended.

Figure 26:
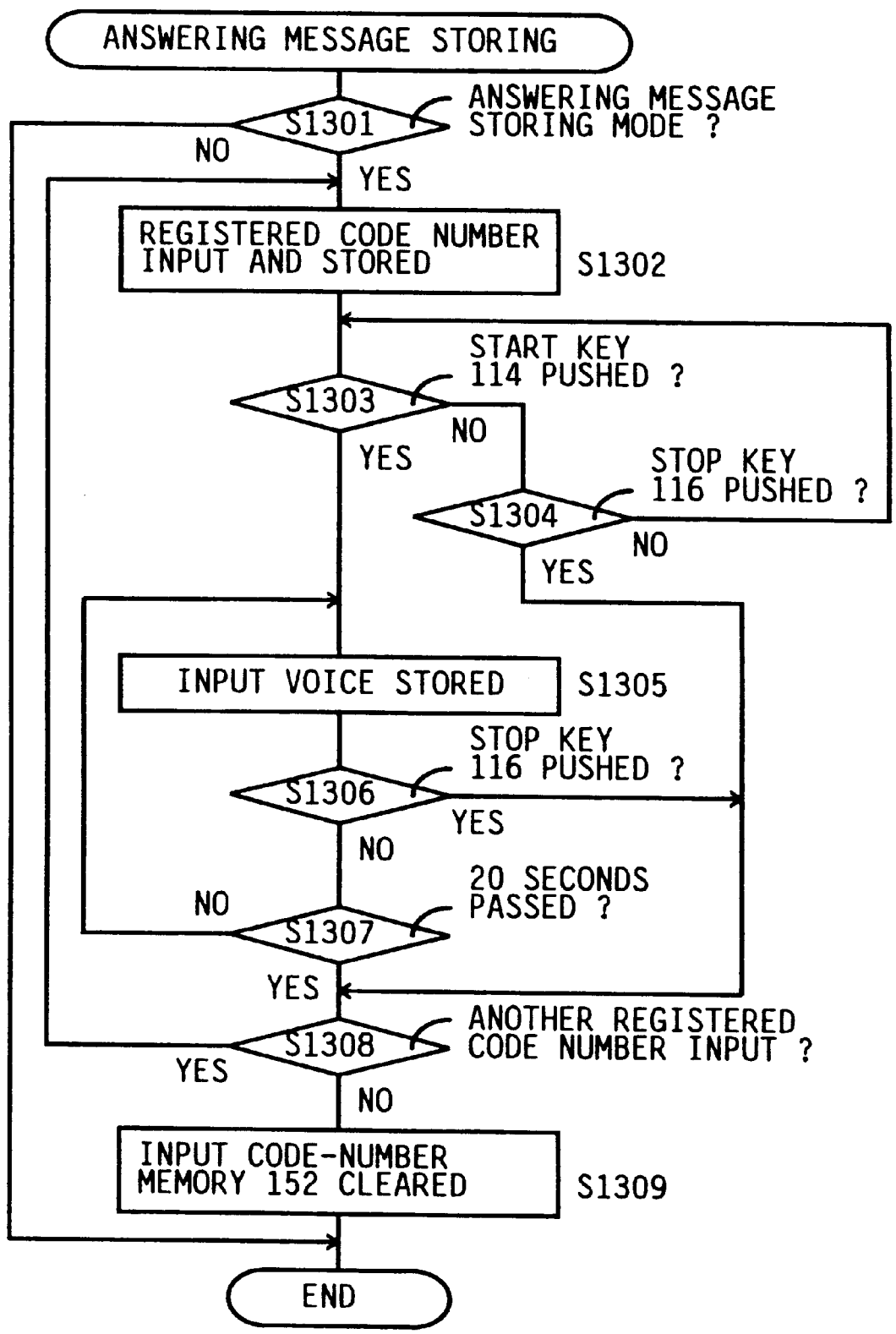
FIG. 26 is a flow chart representing an answering message storing routine according to which one or more answering messages is/are stored in the T/F apparatus of FIG. 1.

Next, the answering message storing routine of Step S14 of the main control routine of FIG. 12 will be described by reference to the flow chart of FIG. 26.

At Step S1301, the CPU 120 judges whether the answering message storing mode has been selected on the T/F apparatus 10, based on the mode data stored in the selected mode memory 142. If a positive judgment is made at Step S1301, the control of the CPU 120 goes to Step S1302 to wait for the user to input a registered code number into the apparatus 10. When the user inputs a registered code number and pushes the SET key 108, the CPU 120 stores the input code number in the input code-number memory 152. Step S1302 is followed by Step S1303 to judge whether the START key 114 has been pushed to start recording or storing an answering voice message. If a positive judgment is made at Step S1303, the control goes to Step S1305 and, on the other hand, if a negative judgment is made, the control goes to Step S1304 to judge whether the STOP key 116 has been pushed. If a positive judgment is made at Step S1304, the control goes to Step S1308 and, on the other hand, if a negative judgment is made the control goes back to Step S1303.

At Step S1305, the CPU 120 causes a timer (not shown) to start measuring a time which lapses after the START key 114 is pushed at Step S1303. Additionally, the CPU 120 selects one of the answering message memories 172 which corresponds to the input code number stored in the input code-number memory 152, and stores an answering voice message which has been input by the user according to instructions displayed on the LCD 100. The T/F apparatus 10 has a microphone (not shown) for detecting an answering voice message produced by the user. In the case where an old answering message has already been stored in the selected memory 172, the newly stored message replaces the old message stored in the memory 172, i.e., the old message is automatically erased.

At Step S1306, the CPU 120 judges whether the STOP key 116 has been pushed. If a positive judgment is made at Step S1306, the control goes to Step S1308 and, on the other hand, if a negative judgment is made, the control goes to Step S1307 to judge whether twenty seconds have lapsed after the START key 114 has been pushed at Step S1303, based on the time measured by the timer. If a positive judgment is made at Step S1307, the storing of the answering message is ended, and the control of the CPU 120 goes to Step S1308. On the other hand, if a negative judgment is made at Step S1306, the control goes back to Step S1305 and the following steps.

At Step S1308, the CPU 120 judges whether another registered code number has been input to store a corresponding answering message. If a positive judgment is made at Step S1308, the control goes back to Step S1302 to store the new code number, in place of the old code number, in the input code-number memory 152. Step S1302 is followed by Step S1303 and the other steps. If a negative judgment is made at Step S1308, the control of the CPU 120 goes to Step S1309 to clear the input code-number memory 152. Thus, the current control cycle of this routine is ended.

Figure 27:
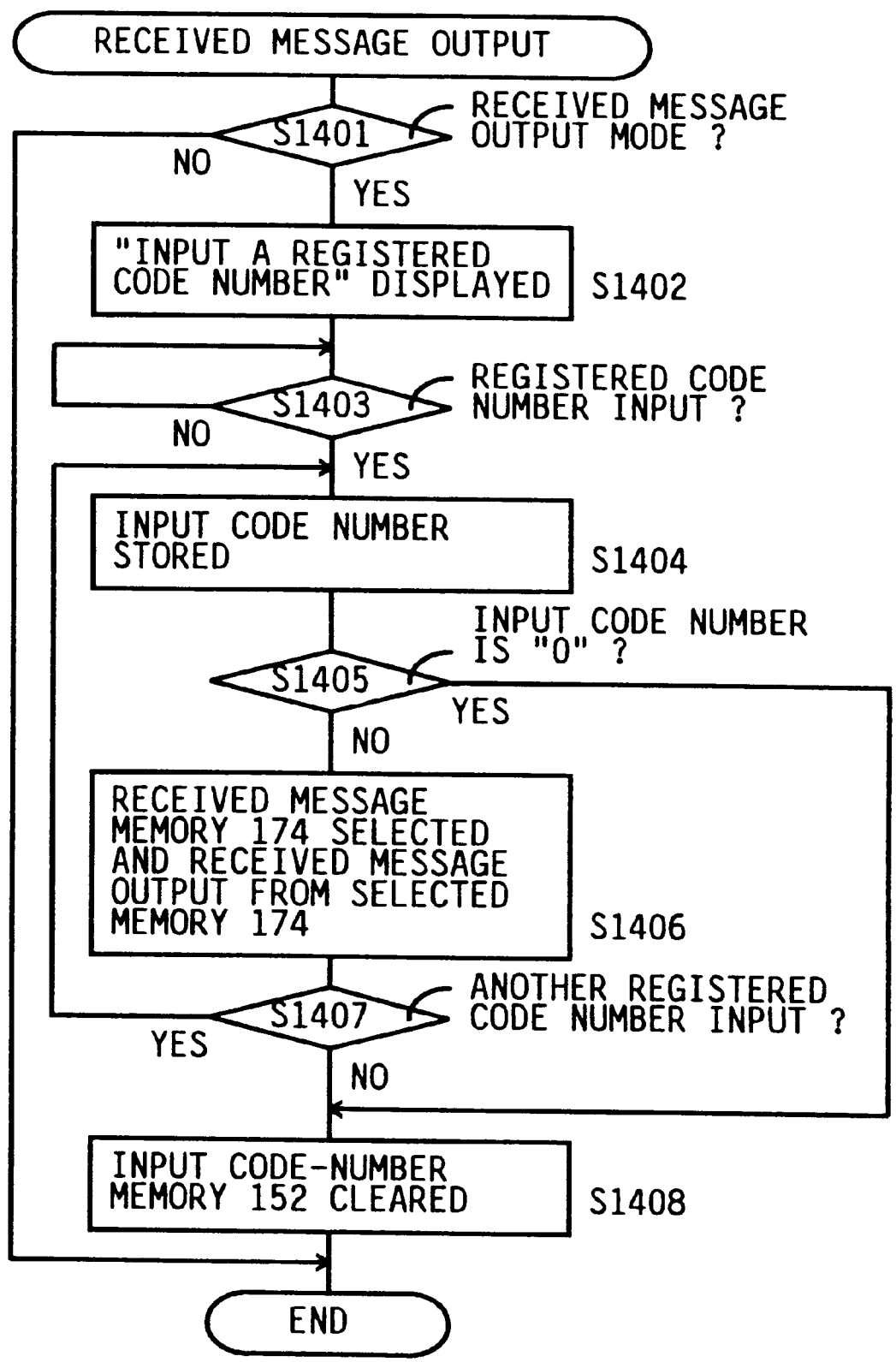
FIG. 27 is a flow chart representing a received-message output routine according to which one or more received-message is/are output from the T/F apparatus of FIG. 1.

Next, the received message output routine of Step S15 of the main control routine of FIG. 12 will be described by reference to the flow chart of FIG. 27.

At Step S1401, the CPU 120 judges whether the received message output mode has been selected on the T/F apparatus 10, based on the mode data stored in the selected mode memory 142. If a positive judgment is made at Step S1401, the control of the CPU 120 goes to Step S1402 to display a message "INPUT A REGISTERED CODE NUMBER" on the LCD 100. Step S1402 is followed by Step S1403 to judge whether the user has input a registered code number into the apparatus 10. If the user inputs a registered code number using the numeral keys 104 and then pushes the SET key 108, i.e., if a positive judgment is made at Step S1403, the control of the CPU 120 goes to Step S1404 to store the input code number in the input code-number memory 152. Step S1404 is followed by Step S1405 to judge whether the input code number is zero. If a positive judgment is made at Step S1405, the control goes to Step S1408 and, on the other hand, if a negative judgment is made, the control goes to Step S1406 to select one of the received message memories 174 which corresponds to the code number stored in the input code-number memory 152, and read the received message from the selected memory 174. The thus read voice message is output or reproduced by the speaker 136 of the T/F apparatus 10, so that the user can hear the output voice message. Step S1406 is followed by Step S1407 to judge whether another code number has been input. If a positive judgment is made at Step S1407, the control goes back to Step S1404 to store the new code number, in place of the old code number, in the input code-number memory 152. Step S1404 is followed by Step S1405 and the other steps. If a negative judgment is made at Step S1407, the control of the CPU 120 goes to Step S1408 to clear the input code-number memory 152. Thus, the current control cycle of this routine is finished.

Figure 28:
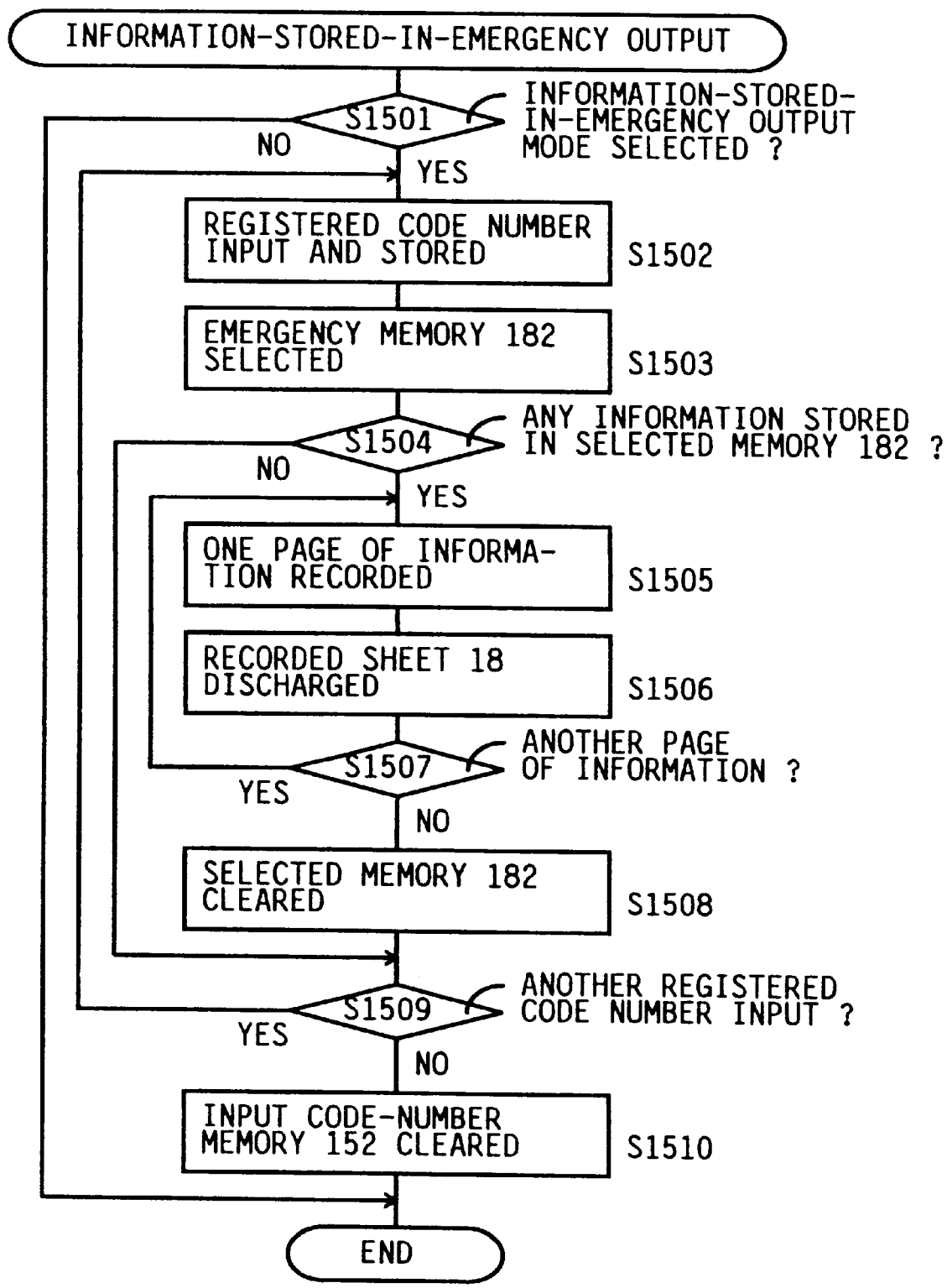
FIG. 28 is a flow chart representing an information-stored-in-emergency output routine according to which one or more batches of information stored in emergency is/are output from the T/F apparatus of FIG. 1.

The information-stored-in-emergency output routine of Step S16 of the main control routine of FIG. 12 will be described by reference to the flow chart of FIG. 28.

At Step S1501, the CPU 120 judges whether the information-stored-in-emergency output mode has been selected on the T/F apparatus 10, based on the mode data stored in the selected mode memory 142. If a positive judgment is made at Step S1501, the control of the CPU 120 goes to wait for the user to input a registered code number through operation of the keyboard 102 into the apparatus 10. If the user inputs a registered code number using the numeral keys 104 and then pushes the SET key 108, the CPU 120 operates for storing the input code number in the input code-number memory 152. Step S1502 is followed by Step S1503 to select one of the emergency memories 182 which corresponds to the input code number stored in the input code-number memory 152. At the following Step S1504, the CPU 120 judges whether any information has been stored in the selected memory 182. If a positive judgment is made at Step S1504, the control of the CPU 120 goes to Step S1505 and, on the other hand, if a negative judgment is made, the control goes to Step S1509. At Step S1505, the CPU 120 operates for recording one page of information stored in the selected memory 182, on a recording sheet 18 supplied from the sheet cassette 20. Step S1505 is followed by Step S1506 to discharge the information-recorded sheet 18 into the sheet tray 54 out of the T/F apparatus 10. At the following Step S1507, the CPU 120 judges whether another page of information remains in the selected memory 182. If a positive judgment is made at Step S1507, the control of the CPU 120 goes back to Step S1505 and the following steps and, on the other hand, if a negative judgment is made at Step S1507, the control goes to Step S1508 to clear or initialize the selected memory 182. While the image information stored in the selected memory 182 is recorded on the recording sheet or sheets 18, the occurrence of any recording abnormality is monitored by the computer 128 according to a pre-stored algorithm (not shown). If an abnormality occurs, the selected memory 182 is not initialized. In this case, the CPU 120 does not erase the information stored in the selected memory 182, and proceeds with Step S1509. At Step S1509, the CPU 120 judges whether another registered code number has been input. If a positive judgment is made at Step S1509, the control goes back to Step S1502 to store the new code number, in place of the old code number, in the input code-number memory 152. Step S1502 is followed by Step S1503 and the following steps. If a negative judgment is made at Step S1509, the control of the CPU 120 goes to Step S1510 to clear the input code-number memory 152. Thus, the current control cycle of this routine is ended.

Figure 29:
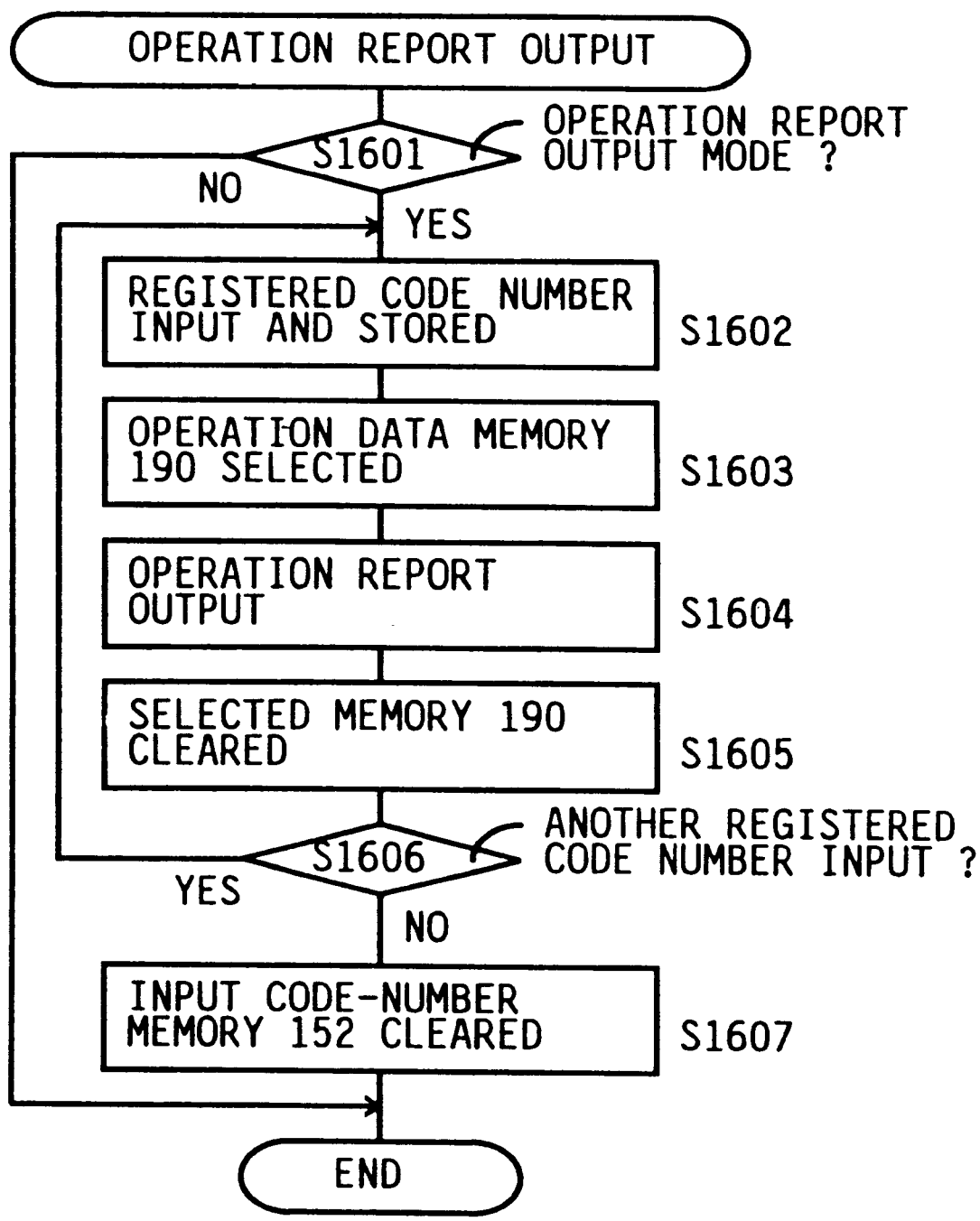
FIG. 29 is a flow chart representing an operation report output routine according to which an operation report is output from the T/F apparatus of FIG. 1.

Next, the operation report output routine of Step S17 of the main control routine of FIG. 12 will be described by reference to the flow chart of FIG. 29.

At Step S1601, the CPU 120 judges whether the operation report output mode has been selected on the T/F apparatus 10, based on the mode data stored in the selected mode memory 142. If a positive judgment is made at Step S1601, the control of the CPU 120 goes to Step S1602 to wait for the user to input a registered code number through operation of the keyboard 102 into the apparatus 10 according to instructions displayed on the LCD 100. If the user inputs a registered code number using the numeral keys 104 and then pushes the SET key 108, the CPU 120 operates for storing the input code number in the input code-number memory 152. Step S1602 is followed by Step S1603 to select one of the operation data memories 190 which corresponds to the input code number stored in the input code-number memory 152. At the following Step S1604, the CPU 120 operates for recording the operation data stored in the selected memory 190, on a recording sheet 18 supplied from the sheet cassette 20, and discharging the data-recorded sheet 18 out of the T/F apparatus 10. Step S1604 is followed by Step S1605 to clear the selected memory 190. Step S1605 is followed by Step S1606 to judge whether another registered code number has been input. If a positive judgment is made at Step S1606, the control goes back to Step S1602 to store the new code number, in place of the old code number, in the input code-number memory 152. Step S1602 is followed by Step S1603 and the following steps. If a negative judgment is made at Step S1606, the control of the CPU 120 goes to Step S1607 to clear the input code-number memory 152. Thus, the current control cycle of this routine is finished.

In addition, the paging call-number storing routine of Step S18 of the main control routine of FIG. 12 will be described by reference to the flow chart of FIG. 30.

At Step S1701, the CPU 120 judges whether the paging call-number storing mode has been selected on the T/F apparatus 10, based on the mode data stored in the selected mode memory 142. If a positive judgment is made at Step S1701, the control of the CPU 120 goes to Step S1702 to wait for the user to input a registered code number into the apparatus 10 according to instructions displayed on the LCD 100. If the user inputs a registered code number using the numeral keys 104 and then pushes the SET key 108, the CPU 120 operates for storing the input code number in the input code-number memory 152. Step S1702 is followed by Step S1703 to select one of the paging call-number memories 176 which corresponds to the input code number stored in the input code-number memory 152.

At the following Step S1704, the CPU 120 waits for the user to input a code number of a communication apparatus to be paged, into the selected memory 176, according to instructions displayed on the LCD 100. For example, the numeral keys 104 are used to input a paging code number. Step S1704 is followed by Step S1705 to judge whether another registered code number has been input. If a positive judgment is made at Step S1705, the control goes back to Step S1702 to store the new code number, in place of the old code number, in the input code-number memory 152. Step S1702 is followed by Step S1703 and the following steps. If a negative judgment is made at Step S1705, the control of the CPU 120 goes to Step S1706 to clear the input code-number memory 152. Thus, the current control cycle of this routine is ended.

Figure 31:
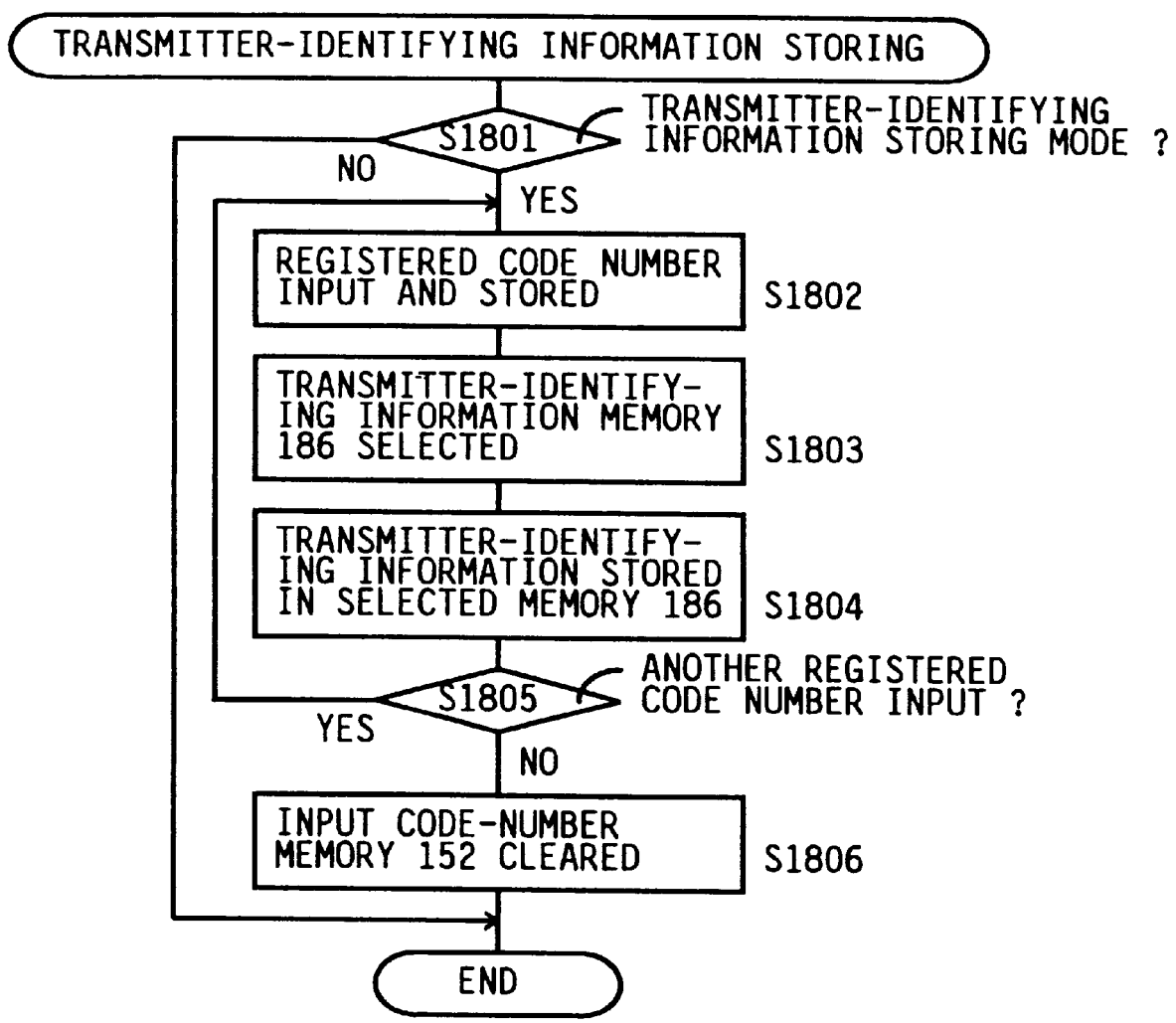
FIG. 31 is a flow chart representing a transmitter-identifying information storing routine according to which one or more batches of transmitter-identifying information is/are stored in the T/F apparatus of FIG. 1.

Next, the transmitter-identifying information storing routine of Step S19 of the main control routine of FIG. 12 will be described by reference to the flow chart of FIG. 31.

At Step S1801, the CPU 120 judges whether the transmitter-identifying information storing mode has been selected on the T/F apparatus 10, based on the mode data stored in the selected-mode memory 142. If a positive judgment is made at Step S1801, the control of the CPU 120 goes to Step S1802 to wait for the user to input a registered code number into the apparatus 10. If the user inputs a registered code number using the numeral keys 104 and then pushes the SET key 108, the CPU 120 operates for storing the input code number in the input code-number memory 152. Step S1802 is followed by Step S1803 to select one of the transmitter-identifying information memories 186 which corresponds to the input code number stored in the input code-number memory 152.

At the following Step S1804, the CPU 120 waits for the user to input a batch of transmitter-identifying information, into the selected memory 186, according to instructions displayed on the LCD 100. For example, the numeral keys 104 are used to input, as a transmitter-identifying information, the same number as the input code number, or the same number as the own call number corresponding to the input code number. Step S1804 is followed by Step S1805 to judge whether another registered code number has been input. If a positive judgment is made at Step S1805, the control goes back to Step S1802 to store the new code number, in place of the old code number, in the input code-number memory 152. Step S1802 is followed by Step S1803 and the following steps. If a negative judgment is made at Step S1805, the control of the CPU 120 goes to Step S1806 to clear the input code-number memory 152. Thus, the current control cycle of this routine is ended.

Figure 32:
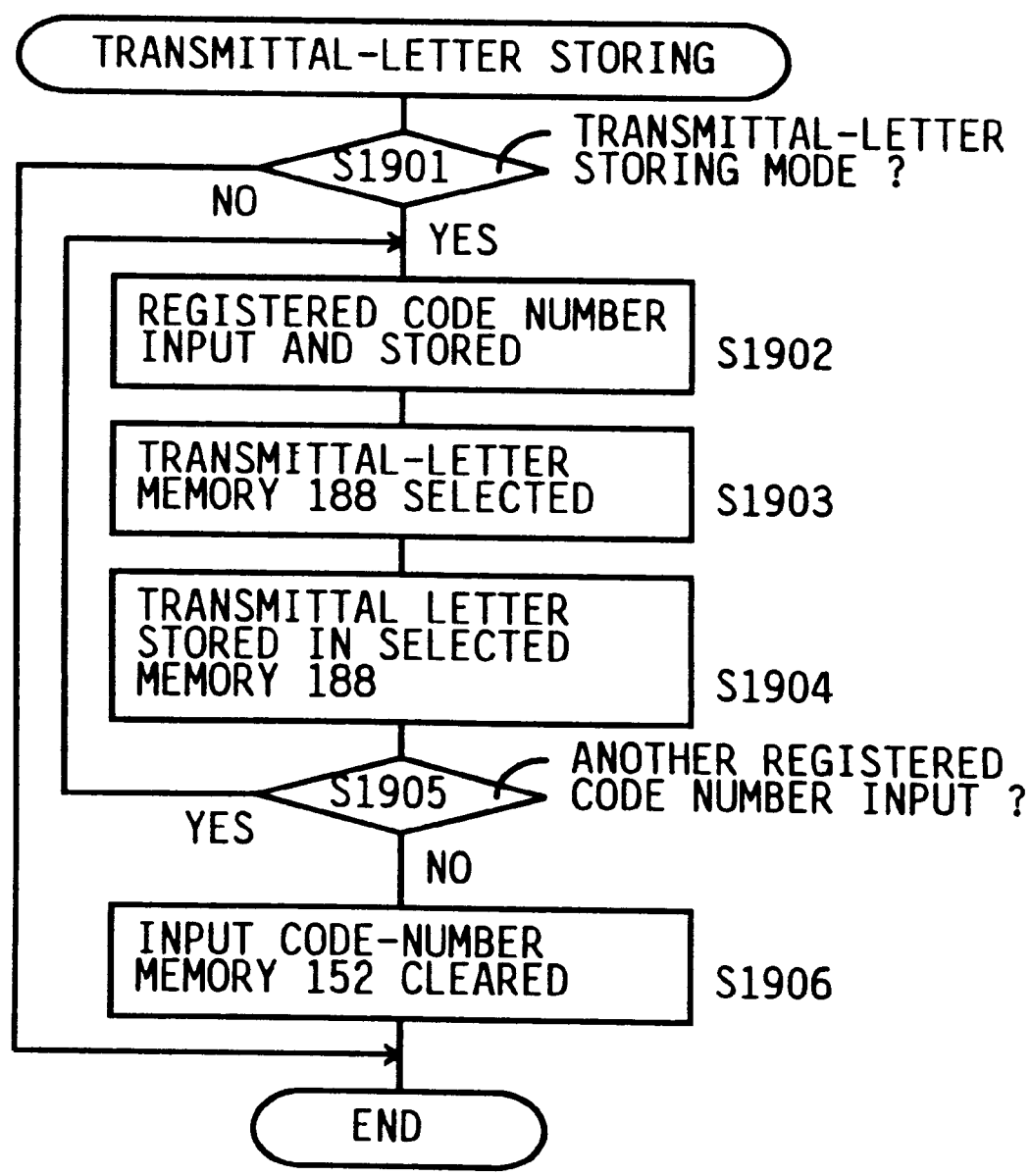
FIG. 32 is a flow chart representing a transmittal-letter storing routine according to which one or more transmittal letters is/are stored in the T/F apparatus of FIG. 1.

Furthermore, the transmittal-letter storing routine of Step S20 of the main control routine of FIG. 12 will be described by reference to the flow chart of FIG. 32.

At Step S1901, the CPU 120 judges whether the transmittal-letter storing mode has been selected on the T/F apparatus 10, based on the mode data stored in the selected mode memory 142. If a positive judgment is made at Step S1901, the control of the CPU 120 goes to Step S1902 to wait for the user to input a registered code number into the apparatus 10. If the user inputs a registered code number using the numeral keys 104 and then pushes the SET key 108, the CPU 120 operates for storing the input code number in the input code-number memory 152. Step S1902 is followed by Step S1903 to select one of the transmittal-letter memories 188 which corresponds to the input code number stored in the input code-number memory 152.

At the following Step S1904, the CPU 120 waits for the user to input a letter of transmittal into the selected memory 186, according to instructions displayed on the LCD 100. The reading device 62 is controlled to read original images from an original letter of transmittal. Step S1904 is followed by Step S1905 to judge whether another registered code number has been input. If a positive judgment is made at Step S1905, the control goes back to Step S1902 to store the new code number, in place of the old code number, in the input code-number memory 152. Step S1902 is followed by Step S1903 and the other steps. If a negative judgment is made at Step S1905, the control of the CPU 120 goes to Step S1906 to clear the input code-number memory 152. Thus, the current control cycle of this routine is ended.

Figure 34:
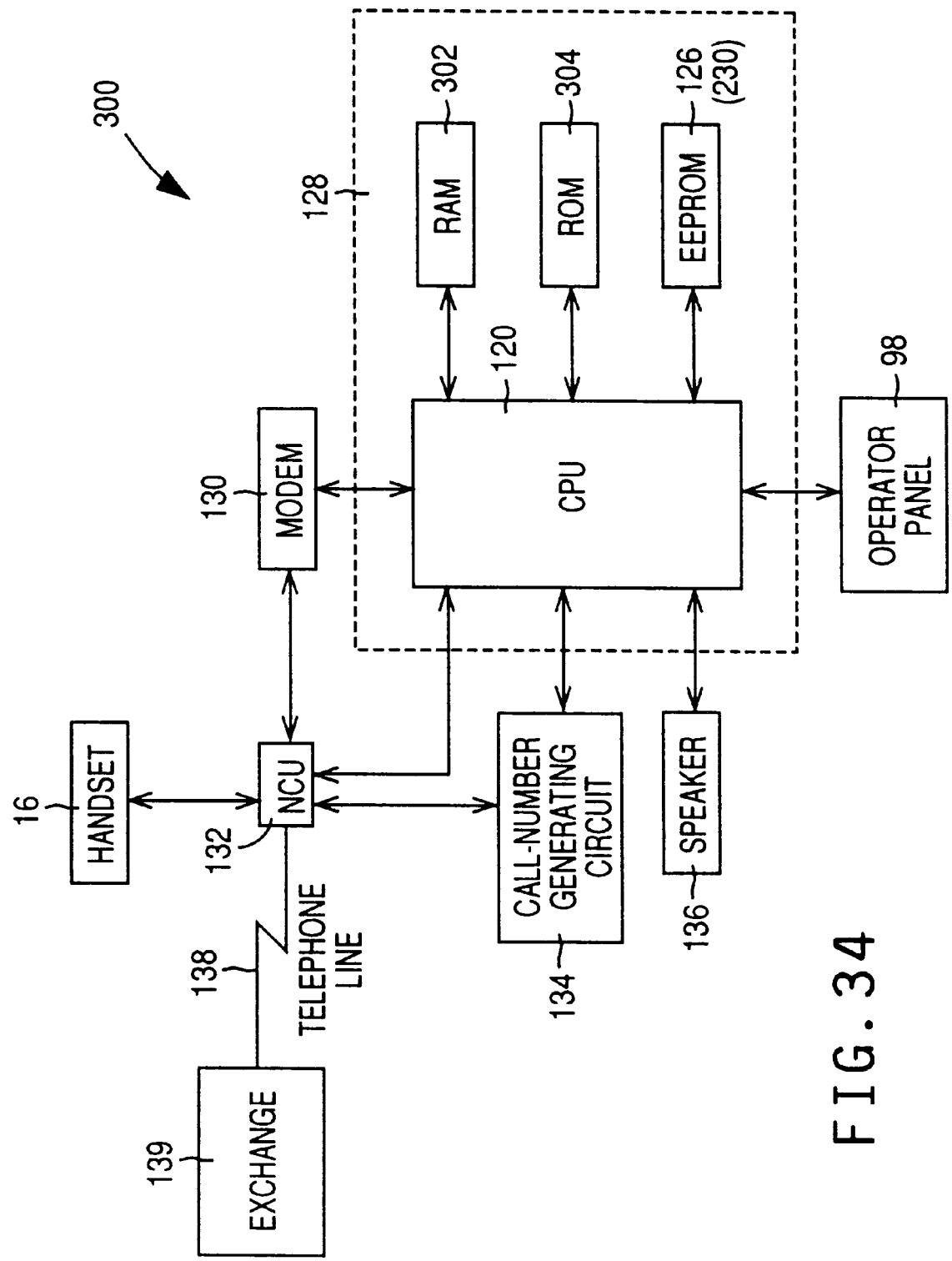
FIG. 34 is a diagrammatic view corresponding to FIG. 4, showing the construction of a T/F apparatus as a second embodiment of the present invention.
Figure 35:
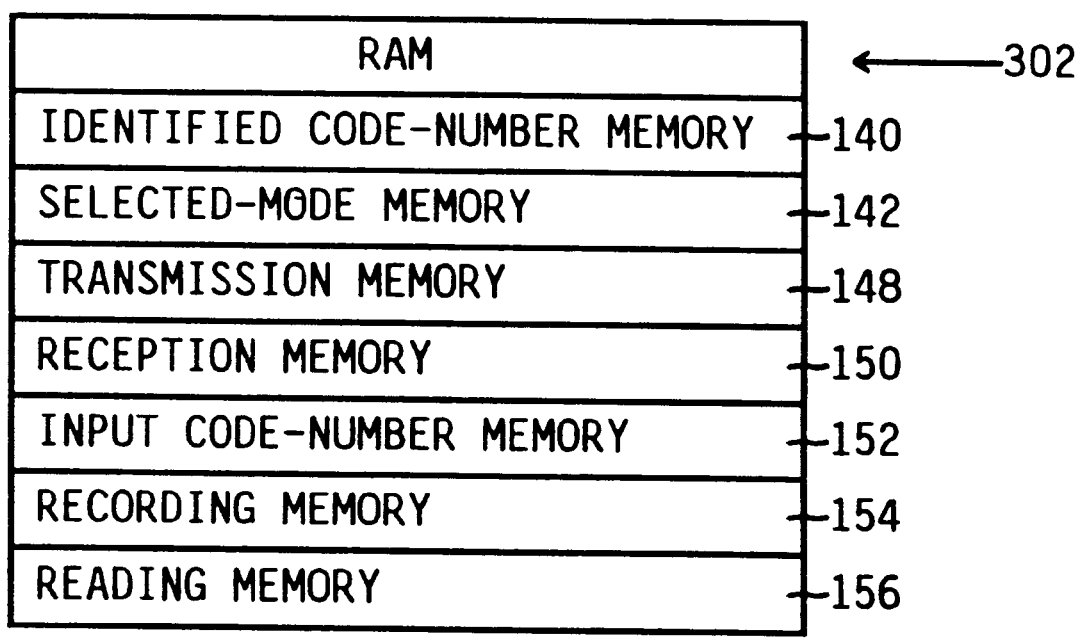
FIG. 35 is a diagrammatic view of a random access memory (RAM) of the T/F apparatus of FIG. 1.

Hereinafter, there will be described a second embodiment of the present invention. The second embodiment relates to an answering telephone and facsimile (T/F) apparatus 300 shown in FIG. 34. The T/F apparatus 300 has a hardware construction similar to that of the T/F apparatus 10 as the first embodiment. Therefore, the same reference numerals as used in FIGS. 1 to 4 are used to designate the corresponding elements or parts of the second embodiment, and a repetitive description of those elements and parts is omitted. However, in the second embodiment, the T/F apparatus 300 has a random access memory (RAM) 302 shown in FIG. 35, and a read only memory (ROM) 304 which stores control programs represented by the flow charts of FIG. 36, 37, and 38.

There will be described the facsimile operation of the T/F apparatus 300 by reference to the flow charts of FIGS. 36 to 38.

Figure 36:
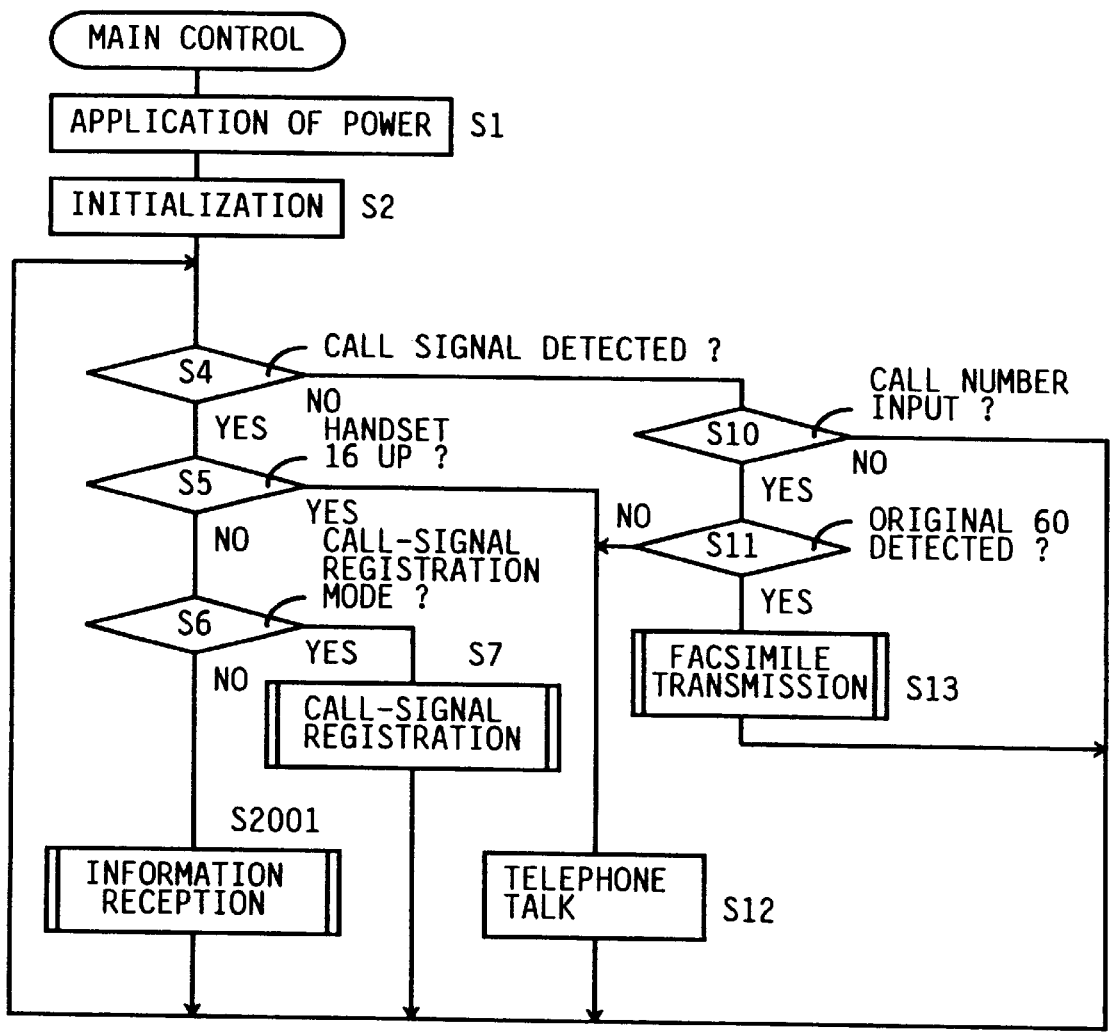
FIG. 36 is a flow chart representing a main control routine according to which the T/F apparatus of FIG. 34 operates.

FIG. 36 represents a main control routine according to which the T/F apparatus 300 operates. The main control routine of FIG. 36 is similar to that of FIG. 12 for the T/F apparatus 10. However, the former routine does not include steps corresponding to Steps S3, S9, and S14 to S21 of the latter routine, and includes Step S2001 in place of Step S8 of the latter.

Figure 37:
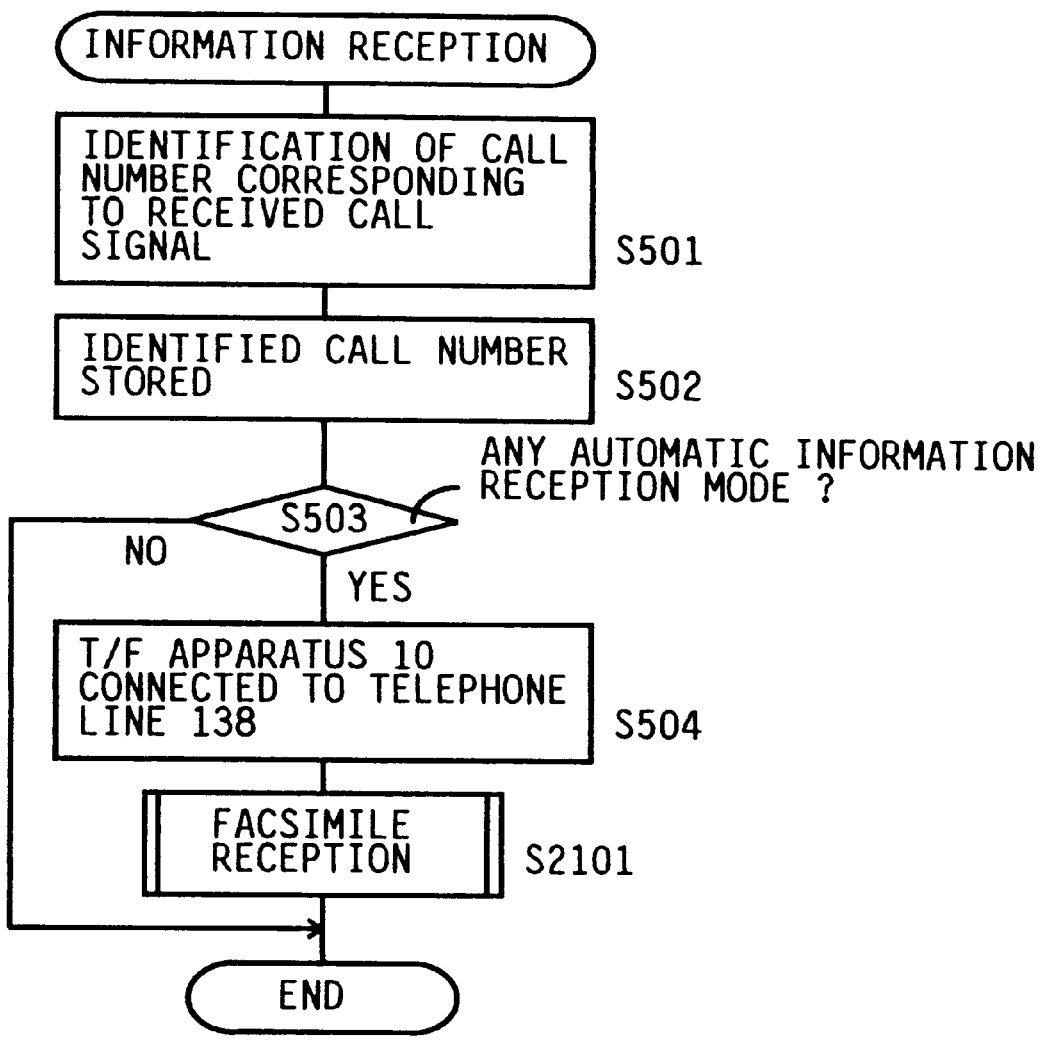
FIG. 37 is a flow chart representing an information reception routine according to which information is received by the T/F apparatus of FIG. 34.

FIG. 37 represents an information reception routine of Step S2001 of the main control routine of FIG. 36. The information reception routine of FIG. 37 is similar to that of FIG. 17 for the first embodiment. However, the former routine includes Step S2101 in place of Steps S505 to S508 of the latter routine.

Figure 38:
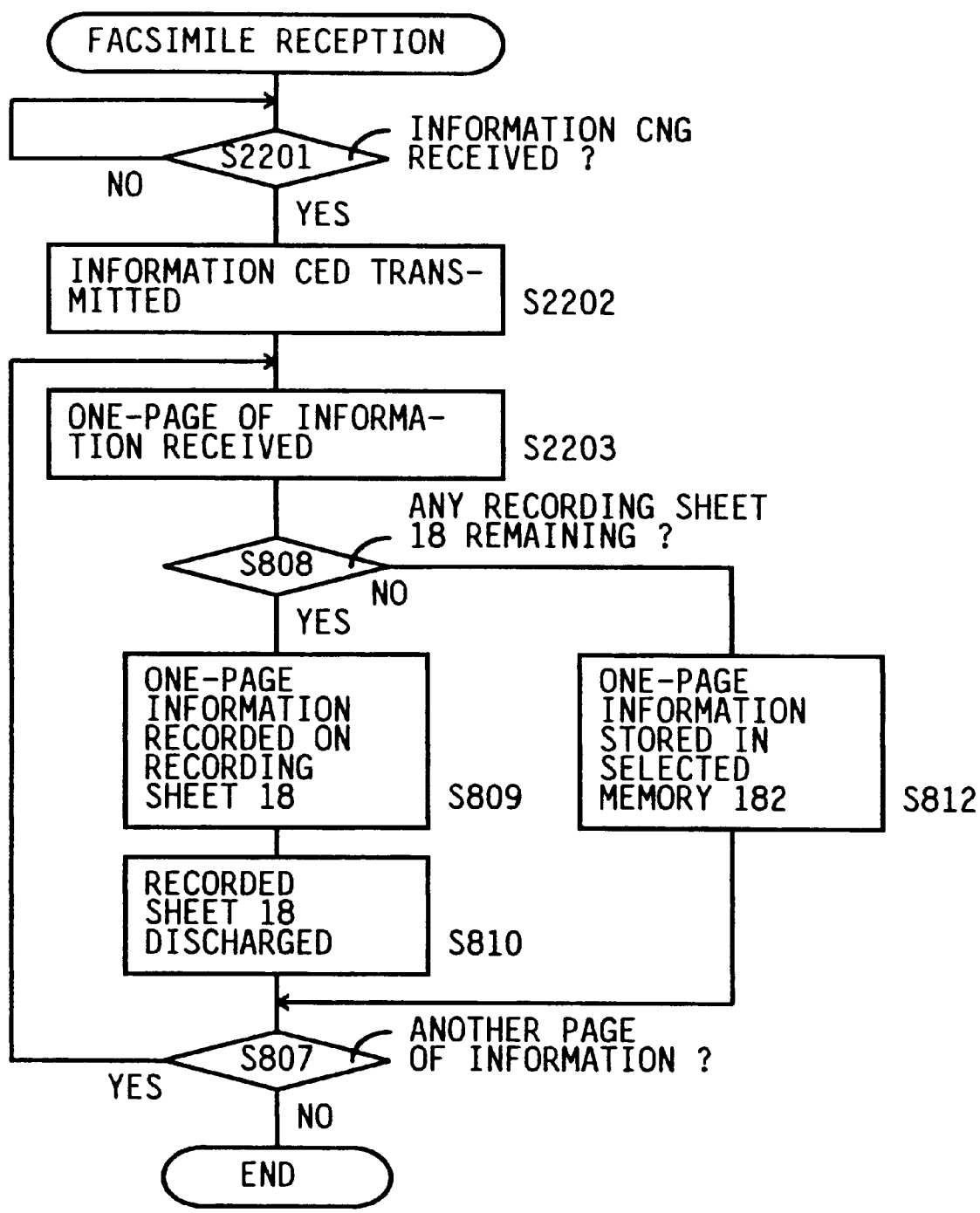
FIG. 38 is a flow chart representing a facsimile reception routine according to which image information is received by the T/F apparatus of FIG. 34.

FIG. 38 represents a facsimile reception routine of Step S2101 of the information reception routine of FIG. 37. The facsimile reception routine of FIG. 38 is similar to that of FIG. 21 for the first embodiment. However, the former routine includes Steps S2201 and S2202 in place of Step S801 of the latter routine, includes Step S2203 identical with Step S802 of the latter, and does not include steps corresponding to Steps S803 to S806 and S811 of the latter. Therefore, Steps S2201 and S2202 will be described in detail below.

At Step S2201, a CPU 120 of a computer 128 of the T/F apparatus 300 judges whether the T/F apparatus 300 is receiving a registered own call signal including information, CNG (calling tone), indicating that the calling communication apparatus is a non-audio terminal. If a positive judgment is made at Step S2201, the control of the CPU 120 goes to Step S2202 to connect the facsimile machine of the T/F apparatus 300 to the calling apparatus and transmit, to the calling apparatus, a return signal, CED (called station identification), identifying a called communication apparatus, i.e., T/F apparatus 300. The return signal CED includes, as optional information, information CSI representing a registered code number which has been stored in an identified code-number memory 140 at Step S502 of FIG. 37. Thus, the calling apparatus, i.e., calling facsimile machine may display, on a display thereof, the code number represented by the information CSI transmitted from the called apparatus, i.e., T/F apparatus 300, or may record the code number on a recording sheet as an operation report. The code number represented by the information CSI corresponds to a registered own call number of the T/F apparatus 300 which number is used by, or input into, the calling apparatus to call the T/F apparatus 300.

In the second embodiment, when the facsimile machine of the T/F apparatus 300 receives image information from a calling facsimile machine using a registered call number (or facsimile number) of the apparatus 300, the apparatus 300 transmits information representing a registered code number corresponding to the registered call number used. The calling machine may utilize the transmitted code number for various purposes. However, the information CSI contained in the return signal CED may otherwise be such information representing the registered call number used, or any information identifying the registered call number used. For example, the information CSI may represent a one-digit number which has been selected by the respective users of the calling and called machines such that the one-digit number corresponds to a registered call number of the apparatus 300. The call-number identifying information may be a call number itself. The call number sent back from the called machine may be utilized as the operation data collected by the calling machine.

When the T/F apparatus 300 is called by a calling machine using one of the registered own facsimile numbers of the apparatus 300, the apparatus 300 transmits the used facsimile number to the calling machine. Similarly, when the apparatus 300 is called using another of the registered own facsimile numbers, the apparatus 300 transmits the used, different facsimile number to the calling machine. Since the facsimile number sent back from the present, called machine to the calling machine is identical with that used by the user of the calling machine, the user of the calling machine can confirm that his or her transmission is successful. If a called facsimile machine sends back the only and same call number whichever call number may be used to call the machine and the call number sent back by the called machine is indicated on an display or recoded on an operation report, the user of the calling machine may, in some cases, misunderstand that he or she has sent information to an incorrect person, because the sent-back call number may not coincide with the call number used by the user of the calling machine. In those cases, the user of the calling machine will re-send the same information, but the second sent-back call number will not coincide with the used call number. The present T/F apparatus 300 is free from this problem.

While the present invention has been described in its preferred embodiments relating to the answering telephone and facsimile (T/F) apparatuses 10 and 300, the principle of the present invention is applicable to a telephone set without any facsimile function, or a facsimile machine without any telephone function.

The present invention is also applicable to various sorts of telephone operations other than those described above on the T/F apparatus 10, 300, for example, a memo-message transmitting operation wherein the user stores his or her memo messages, i.e., personal voice messages, in memo-message memories related with the own call numbers of the telephone function of the apparatus 10, 300, respectively, and wherein the apparatus 10, 300 transmits to a calling or called telephone set the personal voice message stored in one of the memories which corresponds to one of the own call numbers used by the calling telephone set or used to call the called telephone set.

The present invention is also applicable to various sorts of facsimile operations other than those described above on the T/F apparatus 10, 300, for example, a received-message transferring operation wherein the apparatus 10, 300 stores and transmits image information which is supplied thereto from a first facsimile machine by using a certain own call number of the apparatus 10, 300, to a second facsimile machine whose call number is either pre-stored in a corresponding memory or specified by a command either input by the user or supplied from the second facsimile machine or a third facsimile machine.

The operator panel 98 of the T/F apparatus 10, 300 may additionally include a hook button or key which produces, upon pushing thereof, signals identical with the signals produced when the handset 16 is picked up from, and put down on, the lower housing 12, respectively.

Although in the first embodiment the answering telephone mode, for example, is established with respect to all the own call numbers allotted to the telephone function of the T/F apparatus 10, it is possible to modify the apparatus 10 to establish the answering telephone mode with respect to only two or more call numbers pre-selected from all those call numbers. This applies to each of the other telephone operations of the apparatus 10.

Although in the first embodiment the retrieval-permitting information storing ("retrieval") mode, for example, is established with respect to all the own call numbers allotted to the facsimile function of the T/F apparatus 10, it is possible to modify the apparatus 10 to establish the retrieval mode with respect to only two or more call numbers selected from all those call numbers. This applies to each of the other facsimile operations of the apparatus 10.

Figure 24:
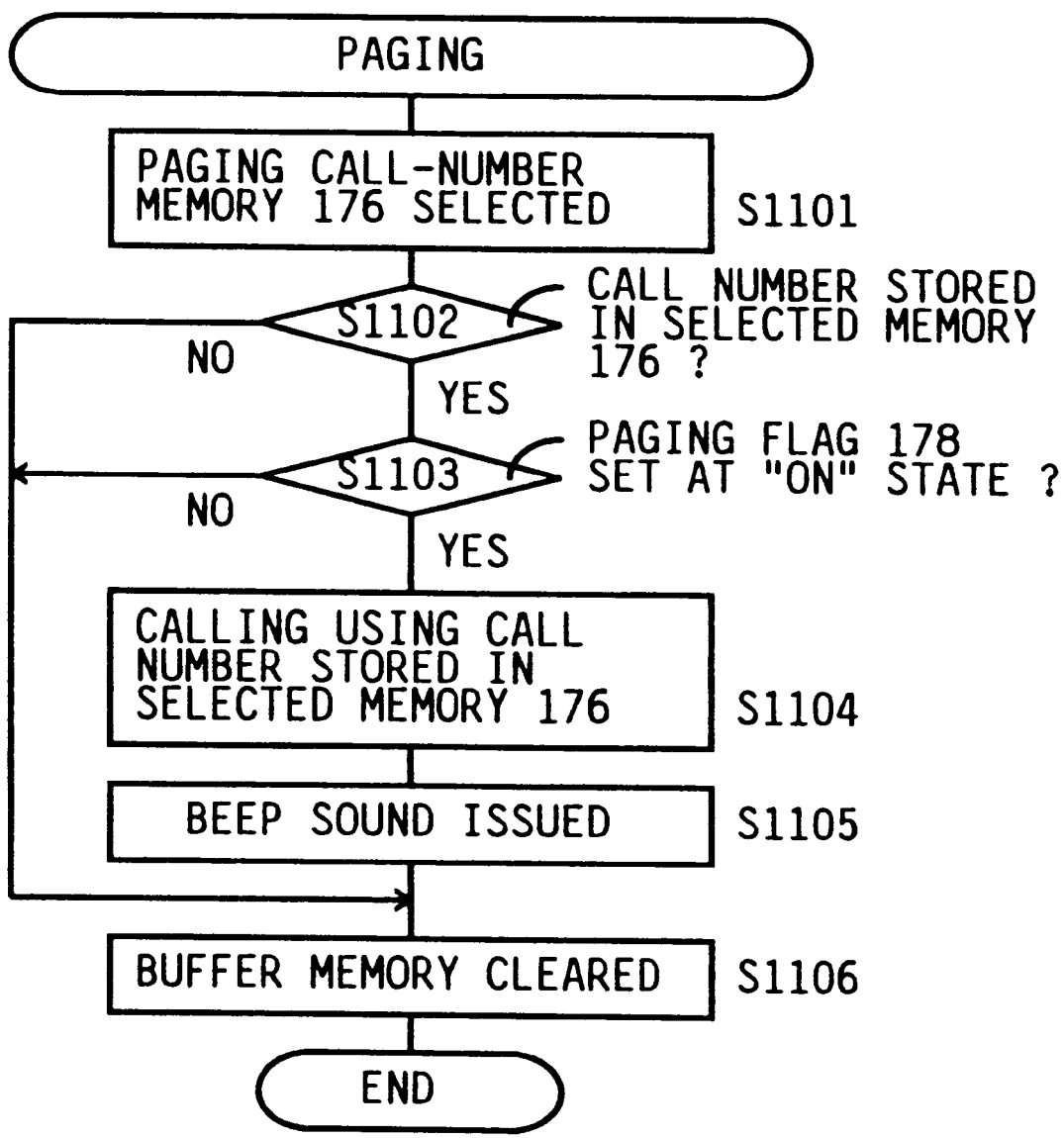
FIG. 24 is a flow chart representing a paging routine according to which paging is carried out by the T/F apparatus of FIG. 1.

While in the first embodiment the T/F apparatus 10 informs, at Step S1104 of FIG. 24, a paged or called communication apparatus of only the fact that the apparatus 10 has received a voice message and stored it in a received message memory 174, Step S1104 may be modified such that the apparatus 10 transmits or transfers, to the paged apparatus, the voice message stored in the memory 174.

The time or occasion for paging is not limited to immediately after the time of receiving and storing of a voice message, and paging may be carried out a predetermined time thereafter. Otherwise, paging may be carried out in response to calling of a communication apparatus. A stored voice message may be transferred to a paged apparatus in response to a command supplied from the paged apparatus. In the case where a stored voice message is transferred to a paged telephone set, the T/F apparatus 10 may operate in such a way that when a user of the paged telephone set is talking with another person or when a user of the paged telephone set does not pick up the handset thereof, the apparatus 10 repeats paging at pre-determined intervals of time.

Figure 30:
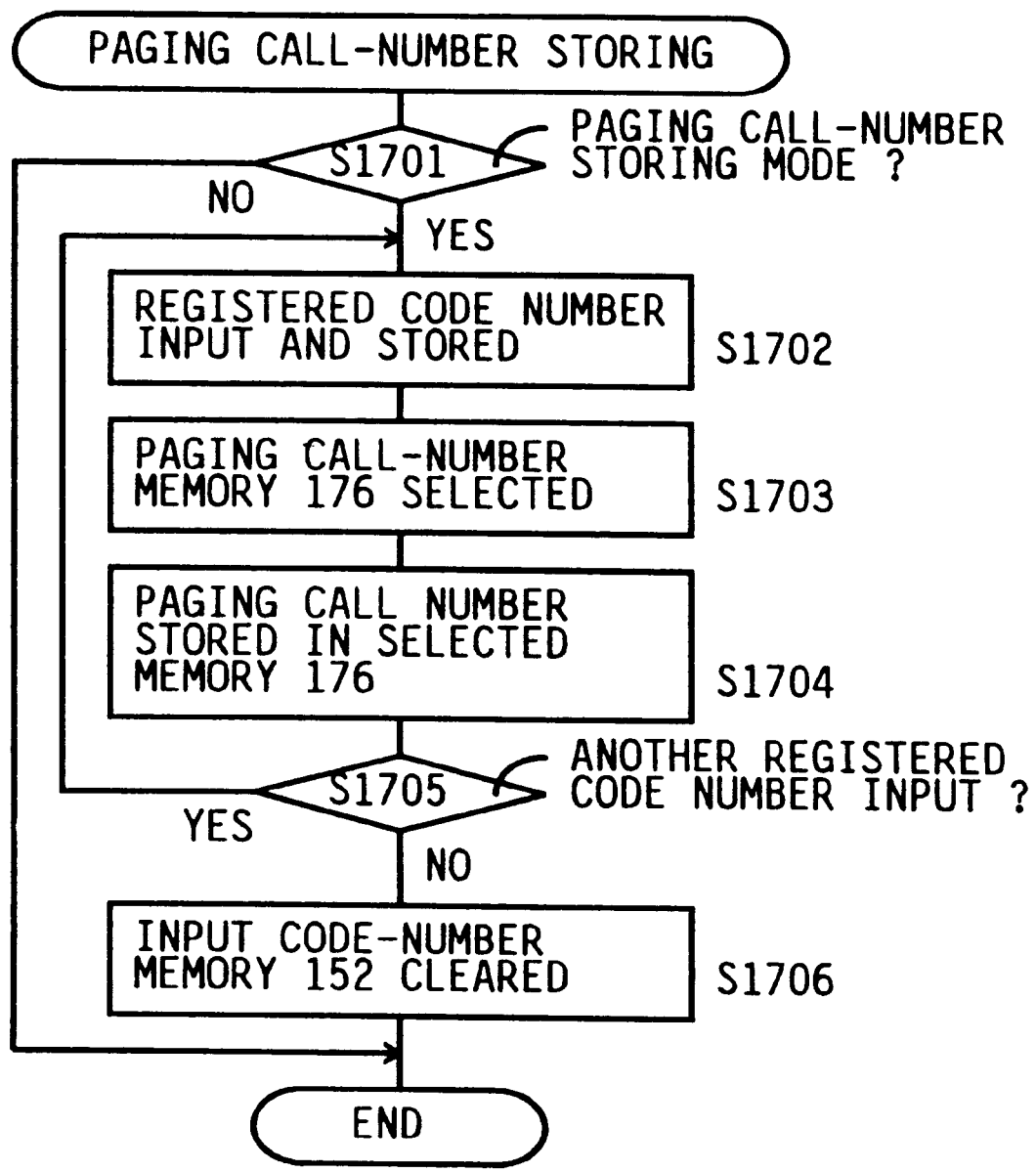
FIG. 30 is a flow chart representing a paging call number storing routine according to which one or more paging call numbers is/are stored in the T/F apparatus of FIG. 1.

While in the first embodiment the paging call numbers are directly stored by operating the numeral keys 104 and other keys on the operator panel 98, at Step S1704 of FIG. 30, the T/F apparatus 10 may be modified such that paging call numbers are stored in response to commands supplied from other telephone sets. Whether that a paged telephone set is informed of only the fact of having received and stored a message, or that the stored message is additionally transferred to the paged telephone set, may be specified directly by operating the operator panel 98, or indirectly in response to a command supplied from a different communication apparatus such as a telephone set.

While in the first embodiment a batch of transmitter-identifying information is added to each page of documents being transmitted and a transmittal letter is added as a cover sheet of the documents, it is otherwise possible that a transmitter identification be added to every other page or that two sorts of identifications (e.g., call number and code number) be added to alternate pages. The T/F apparatus 10 may further include a selecting device which is operable by the user for selecting one of the transmitter-identification adding operation and the transmittal-letter adding operation. Each transmittal letter may include, in addition to or in place of a cover sheet, an end page or sheet indicating that the current transmission is successful.

Hereinafter, there will be described a third embodiment of the present invention. The third embodiment relates to an answering telephone and facsimile (T/F) apparatus 400 shown in FIG. 39, and has a hardware construction similar to that of the T/F apparatus 10 as the first embodiment. The same reference numerals as used in FIGS. 1 to 4 are used to designate the corresponding elements or parts of the third embodiment, and a repetitive description of those elements or parts is omitted. The T/F apparatus 400 is different from the T/F apparatus 10, as described in detail below. For example, the apparatus 400 has an operator panel 498 shown in FIG. 40, a RAM 554 shown in FIG. 41, and a ROM 552 in which are stored control programs represented by the flow charts of FIG. 42 through 47.

Figure 40:
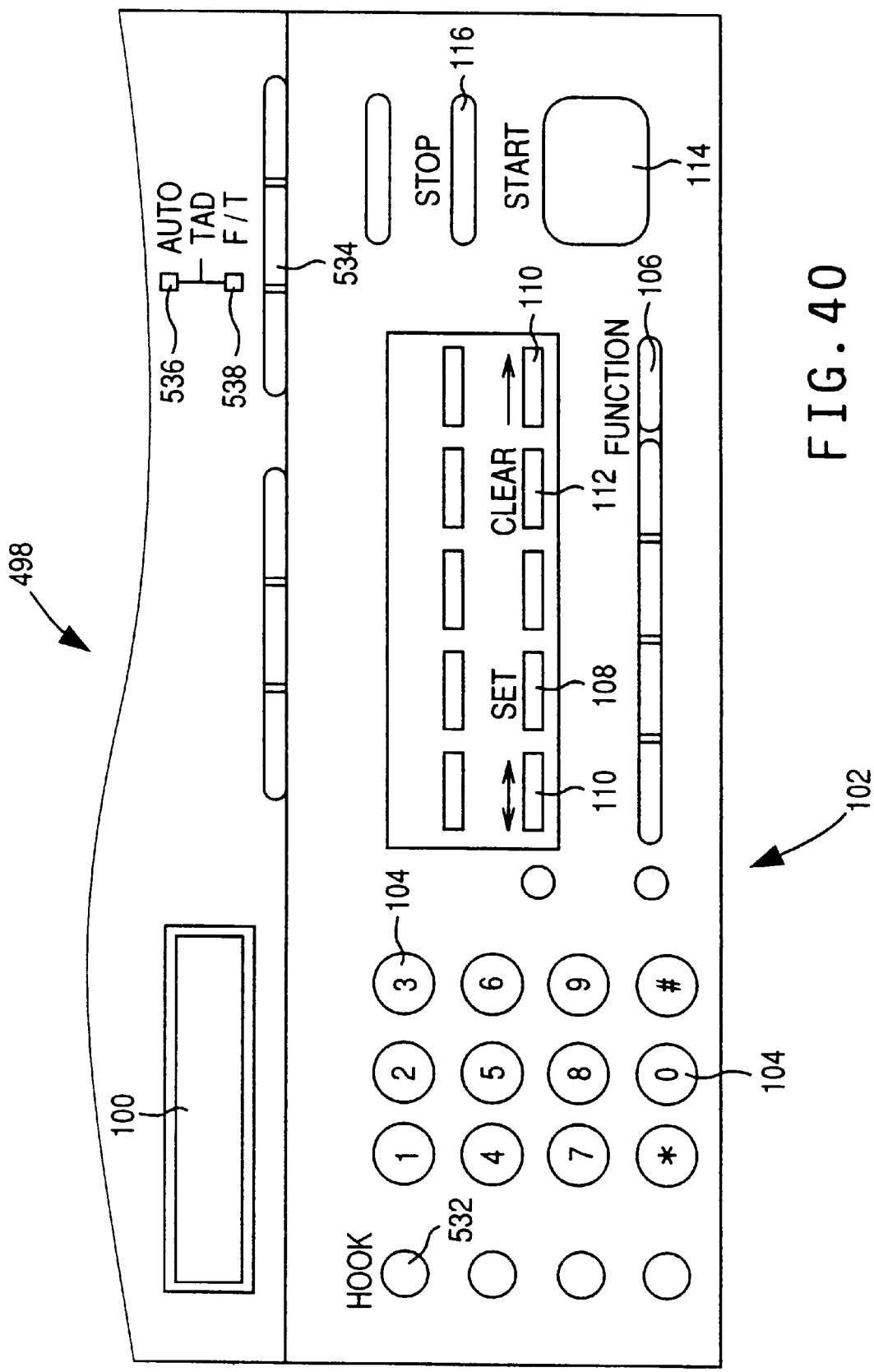
FIG. 40 is a view corresponding to FIG. 3, showing an operator panel of the T/F apparatus of FIG. 39.

As shown in FIG. 40, the operator panel 498 of the T/F apparatus 400 includes, in addition to an LCD 100 and various keys 102 to 116 which are the same as the counterparts of the operator panel 98 of the T/F apparatus 10, a hook key ("HOOK" key) 532 which is provided at the left-hand end part of a keyboard 106, and a reception-mode key 534, an automatic-reception lamp ("AUTO" lamp) 536, and a facsimile/telephone switch lamp ("F/T" lamp) 538 which are provided on the upper and right-hand part of the keyboard 106.

The HOOK key 532 is pushed to connect the T/F apparatus 400 to an external telephone line 138, so that when a telephone set of the apparatus 400 is being called, or calling, a user of the apparatus 400 can hear, through a speaker 576, the voices of a user of the calling or called communication apparatus, such as a telephone set or facsimile machine. Meanwhile, when the user picks up a handset 16 off the T/F apparatus 400, the apparatus 400 is likewise connected to the telephone line 138, so that he or she can talk with the other person through the handset 16.

The reception mode key 534 is used to selectively place the T/F apparatus 400 in one of four modes, i.e., (a) a facsimile automatic reception mode in which image information is automatically received by a facsimile machine of the apparatus 400, (b) a facsimile manual reception mode in which image information is received, or not received, depending upon selection of the user, (c) a facsimile and telephone (F/T) switch mode in which information transmitted to the apparatus 400 via the single telephone line 138 is automatically received by the facsimile machine of the apparatus 400 if the transmitted information is image information, and is received by the telephone set of the apparatus 400 if the transmitted information is sound information, and (d) an answering telephone mode. In the F/T switch mode, the use can talk with the other person by picking up the handset 16, or can hear the voices of the other person by pushing the HOOK key 532, if the transmitted information is sound information.

When the facsimile automatic reception mode is selected, the AUTO lamp 536 is turned on. When the F/T switch mode is selected, the F/T lamp 138 is turned on. When the facsimile manual reception mode is selected, neither of the two lamps 536, 538 is turned on. When the answering telephone mode is selected, both of the two lamps 536, 538 are turned on.

Figure 39:
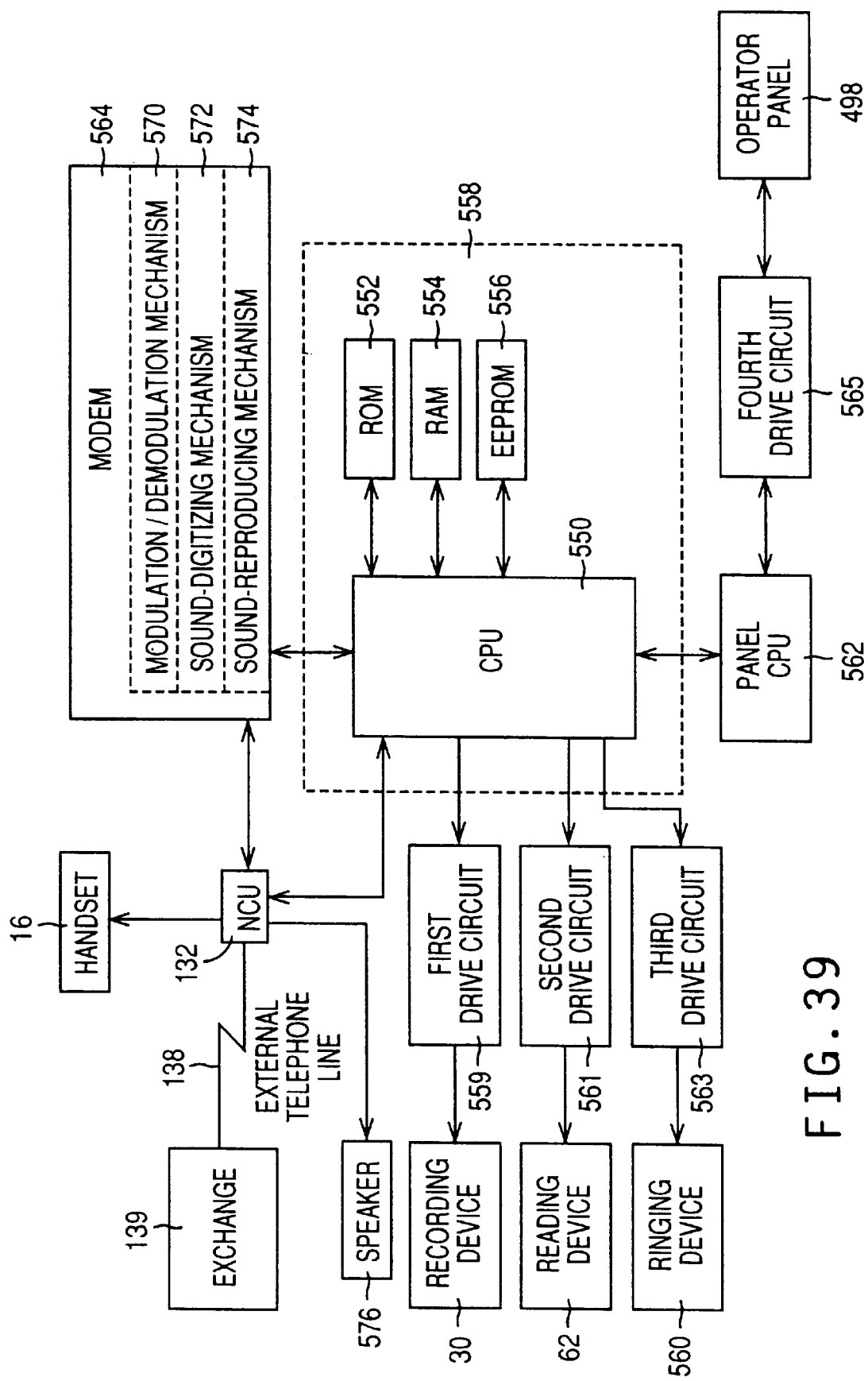
FIG. 39 is a diagrammatic view corresponding to FIG. 4, showing the construction of a T/F apparatus as a third embodiment of the present invention.

As shown in FIG. 39, the present T/F apparatus 400 is controlled by a computer 558 including a CPU 550, the ROM 552, the RAM 554, and an EEPROM 556. A recording device 30, a reading device 62, and a ringing device 560 are connected via a first, a second, and a third drive circuit 559, 561, 563 to the CPU 550. The operator panel 498 is coupled via a fourth drive circuit 565 to a panel CPU 562 which in turn is coupled to the CPU 550.

The ringing device 560 produces a calling sound upon reception of an electric voltage from the third drive circuit 563. The drive circuit 563 is controlled by the CPU 550 when the T/F apparatus 400 is called by an external communication apparatus (e.g., facsimile machine or telephone set) via an exchange 139 and the telephone line 138. The CPU 550 may either be programmed to control the third circuit 563 to supply an electric voltage to the ringing device 560, so that the ringing device 560 generates a calling sound having a sound pattern corresponding to the signal pattern of a call signal received by the apparatus 400, or be programmed to control the third circuit 563 to supply an electric voltage to the ringing device 560, so that the ringing device 560 generates a calling sound having a sound pattern independent of the signal pattern of the received call signal. In the first control manner, the CPU 550 controls the third circuit as if the third circuit 563 would directly supply, and stop supplying, an electric voltage to the ringing device 560, according to the signal pattern of the received call signal. In the present embodiment, it is assumed that the CPU 550 controls the third circuit 563 in the first control manner.

The electric voltage of a call signal supplied to the T/F apparatus 400 from the exchange 139 is lower than an electric voltage flowing through the telephone line 138 in a stationary state thereof in which no sound or image information is transmitted therethrough. A call signal takes two voltage magnitudes or levels each of which is lower than the stationary level of the telephone line 138. The CPU 550, or the third drive circuit 563, controls the ringing device 560 to ring while the received call signal takes the lower level, and does not drive the ringing device 560 while the call signal takes the higher level.

Thus, a call signal takes two voltage states, i.e., high-voltage and low-voltage states. As the present application is concerned, the low-voltage state that causes the generation of a calling sound is referred as an "ON" state of a call signal, and the high-voltage state that does not cause the generation of a calling sound is referred as an "OFF" state of the same. Different call signals have different signal patterns, and they are identifiable from each other by comparing the number of ON and OFF states, and/or the respective lengths of ON and OFF states. Each call signal contains, in one cycle thereof, an identical number of ON and OFF states and contains one long OFF state, called "LONG-OFF" state. Even in the case where the overall length of a single cycle of a call signal is not known to the T/F apparatus 400, the overall length or time can be measured by identifying two successive LONG-OFF states of the signal. The length between the respective start or end points of two successive LONG-OFF states of a call signal is equal to one cycle of the signal. The present T/F apparatus 400 is programmed to identify a call signal containing at most three pairs of ON and OFF states, i.e., at most six ON and OFF states in total. However, the apparatus 400 may be modified to identify more complex call signals from each other.

A modem 564 is connected to the CPU 550 of the computer 558. The modem 564 includes a modulator and demodulator device 570 which modulates digital signals into analog signals which in turn are sent out via an NCU 132 to the telephone line 138, and which demodulates analog signals supplied from the telephone line 138, into digital signals. The modem 564 also includes a sound-digitizing device 572 which converts sound analog signals into sound digital signals, and a sound-reproducing device 574 which reproduces sound analog signals from sound digital signals. Each of the three devices 570, 572, 574 of the modem 564 are controlled by the CPU 550.

The NCU 132 automatically receives information when the T/F apparatus 400 is called via the external telephone line 138, and automatically calls an external communication apparatus to transmit information to the called apparatus. The handset 16 through which sounds and/or voices are input and output, and the speaker 576 through which sounds and/or voices are output, each are coupled to the NCU 132.

The CPU 550 operates for coding and compressing digital information representing original images read by a reading device 62 from an original 60, thereby shortening the duration of transmission of the digital information, and also operates for decoding coded information transmitted from an external communication apparatus, into decoded digital information as they were before having been coded.

As shown in FIG. 41, the RAM 554 includes a first and a second signal-pattern memory 580, 582, a prior and a current signal-state memory 584, 586, a selected-mode memory 588, a call-signal check memory 589, a first, a second, and a third counter 590, 592, 594, and a first, a second, and a third, a fourth, a fifth, a sixth, a seventh, an eighth, and a ninth flag G1, G2, G3, G4, G5, G6, G7, G8, and G9. Each of the memories 580, 582, 589 has six data-storing memory areas.

Figure 42:
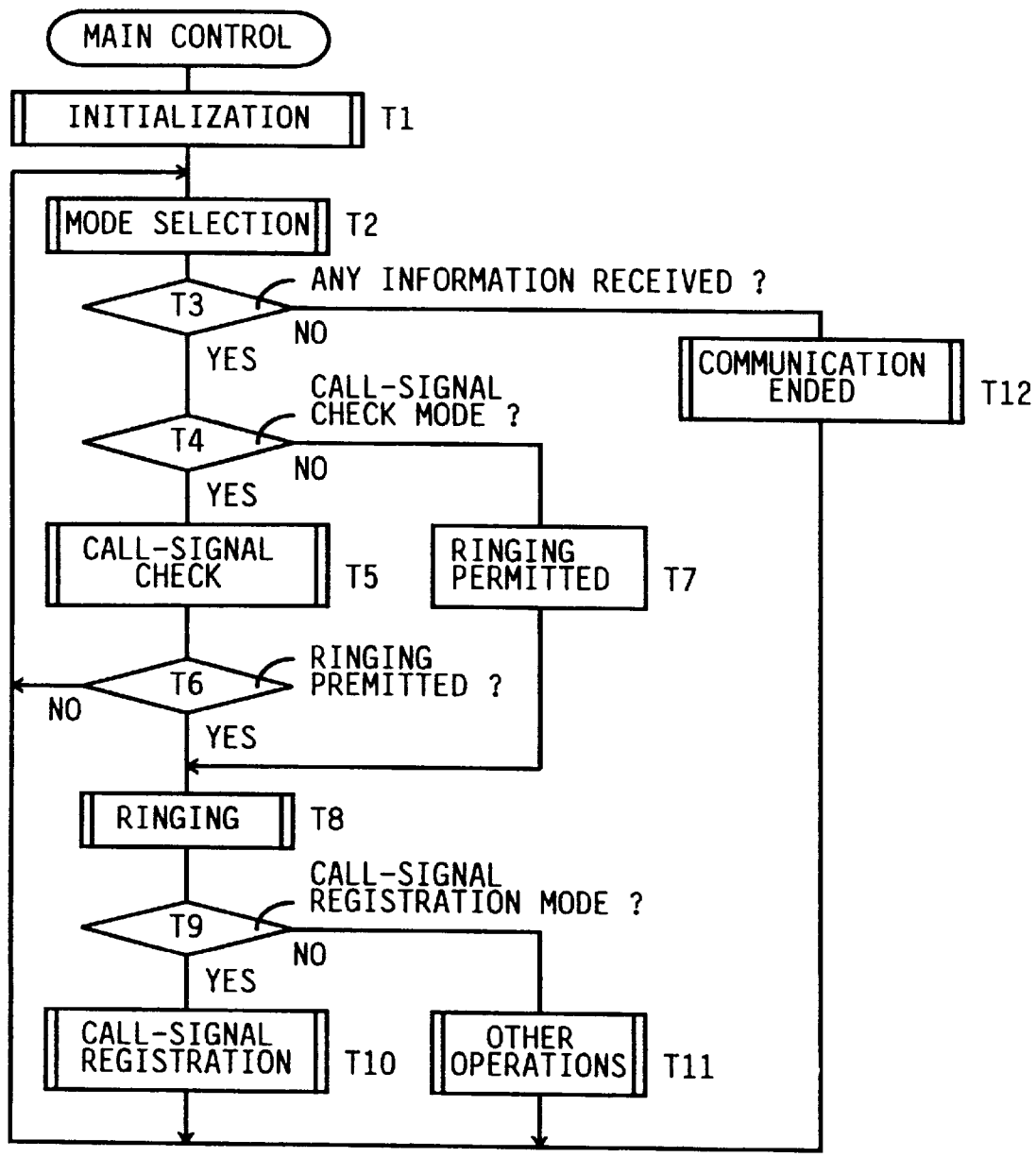
FIG. 42 is a flow chart corresponding to FIG. 12, representing a main control routine according to which the T/F apparatus of FIG. 39 operates.
Figure 43:
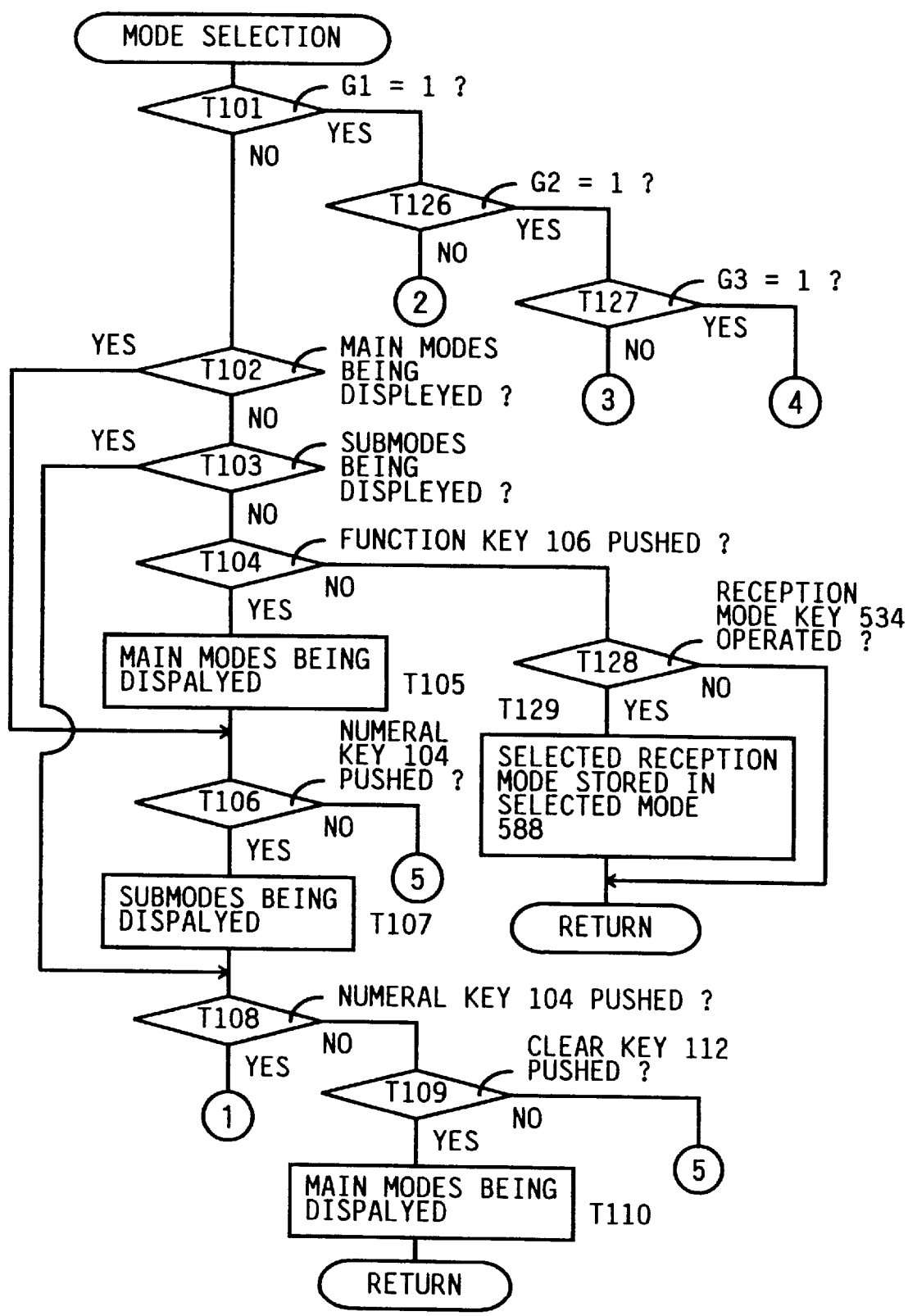
FIG. 43 is a flow chart corresponding to FIG. 13, representing a first half of a mode selection routine according to which one or more operation modes are selected on the T/F apparatus of FIG. 39.
Figure 44:
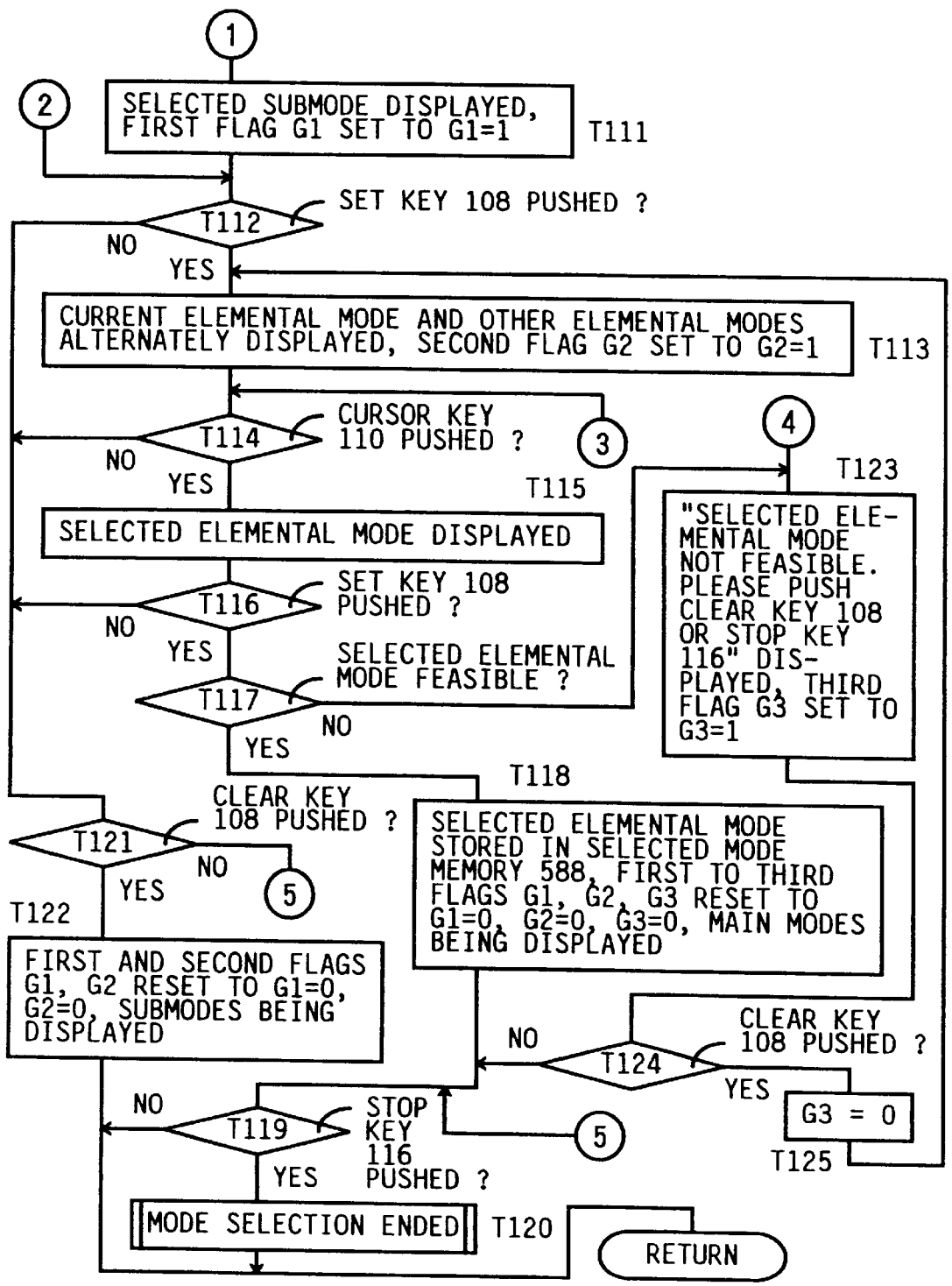
FIG. 44 is a flow chart corresponding to FIG. 13, representing a second half of the mode selection routine of FIG. 43.
Figure 45:
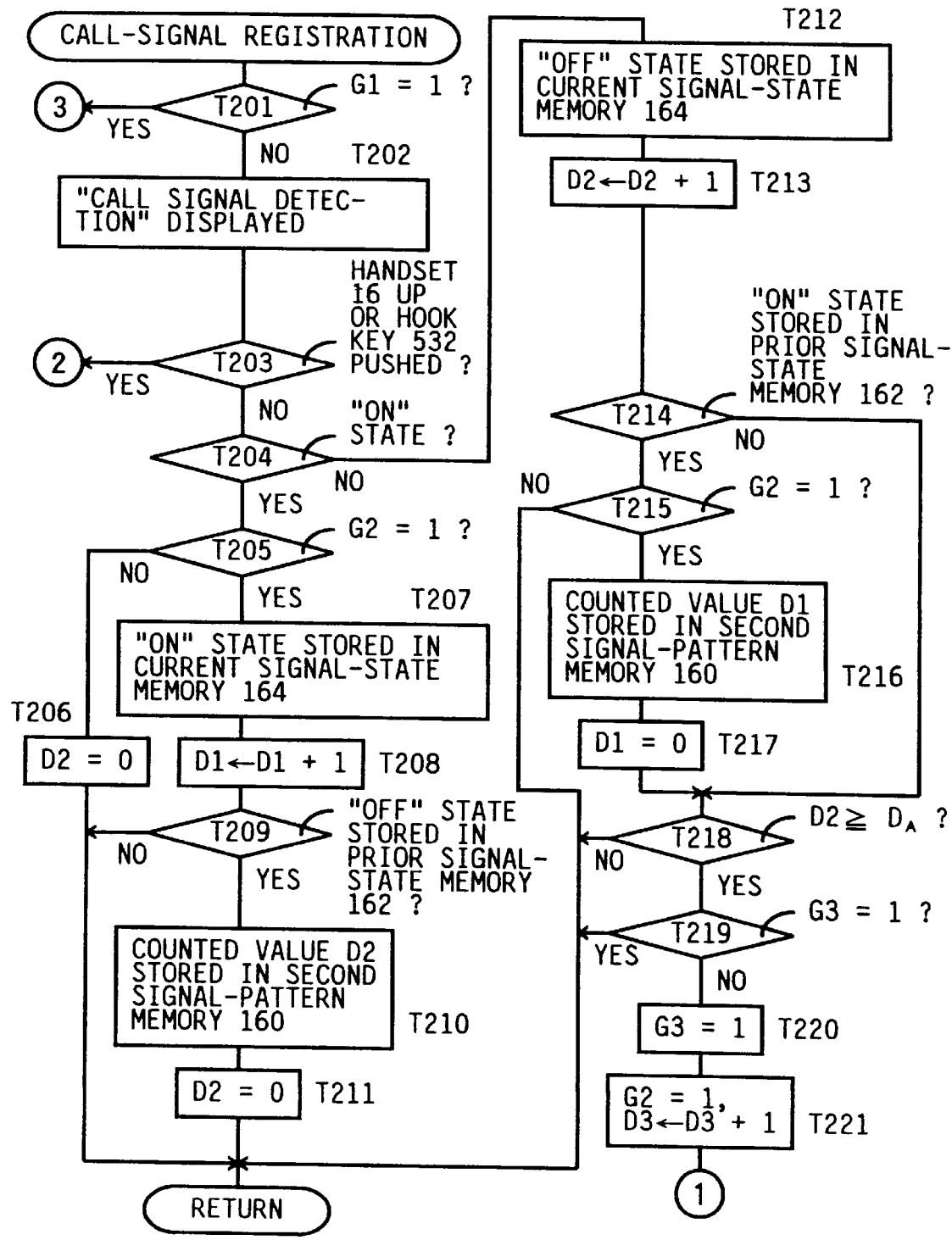
FIG. 45 is a flow chart corresponding to FIG. 14, representing a first half of a call-signal registration routine according to which a call signal is registered on the T/F apparatus of FIG. 39.
Figure 46:
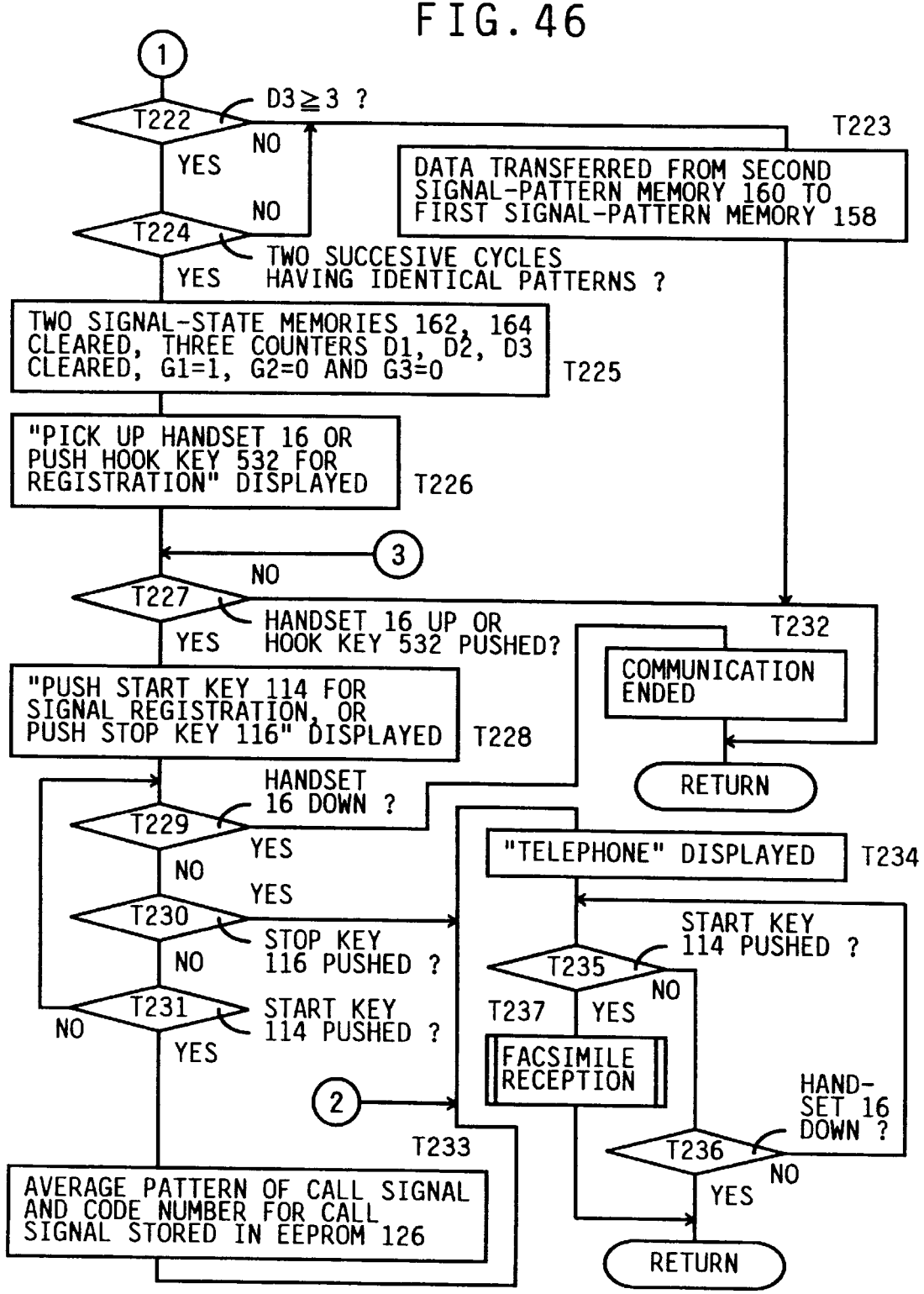
FIG. 46 is a flow chart corresponding to FIG. 15, representing a second half of the call-signal registration routine of FIG. 45.
Figure 47:
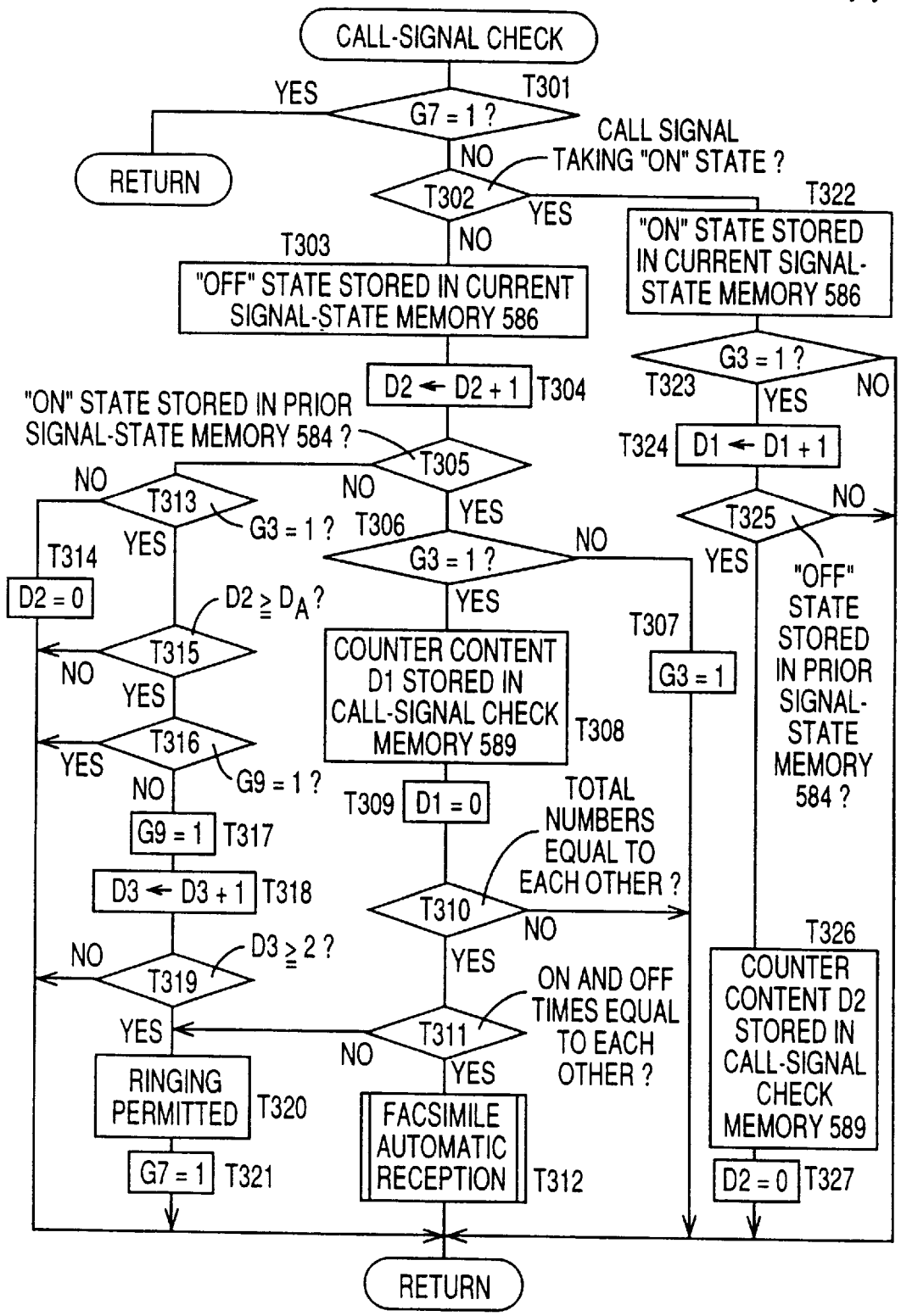
FIG. 47 is a flow chart representing a call-signal check routine according to which a call signal is checked by the T/F apparatus of FIG. 39.

The ROM 552 stores a main control routine represented by the flow chart of FIG. 42, a mode selection routine represented by the flow charts of FIGS. 43 and 44, a call-signal registration routine represented by the flow charts of FIGS. 45 and 46, and a call-signal check routine represented by the flow chart of FIG. 47. Hereinafter, the mode selection, the call-signal registration, and the call-signal checking operation will be described in detail by reference to the corresponding flow charts of FIGS. 43 to 47.

Upon application of electric power to the T/F apparatus 400, the CPU 550 of the computer 558 carries out Step Ti to initialize the apparatus 400 by clearing the respective contents of the various memories and counters of the RAM 554 and resetting the various flags of the RAM 554.

Step T1 is followed by Step T2, i.e., mode selection routine shown in FIGS. 43 and 44. A mode selection operation is carried out by using a FUNCTION key 106, numeral keys 104, and a SET key 108, or alternatively by using the reception mode key 534. various operation modes selectable on the T/F apparatus 400 include a plurality of main modes, a plurality of submodes belonging to each main mode, and a plurality of elemental modes belonging to each submode.

For example, a telephone-option mode, one of the main modes, has a plurality of submodes including, e.g., a distinctive-ringing mode. The distinctive-ringing mode includes three elemental modes, i.e., (a) a call-signal check mode in which a call signal is checked, (b) a call-signal registration mode in which a call signal is registered, and (c) an OFF mode in which neither of the call-signal check and registration modes is carried out. The present T/F apparatus 400 enjoys the distinctive-ringing service offered by the telephone company. That is, two or more own call numbers are allotted to the present, single T/F apparatus 400 according to a common numbering rule employed by the telephone company, and two or more own call signals respectively corresponding to the two or more own call numbers are supplied to the apparatus 400 from the exchange 139 through the single telephone line 138. In the present embodiment, one of the own call numbers of the apparatus 400 is used as an own facsimile number for the facsimile machine of the same 400.

In the case where the FUNCTION key 106 and the numeral keys 104 are used to select an operation mode or modes, the LCD starts displaying, upon pushing of the FUNCTION key 106, the respective names and numbers of the main modes in a pre-determined cyclic order, one by one, each for an appropriate duration. If the user pushes one of the numeral keys 104 which corresponds to the number of a main mode which the user wishes to select, that main mode is selected or established on the T/F apparatus 400. Subsequently, the respective names of submodes belonging to the selected main mode are displayed with corresponding numbers in a pre-determined cyclic order, one by one, on the LCD 100. If the user pushes one of the numeral keys 104 which corresponds to the number of a submode which the user wishes to select, that submode is selected. Then, the respective names of elemental modes belonging to the selected submode are displayed with corresponding numbers, one by one, in a pre-determined cyclic order. If the user pushes one of the numeral keys 104 which corresponds to the number of an elemental mode which the user wishes to select, that elemental mode is selected.

Meanwhile, the reception mode key 534 may be used to select one of the previously-described four reception modes, i.e., (a) the facsimile automatic reception mode, (b) the facsimile manual reception mode, (c) the F/T switch mode, and (d) the answering telephone mode.

At Step T101 of FIG. 43, the CPU 550 judges whether the first flag G1 is set at one, i.e., G1=1. The state of G1=1 indicates that a submode has been selected. The flag G1 had been reset to zero, i.e., G1=0 upon initialization of the T/F apparatus 400 at Step T1. Therefore, a negative judgment is made at Step T101, and the control of the CPU 550 goes to Step T102 to judge whether the indication or name of a main mode is being displayed on the LCD 100. In this situation, a negative judgment is made at Step T102, and the control goes to Step T103 to judge whether the name of a submode is being displayed on the LCD 100. A negative judgment is made at Step T103, and the control goes to Step T104 to judge whether the FUNCTION key 106 has been pushed. If a negative judgment is made at Step T104, the control goes to Step T128 to judge whether the reception mode key 534 has been pushed. If a negative judgment is made at Step T128, the control of the CPU 550 proceeds with Step T3 of the main control routine of FIG. 42. Thus, no substantial operation is carried out and the current control cycle of this routine is ended.

If the FUNCTION key 106 is pushed and a positive judgment is made at Step T104, the control of the CPU 550 goes to Step T105 to display the respective names of the main modes in the predetermined cyclic order, one by one, on the LCD 100. Step T105 is followed by Step T106 to judge whether one or more of the numeral keys 104 has or have been pushed. If a negative judgment is made at Step T106, the control goes to Step T119 of FIG. 44 to judge whether the STOP key 116 is pushed to terminate the current mode selection operation. If a negative judgment is made at Step T119, the control proceeds with Step T3 of FIG. 42. In the next control cycle following the current control cycle of this routine, a positive judgment is made at Step T102, and the control goes to Step T106 to wait for the user to push an appropriate numeral key or keys 104.

If the numeral key or keys 104 is or are pushed to select a main mode, i.e., if a positive judgment is made at Step T106, the control goes to Step T107 to display the respective names of submodes belonging to the selected main mode, in the predetermined cyclic order, one by one, on the LCD 100. Step T107 is followed by Step T108 to judge whether the numeral key or keys 104 has or have been pushed. If a negative judgment is made at Step T108, the control goes to Step T109 to judge whether the CLEAR key 112 has been pushed. If a negative judgment is made at Step T109, the control goes to Step T119 to judge whether the STOP key 116 has been pushed. On the other hand, if a positive judgment is made at Step T109, the control goes to Step T110 to quit selecting a submode and resume displaying the names of the main modes.

So long as neither of the CLEAR key 112 and the STOP key 116 is pushed, Steps T101, T102, T106–T109, and T119 are repeated until the numeral key or keys 104 is or are pushed. Meanwhile, if the numeral key or keys 104 is or are pushed, a positive judgment is made at Step T108, the control of the CPU 550 goes to Step Till to display the name of the selected submode on the LCD 100 and set the first flag G1 to G1=1.

Step Till is followed by Step T112 to judge whether the SET key 108 has been pushed to finally establish or fix the selection of the submode. So long as the pushing of the SET key 108 is waited, a positive judgment is made at Step T101 and a negative judgment is made at Step T126, and Steps T112, T121, and T119 are repeated to judge whether either the CLEAR key 112 or the STOP key 116 has been pushed. If a positive judgment is made at Step T121, the control goes to Step T122 to reset the first and second flags G1, G2 to G1=0 and G2=0, respectively, and resume displaying the respective names of the submodes in the predetermined cyclic order on the LCD 100. In this situation, the second flag G2 has not been set to G2=1 yet. Therefore, only the first flag G1 is reset to G1=0.

If the SET key 108 has been pushed, i.e., if a positive judgment is made at Step T112, the control goes to Step T113 to alternately display, on the LCD 100, the currently selected elemental mode of the selected submode, and each of all the elemental modes of the same submode, thereby permitting the user to re-select the currently selected elemental mode or newly select another elemental mode. In addition, the CPU 550 sets the second flag G2 to G2=1. Step T113 is followed by Step T114 to judge whether the cursor key 110, 110 has been pushed. If a positive judgment is made at Step T114, the control goes to Step T115 to display, on the LCD 100, the name of the elemental mode selected by the pushing of the cursor key 110.

Subsequently, the control of the CPU 550 proceeds with Step T116 to judge whether the SET key 108 has been operated to finally fix the elemental mode selected and displayed. So long as the operation of the SET key 108 is waited, a positive judgment is made at each of Steps T114 and T126, a negative judgment is made at Step T127, and Steps T114, T121, and T119 are repeated. In this case, too, if the CLEAR key 112 is operated, the control goes to Step T122 to reset the first and second flags G1, G2 to G1=0 and G2=0, respectively, thereby returning the T/F apparatus 400 to the situation just before the provisional selection of the submode.

If the SET key 108 is operated, i.e., if a positive judgment is made at Step T116, the control goes to Step T117 to judge whether the selected elemental mode can be carried out in the current state of the T/F apparatus 400. For example, the call-signal check mode can be carried out only after a call signal has been registered in the EEPROM 556. In the case where no call signal has been registered, a negative judgment is made at Step T117, even if the call-signal check mode is selected. In this case, the control goes to Step T123 to display, on the LCD 100, a message indicating that the selected elemental mode cannot be carried out and an additional message indicating that the CLEAR key 112 or the STOP key 116 can be used to select another elemental mode or end the current mode selection operation. In addition, the CPU 550 sets the third flag G3 to G3=1. Before the CLEAR key 112 or the STOP key 116 is pushed, a positive judgement is repetitively made at Step T117, and Steps T123, T124, and T119 are repeated.

If the CLEAR key 112 is pushed, i.e., if a positive judgment is made at Step T124, the control goes to Step T125 to reset the third flag G3 to G3=0. Then, the control of the CPU 550 goes back to Step T113, i.e., the situation where one of the submodes belonging to the selected main mode is newly selectable. Meanwhile, if the STOP key 116 is pushed, i.e., if a positive judgment is made at Step T119, the control goes to Step T120 to terminate the current mode selection operation, i.e., reset the first to third flags G1, G2, G3 to G1=0, G2=0, G3=0, respectively.

On the other hand, if the selected elemental mode can be carried out, i.e., if a positive judgment is made at Step T117, the control goes to Step T118 to store the selected elemental mode in the selected mode memory 588 and reset each of the first to third flags G1, G2, G3 to zero. In addition, the CPU 550 controls the LCD 100 to resume displaying the respective names of the main modes in the predetermined cyclic order. Meanwhile, in the case where the call-signal registration mode has been selected as an elemental mode, the CPU 550 flickers one or both of the AUTO lamp 536 and the F/T lamp 538 which represents or represent the currently selected one of the four reception modes of the T/F apparatus 400. The flickering of one or both of the two lamps 536, 538 indicates that the registration of a call signal has not been finished. In this case, too, the selected elemental mode is stored in the selected mode memory 588. However, in the case where the facsimile manual reception mode has been selected and neither of the two lamps 536, 538 has been turned on, no flickering occurs even if the call-signal registration mode is selected.

In the next control cycle following the above-described control cycle, a negative judgment is made at Step T101 because the first to third flags G1, G2, G3 have been reset to zero at Step T118. Thus, the T/F apparatus 400 returns to the situation where one of the main modes is newly selectable. So long as the user does not operate the STOP key 116, he or she is allowed to select two or more modes in series. On the other hand, if the STOP key 116 is operated, i.e., if a positive judgment is made at Step T119, the control goes to Step T120 to end the present mode selection operation. Then, the control of the CPU 550 proceeds with Step T3 of FIG. 42.

Meanwhile, if the reception mode key 534 is operated, i.e., if a positive judgment is made at Step T128, the control goes to Step T129 to store the selected one of the four reception modes in the selected mode memory 558. In addition, the CPU 550 turns on, or off, one or both of the AUTO lamp 536 and the F/T lamp 538 depending upon the selected reception mode, thereby indicating the selected reception mode.

After the mode selection operation has been carried out as described above, Step T2 of FIG. 42 is followed by Step T3 to judge whether the T/F apparatus 400 is receiving, from an external communication apparatus, a call signal (from the exchange 139), image information, and/or sound information. If a negative judgment is made at Step T3, the control goes to Step T12 to terminate the current communication operation by clearing the respective contents of various memories and counters and resetting various flags of the apparatus 400. In this case, however, only the memories, counters, and flags which are used in the communication operation are cleared and reset, but the memories, counters, and flags which are used in the mode selection operation are not cleared or reset.

If the T/F apparatus 400 is receiving any information from an external communication apparatus, i.e., if a positive judgment is made at Step T3, the control goes to Step T4 to judge whether the call-signal check mode has been established. If a negative judgment is made at Step T4, the control goes to Step T7 to permit the ringing device 560 to ring, i.e., produce a calling sound. Step T7 is followed by Step T8 to carry out a ringing routine in which the ringing device 560 rings. Although a flow chart representing the ringing routine of Step T8 is not shown, the CPU 550 judges at this step whether the ringing device 560 has been permitted to ring. If a positive judgment is made, the CPU 550 sends a command signal to the third drive circuit 563 so that the third circuit 563 supplies an electric voltage corresponding to the call signal being received, to the ringing device 560 to produce a calling sound having a sound pattern in accordance with the pattern of the electric voltage being supplied, i.e., the pattern of the call signal being received. On the other hand, if the ringing device is not permitted to ring, the CPU 550 does not send that command signal so that the ringing device 560 does not ring. In this situation, the ringing device 560 has been permitted to ring at Step T7, the ringing device 560 rings and produces a calling sound, thereby informing the user of the fact that the T/F apparatus 400 is receiving information.

Step T8 is followed by Step T9 to judge whether the call-signal registration routine has been established. If a positive judgment is made at Step T9, the control goes to Step T10 to carry out the call-signal registration routine according to the control program represented by the flow charts of FIGS. 45 and 46.

Figure 48:
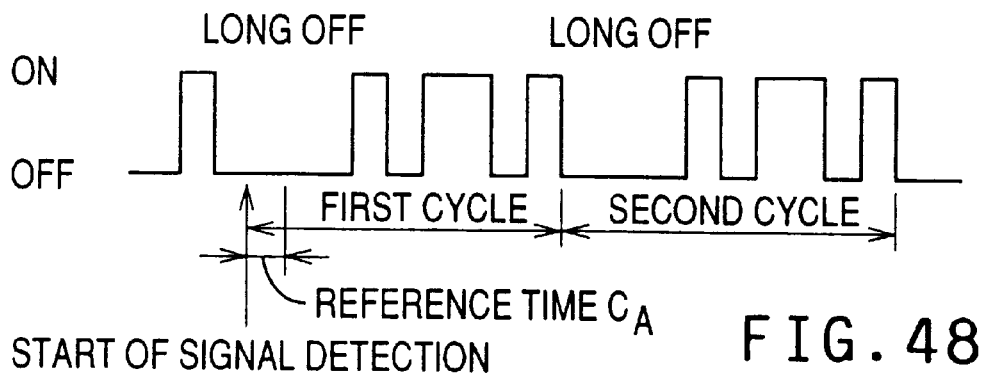
FIG. 48 is a graph corresponding to FIG. 33, showing the ON state, OFF state, and LONG-OFF state of a call signal supplied to the T/F apparatus of FIG. 39.

The registration of an own call signal supplied to the T/F apparatus 400 is carried out by first measuring, following detection of a "LONG-OFF" period shown in FIG. 48, the respective times of "ON" and "OFF" periods, then comparing the measured ON and OFF times of a first cycle with the corresponding measured ON and OFF times of a second cycle following the first cycle, and finally storing, in the EEPROM 556, the respective averages of the ON and OFF times of the two cycles if each pair of compared ON or OFF times are essentially identical with each other within a permissible range of measurement errors. Thus, the pattern of an own call signal is registered in the EEPROM 556 of the T/F apparatus 400.

First, at Step T201, the CPU 550 of the computer 558 judges whether the fourth flag G4 is set at one, i.e., G4=1. The state of G4=1 indicates that the respective patterns of successively detected two cycles of an own call signal are essentially identical with each other and that the T/F apparatus 400 waits for inputting of a user's command to register the signal pattern of the own call signal. Upon initialization of the apparatus 400, the fourth flag G4 had been reset to zero, i.e., G4=0. Therefore, a negative judgment is made at Step T201, and the control of the CPU 550 goes to Step T202 to control the LCD 100 to display a message indicating that the detection of an own call signal has been started.

Step T202 is followed by Step T203 to judge whether the handset 16 has been picked up or the HOOK key 532 has been pushed. When either the handset 16 is picked up, or the HOOK key 532 is pushed, the T/F apparatus 400 is connected to the telephone line 138, so that the apparatus 400 permits the user to talk with a user of a calling communication apparatus. If a negative judgment is made at Step T203, the control of the CPU 550 goes to Step T204 to judge whether the own call signal being detected is taking a low-voltage state, i.e., taking an "ON" state.

If a positive judgment is made at Step T204, the control goes to Step T205 to judge whether the fifth flag G5 is set at one, i.e., G5=1. The state of G5=1 indicates that a LONG-OFF period has been detected. Upon initialization of the T/F apparatus 400, the fifth flag G5 had been reset to zero, i.e., G5=0. Therefore, a negative judgment is made at Step T205, and the control of the CPU 550 goes to Step T206 to reset a content, D2, of the second counter 592 to zero. Then, the control of the CPU 550 returns to Step T2 of the main control routine of FIG. 42.

So long as an ON state of the own call signal is detected, Steps T201 to T206 are repeated. If the own call signal is taking an ON state when the detection of the call signal is started, or the own call signal takes an ON state following an "OFF" state after the call-signal detection has been started, a negative judgment is made at Step T204, so that the control of the CPU 550 goes to Step T212 to store, in the current signal-state memory 586, data indicating that the own call signal is currently taking an OFF state. Simultaneously, data which have been stored up to then in the current signal-state memory 586 are transferred to the prior signal-state memory 588. Subsequently, the control of the CPU 550 goes to Step T213 to add one to the content D2 of the second counter 592. Thus, the time measurement of an OFF state or period is started.

Step T213 is followed by Step T214 to judge whether the own call signal was taking an ON state in the preceding control cycle in accordance with the present routine, i.e., call-signal registration routine, based on the data stored in the prior signal-state memory 584. If the own call signal was taking an OFF state upon starting of this routine, a negative judgment is made at Step T214, so that the control of the CPU 550 goes to Step T218 to judge whether a LONG-OFF period has been detected, by comparing the content D2 of the second counter 592 with a reference value or time, $D_A$. If the counter content, i.e., measured time D2 is not smaller than the reference time $D_A$, a positive judgment is made at Step T218. The reference time $D_A$ is shorter than the time of a LONG-OFF period shown in FIG. 48, but is longer than the time of any OFF period other than the LONG-OFF period. Shortly after the starting of a call-signal registration operation, a negative judgment is made at Step T218, so that the control of the CPU 550 goes back to Step T2 of FIG. 42.

If the own call signal was taking an ON state upon starting of this call-signal registration and then changed to an OFF state, a positive judgment is made at Step T214, so that the control of the CPU 550 goes to Step T215 to judge whether the fifth flag G5 is set at G5=1. At this stage, however, a LONG-OFF period has not been detected, and therefore a negative judgment is made at Step T215. Then, the control goes back to Step T2 of FIG. 42.

So long as an OFF state of the own call signal is detected, Steps T201 to T204, T212, and T213 are repeated and a negative judgment is repetitively made at Step T214, so that at Step T218 the content D2 of the second counter 592 is successively incremented. Unless this OFF state is a LONG-OFF period, the own call signal will change to an ON state before a positive judgment is made at Step T218. In this case, a positive judgment is made at Step T204, and at Step T205 a negative judgment is made because a LONG-OFF period has not been detected yet. Then, the control of the CPU 550 goes to Step T206 to reset or clear the content D2 of the second counter 592 representing the measured time of the current OFF state or period. Thus, the measured time of this OFF period is discarded.

Steps T201 to T206, T212 to T214, and T218 are repeated until a LONG-OFF period is detected. Meanwhile, if an OFF state of the own call signal which continues for a time not less than the reference value $D_A$ is detected, a positive judgment is made at Step T218, so that the control of the CPU 550 goes to Step T219 to judge whether the sixth flag G6 is set at one, i.e., G6=1. The sixth flag G6 is referred to in judging whether to increment a content, D3, of the third counter 594 upon detection of a LONG-OFF period. Upon initialization of the T/F apparatus 400, the sixth flag G6 had been reset to zero, i.e., G6=0. At this stage, therefore, a negative judgment is made at Step T219, so that the control of the CPU 550 goes to Step T220 to set the sixth flag G6 to G6=1 and then goes to Step T221 to set the fifth flag G5 to G5=1, thereby indicating that a LONG-OFF period has been detected, and add one to the content D3 of the third counter 594, thereby counting the number of detected LONG-OFF periods.

Step T221 of FIG. 45 is followed by Step T222 of FIG. 46 where the CPU 550 judges whether the content D3 of the third counter 594 is not less than three, i.e., whether the respective patterns of two cycles of an own call signal have been detected. At this stage, a negative judgment is made at Step T222, so that the control of the CPU 550 goes to Step T223 to transfer data stored in the second signal-pattern memory 582 into the first signal-pattern memory 580. Since, however, the respective signal-pattern data of the first and second signal-pattern memories 580, 582 had been cleared upon initialization of the T/F apparatus 400, no data have been stored in the second memory 582 at the time when a LONG-OFF period is first detected. In the current control cycle, therefore, no data are transferred from the second memory 582 to the first memory 580. Then, the control of the CPU 550 goes back to Step T2 of FIG. 42.

Since the time of a LONG-OFF period is longer than the reference time $D_A$, Steps T201 to T204, T212 to T214, T218, and T219 are repeated even after a positive judgment has been made at Step S218, until the own call signal takes an ON state following the LONG-OFF period.

If the own call signal changes from a LONG-OFF period to an ON state, a positive judgement is made at Step T205 because the fifth flag G5 has been set to G5=1, so that the control of the CPU 550 goes to Step T207 to store, in the current signal-state memory 586, data indicating that the own call signal is currently taking an ON state, and then goes to Step T208 to add one to a content, D1, of the first counter 590 to start measuring the time of the ON state or period. Step T208 is followed by Step T209 to judge whether the own call signal was taking an OFF state (this OFF state may be a LONG-OFF period or a shorter OFF period) before taking the current ON state. If the own call signal has changed from an OFF state to an ON state, a positive judgement is made at Step T209, so that the control of the CPU 550 goes to Step T210 to store the content D2 of the second counter 592 in a first memory area of the second signal-pattern memory 582 and reset the sixth flag G6 to G6=0, and then goes to Step T211 to clear the content D2 of the second counter 592 to zero.

So long as the own call signal being detected continues to take an ON state, Steps T201 to T205, and T207 to T209 are repeated, so that the first counter 590 measures the time of the ON state or period. Meanwhile, if the own call signal changes from the ON state to an OFF state, a negative judgment is made at Step T204, so that the CPU 550 carries out Steps T212 through T215. Since a LONG-OFF period has already been detected, a positive judgment is made at Step T215, so that the control goes to Step T216 to store the content D1 of the first counter 590, i.e., the measured time of the ON period, in a second memory area of the second signal-pattern memory 582, and then goes to Step T217 to clear the content D1 of the first counter 590.

Since this OFF state is not a LONG-OFF period, this OFF state or period will change to an ON state before a positive judgment is made at Step T218. Therefore, a positive judgment is made at Step T204, and the measured time of the OFF period is stored in a third memory area of the second signal-pattern memory 582. Thus, the time or times of ON period or periods and the time or times of OFF period or periods, each contained in the signal pattern of an own call signal, are measured and stored. If a second LONG-OFF period is detected, a positive judgment is made at Step T218. At that time, the sixth flag G3 has already been reset to G6=0, and therefore a negative judgment is made at Step T219, so that at Step T221 one is added to the content D3 of the third counter 594. Thus, the number of detected LONG-OFF periods is counted. Step T221 is followed by Step T222. In this case, a negative judgment is made, so that the control of the CPU 550 goes to Step T223 to transfer the data stored in the second signal-pattern memory 582, i.e., the measured times of the ON and OFF periods of the first cycle, into the first signal-pattern memory 580.

Then, the respective times of ON and OFF periods of the second cycle following the first cycle are measured in the same manner as described above for the first cycle, and stored in the second signal-pattern memory 582. If a third LONG-OFF period is detected, a positive judgment is made at Step T222, so that the control of the CPU 550 goes to Step T224 to judge whether the measured times of the ON and OFF periods of the first cycle are essentially identical with the corresponding ON and OFF times of the second cycle. That is, the respective times of ON and OFF periods of the first cycle stored in the first signal-pattern memory 580 are compared with the respective times of ON and OFF periods of the second cycle stored in the second signal-pattern memory 582. If the respective times of the first cycle are essentially identical with the corresponding times of the second cycle within a permissible range of measurement errors, a positive judgment is made at Step T224.

If a negative judgment is made at Step T224, the control of the CPU 550 goes to Step T223 to transfer the data stored in the second signal-pattern memory 582 to the first signal-pattern memory 580. For example, in the event that the NCU 132 had started measuring the time of a LONG-OFF period from an intermediate point thereof as shown in FIG. 48 and the measured time is longer than the reference time $D_A$, the measured OFF period is identified or counted as a LONG-OFF period and the measured time is stored as the time of a LONG-OFF period. Since, however, the stored time of the LONG-OFF period is shorter than the correct or proper time of a LONG-OFF period, a negative judgment is made at Step T224. In this case, the respective times of ON and OFF periods of a third cycle following the second cycle are measured and stored in the second signal-pattern memory 582. In this way, the ON- and OFF-time measurements of an own call signal are continued until a positive judgment is made at Step T224.

If the respective times of ON and OFF periods of a first cycle are essentially identical with the corresponding times of a second cycle following the first cycle, that is, if a positive judgment is made at Step T224, then the control of the CPU 550 goes to Step T225 to clear the respective contents of the first to third counters 590 to 594, reset the fifth and sixth flags G5, G6 to G5=0 and G6=0, respectively, clear the first and second signal-pattern memories 580, 582, clear the prior and current signal-state memories 584, 586, and set the fourth flag G4 to G4=1, thereby indicating that the respective patterns of two successive cycles of an own call signal have been found to be essentially identical with each other.

Step T225 is followed by Step T226 to control the LCD 100 to display a message indicating that if the user wishes to register the detected own call signal, the user is requested to pick up the handset 16 or push the HOOK key 532. At the following Step T227, the CPU 550 judges whether the handset 16 has been picked up or the HOOK key 532 has been pushed. If a negative judgment is made at Step T227, the control goes back to Step T2 of FIG. 42. Steps T2–T4, T7–T9, T201, and T227 are repeated until the handset 16 is picked up or the HOOK key 532 is operated.

If a positive judgment is made at Step T227, the control of the CPU 550 goes to Step T228 to control the LCD 100 to display a message indicating that if the user pushes the START key 114 the detected own call signal is registered and if the user pushes the STOP key 116 the detected own call signal is not registered, i.e., is discarded. Step T228 is followed by Step T229 to judge whether the handset 16 has been put down on the lower housing 12, or the HOOK key 532 is pushed again. If a positive judgment is made at Step T229, the control goes to Step T232 to disconnect the T/F apparatus 400 from the telephone line 138 and end the current communication, and then goes back to Step T2 of FIG. 42. On the other hand, if a negative judgment is made at Step T229, the control goes to Step T230 to judge whether the STOP key 116 has been pushed. If a negative judgment is made at Step T230, the control goes to Step T231 to judge whether the START key 114 has been pushed.

Steps T229 to T231 are repeated before detection of one of (a) the putting-down of the handset 16, (b) the pushing of the HOOK key 532, (c) the pushing of the STOP key 116, and (d) the pushing of the START key 114. If the handset 16 is put down or the HOOK key 532 is operated, Step T232 is carried out in the manner as described above.

On the other hand, if the user does not wish to register the detected own call signal, e.g., for the reason why the call signal does not correspond to a call number for the facsimile machine of the T/F apparatus 400, and therefore pushes the STOP key 116, the control of the CPU 550 goes to Step T234 to command the LCD 100 to display a message of "TELE-PHONE" indicating that the telephone line 138 is alive. In this case, the user of the T/F apparatus 400 can talk with the user of a calling communication apparatus via the telephone line 138, or otherwise the facsimile machine of the apparatus 400 can receive image information from the calling apparatus. Step T234 is followed by Step T235 to judge whether the START key 114 has been pushed to input a user's command to receive the facsimile information. If a negative judgment is made at Step T235, the control of the CPU 550 goes to Step T236 to judge whether the handset 16 has been put down, or the HOOK key 532 has been pushed, to input a user's command to end the telephone talk. On the other hand, if a positive judgment is made at Step T235, the control goes to Step T237 where the facsimile machine of the T/F apparatus receives image information.

When the T/F apparatus 400 is placed in the call-signal registration mode, the apparatus 400 is automatically placed in the facsimile manual reception mode, irrespective of whichever reception mode has been selected through operation of the reception mode key 534. Therefore, if the user of the apparatus 400 can hear the voices of the other person through the handset 16 being picked up, or through the speaker 576 after the HOOK key 532 has been pushed, he or she can talk with the other person. Meanwhile, if not, the user can judge that the facsimile machine of the apparatus 400 is being called, so that he or she pushes the START key 114 to receive, at Step T237, the image information transmitted from the calling communication apparatus.

In the case where the telephone set of the T/F apparatus 400 is called, sound information is received by the NCU 132, so that the received sound information is supplied to the handset 16 or the speaker 576. Thus, the voices of the other person are output to be heard by the user of the apparatus 400, and the user can talk with the other person. In the case where image information is transmitted from an external facsimile machine, the analog image information is received by the NCU 132, so that the received image information is supplied to the modem 564 wherein the modulator and demodulator device 570 converts the analog image information into digital image information. Then, the digital image information is supplied to the recording device 30, so that the recording device 30 records, on recording sheets 18, images according to the supplied image information. After all the image information has been received and recorded, the CPU 550 terminates the current communication and the control returns to Step T2 of FIG. 42.

If the calling sound produced by the ringing device 560 at Step T8 is heard by the user such that the calling sound has a sound pattern in accordance with an own call signal corresponding to an own call number of the facsimile machine of the T/F apparatus 400, then the user will push the START key 114. If the START key 114 is thus pushed and a positive judgment is made at Step T231, the control of the CPU 550 goes to Step T233 to calculate the average of (a) each of the three ON times and three OFF times of the first cycle stored in the first signal-pattern memory 580 and (b) a corresponding one of the three ON times and three OFF times of the second cycle stored in the second signal-pattern memory 582, and store the calculated respective averages as pattern data representing the signal pattern of the own call signal, in the EEPROM 556. Thus, the own call signal is registered on the T/F apparatus 400. Thus, at Step S233, the signal pattern of an own call signal is registered in the form of pattern data including the respective counted values of the ON and OFF periods each of which is measured beginning at the time of transition from an ON state to an OFF state or the time of transition from an OFF state to an ON state. In the present embodiment, a single own call signal is registered for the facsimile machine or function of the apparatus 400. The call signal includes three ON periods, and three OFF periods one of which is a LONG-OFF period, as shown in FIG. 48.

The flickering of one or both of the AUTO lamp 536 and the F/T lamp 538 that has continued after the call-signal registration mode has been selected, is stopped, and the two lamps 536, 538 are returned to the respective states thereof before the selection of the registration mode. Subsequently, the call-signal registration mode is automatically switched to the call-signal check mode. Once a call signal has been registered, the registration mode is not carried out any more until the registration mode is selected again for updating the registered call signal. In the call-signal check mode, the T/F apparatus 400 operates for identifying whether a call signal being supplied is identical with the registered call signal. Step T233 is followed by Step T234 and the following steps. If the START key 114 is operated, the control of the CPU 550 goes to Step T237 to receive image information. Thus, this routine is ended, and the control of the CPU 550 goes back to Step T2 of FIG. 42.

When the call-signal check mode is established in this way, or when the check mode has been selected by the user at Step T2, a positive judgment is made at Step T4 so that the control of the CPU 550 goes to Step T5, i.e., call-signal check routine of FIG. 47.

The checking of a call signal is carried out according to the call-signal check routine, generally in the following manner: First, the detection of a call signal is started when the call signal changes from an ON state thereof to an OFF state thereof. The respective times of ON and OFF states of the call signal are measured by the first and second counters 590, 592. When an ON state changes to an OFF state or when an OFF state changes to an ON state, the measured ON or OFF state is stored in the second signal-pattern memory 582. Each time an OFF state is detected, the total number of the ON and OFF states detected up till then are compared with the total number of ON and OFF states of the registered call signal. If the two total numbers are identical with each other, the respective times of ON and OFF states or periods of the detected call signal are compared with those of the registered call signal. If one cycle of a call signal is detected before the two total numbers are found to be identical with each other, it is concluded that the two call signals are not identical with each other, and the checking of the call signal is ended.

There will be described the call-signal check routine of Step T5 of FIG. 42, by reference to the flow chart of FIG. 47.

First, at Step T301, the CPU 550 of the computer 558 judges whether the seventh flag G7 is set at one, i.e., G7=1. The state of G7=1 indicates that the checking of an own call signal being detected has been finished and that the detected call signal has not been found to be identical with the registered call signal. Upon initialization of the T/F apparatus 400, the seventh flag G7 had been reset to zero, i.e., G7=0. Therefore, a negative judgment is made at Step T301, and the control of the CPU 550 goes to Step T302 to judge whether the own call signal being detected is taking a low-voltage state, i.e., taking an "ON" state. If a positive judgment is made at Step T302, the control goes to Step T322 to store, in the current signal-state memory 586, data indicating that the own call signal is currently taking an ON state.

Step T322 is followed by Step T323 to judge whether the eighth flag G8 is set at one, i.e., G8=1. The state of G8=1 indicates that the call signal being detected has first changed from an ON state thereof to an "OFF" state thereof. Upon initialization of the T/F apparatus 400, the eighth flag G8 had been reset to zero, i.e., G8=0. Therefore, a negative judgment is made at Step T323, and the control of the CPU 550 proceeds with Step T6 of the main control routine of FIG. 42. So long as an ON state of the own call signal continues, Steps T301, T302, T322, and T323 are repeated.

If the own call signal is taking an OFF state when the detection of the call signal is started, or the own call signal takes an OFF state following an ON state after the call-signal detection has been started, a negative judgment is made at Step T302, so that the control of the CPU 550 goes to Step T303 to store, in the current signal-state memory 586, data indicating that the own call signal is currently taking an OFF state. Subsequently, the control of the CPU 550 goes to Step T304 to add one to the content D2 of the second counter 592, and then to Step T305 to judge whether the own call signal was taking an ON state in the preceding control cycle in accordance with the present routine, i.e., call-signal check routine, based on the data stored in the prior signal-state memory 584. If the own call signal was taking an OFF state upon starting of this routine, a negative judgment is made at Step T305, so that the control of the CPU 550 goes to Step T313 to judge whether the eighth flag G8 is set at one, i.e., G8=1. At this stage, a negative judgment is made, so that the control of the CPU 550 goes to Step S314 to clear the content D2 of the second counter 592. Then, the control of the CPU 550 proceeds with Step T6 of FIG. 42.

If the own call signal was taking an ON state upon starting of the current call-signal checking and then changed to an OFF state, a positive judgment is made at Step T305, so that the control of the CPU 550 goes to Step T306 to judge whether the eighth flag G8 is set at G8=1. At this stage, however, a negative judgment is made at Step T306, so that the control of the CPU 550 goes to Step T307 to set the eighth flag G8 to G8=1, thereby indicating that the call signal being detected has changed from an ON state to an OFF state. Subsequently, the T/F apparatus 400 measures the respective times of OFF and ON states or periods of the call signal being detected and checks the detected call signal against the registered call signal.

Figure 49A:
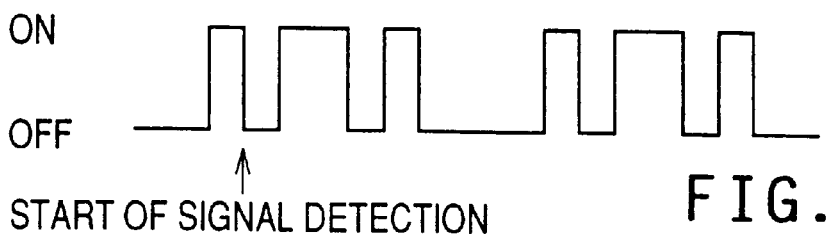
FIG. 49(A) is a graph showing a call signal consisting of three ON states and three OFF states, and a start of signal detection at a first one of three ON-to-OFF transitions thereof.
Figure 49B:
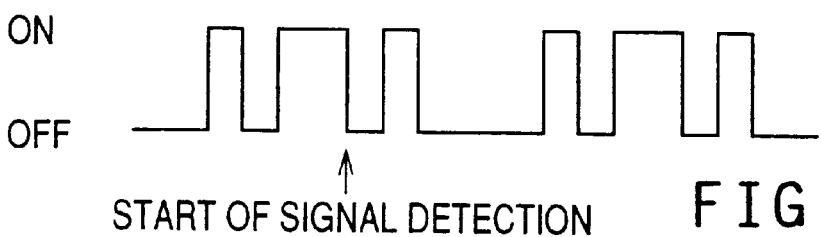
FIG. 49(B) is a graph showing the call signal of FIG. 49(A), and a start of signal detection at a second one of the three ON-to-OFF transitions.
Figure 49C:
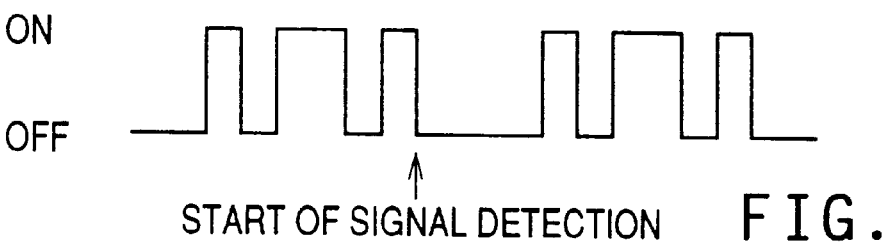
FIG. 49(C) is a graph showing the call signal of FIG. 49(A), and a start of signal detection at a third one of the three ON-to-OFF transitions.

A call signal has at least one ON state and at least one OFF state. In the present embodiment, a call signal has at most three ON states and at most three OFF states. Therefore, a call signal has at least one transition from an ON state to an OFF state. At this transition, the T/F apparatus 400 starts measuring the respective times of ON and OFF periods of one cycle of a call signal being detected. In the case where a call signal has three ON states and three OFF states as shown in FIG. 48, the call signal has three ON-to-OFF transitions at each of which the apparatus 400 can start measuring the respective times of ON and OFF states of the call signal as shown in FIGS. 49(a), 49(b), and 49(c). Otherwise, it is possible to start the ON and OFF time measurements at the time of detection of a LONG-OFF period, like in the call-signal registration mode. In the latter case, however, the apparatus 400 must wait for the reception of a LONG-OFF period, so that the starting of a call-signal checking operation is delayed. In the present embodiment, the checking of a call signal is started faster, and is completed in a shorter time. In addition, since the ON and OFF time measurements are started just at the point of transition from an ON state to an OFF state, the call-signal check routine is free from the problem encountered in the call-signal registration routine that if a time measurement is started at an intermediate point of a LONG-OFF period, the measured OFF time must be discarded.

So long as an OFF state of the own call signal continues, Steps T301 to T305, T313, and T315 are repeated to measure the time of the OFF state. At Step T315, the CPU 550 judges whether a LONG-OFF period has been detected, by comparing the content D2 of the second counter 592 with a reference value or time, $D_A$. If the counter content, i.e., measured time D2 is not shorter than the reference time $D_A$, a positive judgment is made at Step T315. The reference time $D_A$ is shorter than the time of a LONG-OFF period shown in FIG. 48, but is longer than the time of any OFF period other than the LONG-OFF period. If a positive judgment is made at Step T315, the control of the CPU 550 goes to Step T316 to judge whether the ninth flag G9 is set at G9=1. Like the sixth flag G6, the ninth flag G9 is referred to in judging whether to increment the content D3 of the third counter 594 upon detection of a LONG-OFF period.

Upon initialization of the T/F apparatus 400, the ninth flag G9 had been reset to zero, i.e., G9=0. At this stage, therefore, a negative judgment is made at Step T316, so that the control of the CPU 550 goes to Step T317 to set the ninth flag G9 to G9=1 and then goes to Step T318 to add one to the content D3 of the third counter 594, thereby counting the number of detected LONG-OFF periods. Step T318 is followed by Step T319 to judge whether the content D3 of the third counter 594 is not less than two, i.e., whether the pattern of one cycle of an own call signal has been detected. At this stage, a negative judgment is made at Step T319, so that the control of the CPU 550 goes to Step T6 of FIG. 42.

If this OFF state is a LONG-OFF state, Steps T301–T305, T313, T315, and T316 repeated. On the other hand, if the OFF state is not a LONG-OFF state, Steps T301–T305, T313, and T315 repeated. If the call signal changes from the OFF state to an ON state, a positive judgment is made at Step T302 so that the control of the CPU 550 goes to Step T322 to store, in the current signal-state memory 586, data indicating that the call signal is currently taking an ON state. Step T322 is followed by Step T323 where a positive judgement is made because the eighth flag G8 has been set to G8=1 at Step T307, so that the control of the CPU 550 goes to Step T324 to add one to the content D1 of the first counter 590 to start measuring the time of the ON state or period.

Step T324 is followed by Step T325 to judge whether the own call signal was taking an OFF state (this OFF state may be a LONG-OFF period or a shorter OFF period) before taking the current ON state. If the own call signal has changed from an OFF state to an ON state, a positive judgement is made at Step T325, so that the control of the CPU 550 goes to Step T326 to store the content D2 of the second counter 592 in a first memory area of the call-signal check memory 589 and reset the ninth flag G9 to G9=0, and then goes to Step T327 to clear the content D2 of the second counter 592 to zero. Then, the control of the CPU 550 goes to Step T6 of FIG. 42.

So long as the own call signal being detected continues to take an ON state, Steps T301, T302, and T322 to T325 are repeated, so that the first counter 590 measures the time of the ON state or period. Meanwhile, if the own call signal changes from the ON state to an OFF state, a positive judgment is made at Step T305 and a positive judgment is made at Step T306, so that the control of the CPU 550 goes to Step T308 to store the content D1 of the first counter 590, i.e., the measured time of the ON period, in a second memory area of the call-signal check memory 589, and then goes to Step T309 to clear the content D1 of the first counter 590.

Step T309 is followed by Step T310 to judge whether the total number of the measured ON and OFF states of the call signal being received is identical with that of the registered call signal. The total number of the memory areas of the check memory 589 in which the measured ON and OFF times have been stored, is used as the former total number. At this stage, only one OFF state and one ON state have been detected and stored, and therefore a negative judgment is made at Step T310.

Figure 50:
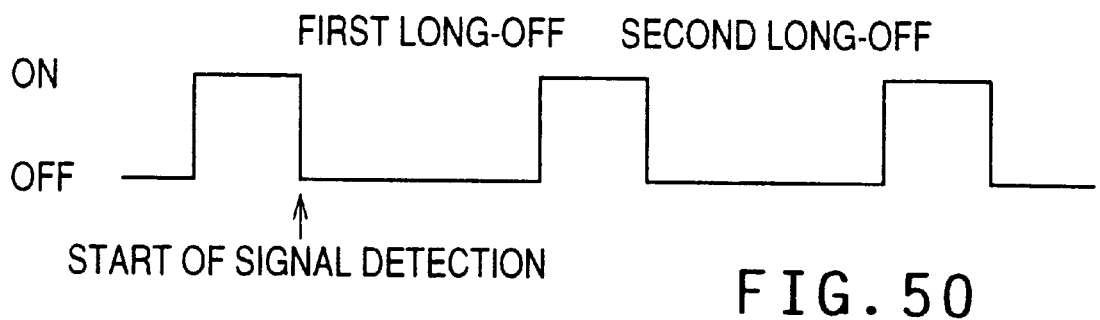
FIG. 50 is a graph showing a call signal consisting of one ON state and one OFF state (one LONG-OFF period), and a start of signal detection at a single ON-to-OFF transition thereof.

The call signal registered or stored in the EEPROM 556 has three ON states and three OFF states. Therefore, if the call signal being received has one ON state and one OFF state, as shown in FIG. 50, the T/F apparatus 400 detects two LONG-OFF periods before a positive judgment is made at Step T311, i.e. before the two total numbers coincide with each other. Thus, the call signal shown in FIG. 50 is discarded by the facsimile function of the T/F apparatus 400.

In the case of a call signal consisting of one ON period and one OFF period, the OFF period is a LONG-OFF period. Therefore, the second OFF period that is detected after an ON period has changed to an OFF period (i.e., first LONG-OFF period) and ON and OFF time measurements have started, is the second LONG-OFF period. The ON and OFF time measurements of one cycle of this call signal ends with the detection of the second LONG-OFF period. If one cycle of a call signal is detected before the respective total numbers of ON and OFF periods of the detected and registered call signals coincide with each other, the T/F apparatus 400 concludes that the detected call signal is not identical with the registered call signal. In this case, a positive judgment is made at Step T319, so that the control of the CPU 550 goes to Step T320 to permit the ringing device 560 to ring. Step T320 is followed by Step T321 to set the seventh flag G7 to G7=1, thereby indicating that the detected call signal is not identical with the registered call signal.

Therefore, a positive judgment is made at Step T6 of the main control routine of FIG. 42, so that the control of the CPU 550 goes to Step T8 where the ringing device 560 is driven to ring, i.e., produce a calling sound, thereby requesting the user to pick up the handset 16 to talk with the other person, or push the HOOK key 532 to hear the voices of the other person. While the T/F apparatus 400 remains in the call-signal check mode, a negative judgment is repetitively made at Step T6 and therefore no calling sound is produced, until the ringing device 560 is permitted to ring at Step T320. When the call signal being detected is found to be not identical with the registered call signal and therefore the ringing device 560 is permitted to ring at Step T320, the ringing device 560 starts ringing at Step T8. Since the call-signal check mode cannot be carried out concurrently with the call-signal registration mode, a negative judgment is made at Step T9, so that the control goes to Step T11 to carry out other operations according to the currently selected operation mode or modes such as the facsimile manual reception mode.

Figure 51A:
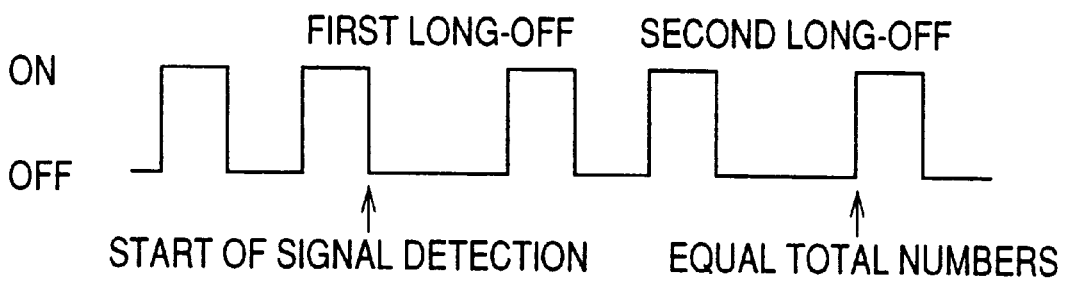
FIG. 51(A) is a graph showing a call signal consisting of two ON states and two OFF states, and a start of signal detection at one of two ON-to-OFF transitions thereof.

In the case of a call signal consisting of two ON states and two OFF states, the call signal has two ON-to-OFF transitions. If ON and OFF time measurements start at one of the two transitions when an ON state changes to a LONG-OFF period, as shown in FIG. 51(A), two LONG-OFF periods will be detected before the respective total numbers of the measured and registered call signals coincide with each other. Thus, this call signal is found to be not identical with the registered signal, and is discarded by the facsimile function of the T/F apparatus 400.

Figure 51B:
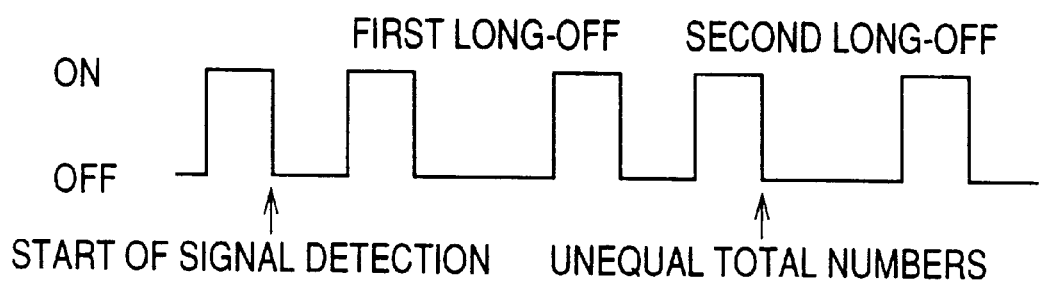
FIG. 51(B) is a graph showing the call signal of FIG. 51(A), and a start of signal detection at the other ON-to-OFF transition.

On the other hand, if ON and OFF time measurements start at the other ON-to-OFF transition when an ON state changes to an OFF state other than a LONG-OFF period, as shown in FIG. 51(B), the T/F apparatus 400 will detect three ON states and three OFF states, i.e., six ON and OFF states in total, before two LONG-OFF periods are detected. In this case, therefore, the respective total numbers of ON and OFF states of the measured and registered call signals coincide with each other. This is also the case with a call signal consisting of three ON states and three OFF states shown in FIG. 49(A) through 49(C).

In the above cases, a positive judgment is made at Step T310, so that the control of the CPU 550 goes to Step T311 to compare each of the measured ON and OFF times of one cycle of the call signal being received, with a corresponding one of the ON and OFF times of the registered call signal, within a permissible range of measurement errors. It is not required that the respective patterns of the two call signals completely coincide with each other.

In the case of a call signal having three ON states and three OFF states, ON and OFF time measurements can start at any of the three ON-to-OFF transitions, as shown in FIGS. 49(A), 49(B), and 49(C). Therefore, if the first comparison at Step T311 is found to be negative, the second or third comparison is carried out by changing the order of comparison of the ON and OFF times of the detected call signal stored in the call-signal check memory 589, relative to the order of comparison of the ON and OFF times of the registered call signal stored in the EEPROM 556, for example, starting with the second or third OFF state of the detected call signal and ending with the first or second ON state of the same, without any change of the comparison order of the registered call signal.

In the case where a call signal consisting of two ON states and two OFF states is detected, the respective total numbers of ON and OFF states of the detected and registered call signals may coincide with each other, but the respective times of the ON and OFF states of the detected call signal cannot coincide with those of the corresponding ON and OFF states of the registered call signal. In this case, therefore, a negative judgment is made at Step T311, so that the control of the CPU 550 goes to Step T320.

If the call signal being received includes three ON states and three OFF states, i.e., six ON and OFF states in total and the respective times of ON and OFF states of the received call signal coincide with those of the corresponding ON and OFF states of the registered call signal, a positive judgment is made at Step T311, so that the control of the CPU 550 proceeds with Step T312 to automatically receive image information from the calling facsimile machine. In the present embodiment, an own call signal corresponding to an own call number for the facsimile machine of the T/F apparatus 400, i.e., own facsimile number of the same 400, is registered or stored in the EEPROM 556. If a call signal being received is found to be identical with the registered call signal, the apparatus 400 identifies that the facsimile machine of the apparatus 400 is being called and that image information is being transmitted to the apparatus 400. The received image information is stored in the RAM 554 and then output by the apparatus 400, or output without being stored in the RAM 554. In this case, the ringing device 560 is not permitted to ring at Step T320, so that the ringing device 560 does not ring at Step T8 of the main control routine of FIG. 42. Thus, the "no-ringing" information reception is carried out on the T/F apparatus 400.

At Step T312, after all the image information has been received by the T/F apparatus 400, the CPU 550 terminates the current communication by clearing the respective contents of the pertinent memories and counters and resetting the pertinent flags.

If the T/F apparatus 400 is currently placed in the previously-described OFF mode in which neither of the call-signal registration and check modes is carried out, a negative judgment is made at each of Steps T4 and T9, so that the control of the CPU 550 goes to Step T11 to carry out other operations such as one of the reception modes which is currently selected through operation of the reception mode key 534.

As is apparent from the foregoing description, the T/F apparatus 400 registers a call signal by storing the respective times of ON and OFF periods of the call signal. Therefore, the apparatus 400 is free from the problem that a conventional T/F apparatus may malfunctions due to noise mixed with a call signal supplied thereto. The conventional apparatus registers a call signal by storing data indicating whether an ON or OFF period of the call signal is longer or shorter than a threshold length and identifying a call signal to be identical, or not identical, with the registered call signal by comparing an ON or OFF period of the call signal with the threshold length. Thus, the checking or identification of a call signal being received is carried out with accuracy by the T/F apparatus 400. Even if noise is mixed with a call signal just at the time of transition of an ON state to an OFF state or transition of an OFF state to an ON state, no erroneous judgment is made by the T/F apparatus 400, unless the pattern of the noise-mixed call signal incidentally coincides with that of the registered call signal. Thus, the reliability of call-signal checking of the apparatus 400 is very high.

In the T/F apparatus 400, a call signal is not registered unless the respective patterns of two successive cycles of the call signal coincide with each other. Therefore, there is substantially no possibility that a noise-mixed call signal is registered as a correct call signal in the apparatus 400. In this respect, too, the reliability of the apparatus 400 is improved.

The T/F apparatus 400 registers a call signal which is supplied thereto from the exchange 139. Thus, the user can easily register a call signal in the apparatus 400 by just operating the START key 114 of the operator panel 498.

When image information is transmitted to the facsimile machine of the T/F apparatus 400, no ringing or calling sound is produced. In this case, therefore, the user need not pick up the handset 16. Additionally, the number of operations (i.e. ringing) of the ringing device 560 is decreased, which contributes to making the environment of the user less noisy.

As previously described, the T/F apparatus 400 is programmed not to select the call-signal check mode in the case where no call signal has been registered or stored in the EEPROM 556. Thus, the apparatus 400 effectively prevents the user from doing the useless mode selection operation and prevents itself from doing the useless call-signal check operation. Step T117 stored in the ROM 552 and a portion of the computer 558 which carries out Step T117 cooperate with each other to function as means for preventing the call-signal check mode from being selected in the case where no call signal has been registered in the apparatus 400.

Step T224 stored in the ROM 552 and a portion of the computer 558 which carries out Step T224 cooperate with each other to function as means for removing noise, or the influences of noise, from a call signal to be registered in the T/F apparatus 400.

The NCU 132, the modulator and demodulator device 570, a portion of the computer 558 which controls the device 570, and the recording device 30 cooperate with one another to function as an image-information receiver; the handset 16 and a portion of the NCU 132 which controls the handset 16 cooperate with each other to function as a sound-information receiver; and Steps T7, T8, and T312 stored in the ROM 552 and a portion of the NCU 132 which carries out those steps cooperate with each other to function as an information-reception control device.

In the T/F apparatus 400, the respective times of ON and OFF periods of a call signal are stored as signal-pattern data in the EEPROM 556. However, it is possible to store, as the signal-pattern data, the respective ratios of the ON and OFF times of a call signal with respect to a reference time such as the time of a LONG-OFF period.

While the T/F apparatus 400 registers a call signal by storing the respective times of ON and OFF periods of the call signal, it is possible to measure, using a single counter, the times of transition from an ON state to an OFF state and from an OFF state to an ON state and register the call signal by storing the measured ON-to-OFF and OFF-to-ON transition times. In this case, the counter is not cleared to zero even when the call signal changes between ON and OFF states.

The T/F apparatus 400 may be modified such that the apparatus 400 compares the respective measured times of ON and OFF states of the first cycle of a call signal, with the respective measured times of ON and OFF states of the following, second cycle of the call signal, except for comparing the measured times of LONG-OFF periods with each other. In the modified comparison manner, the apparatus 400 can register, in almost cases, a call signal by detecting just two cycles of the call signal. Therefore, the time necessary for registration of a call signal is reduced.

Although in the T/F apparatus 400 the respective times of both ON and OFF states of a call signal are stored in the EEPROM 556 and utilized to check a call signal being received, the apparatus 400 may be modified to register the time or times of only one of ON and OFF states of a call signal. In this case, the time necessary for checking of a call signal being received is decreased.

The T/F apparatus 400 registers a call signal which is supplied from the exchange 139 in response to a calling of an external communication apparatus. However, the apparatus 400 may be modified to register a call signal which is input by the user through operation of the operator panel 498. For example, the respective times of ON and OFF periods of an own call signal corresponding to an own call number which the user wishes to use for the facsimile machine of the apparatus 400, may be input by operating the numeral keys 104 of the operator panel 498. In this case, the computer 558 is programmed to register, in the EEPROM 556, the time data input by the user, as signal-pattern data to refer to in checking a call signal. The respective times of ON and OFF periods input by the user through the operator panel 498 may be real times in the term of, e.g., seconds, or be values which a counter counts or measures, or be percentages, proportions, or ratios with respect to the overall time of one cycle of the call signal.

The T/F apparatus 400 may be modified such that the apparatus 400 does not compare the total number of ON and OFF states of a call signal being received, with that of the registered call signal, before the apparatus 400 has detected two cycles of the call signal.

In the case where the overall time of one cycle of a call signal is known to the T/F apparatus 400, the apparatus 400 may be modified to start measuring the respective times of ON and OFF periods of the call signal, at any point in one cycle of the call signal, to register or check the call signal.

The ringing operation of the ringing device 560 of the T/F apparatus 400 is controlled by the computer 558, or the CPU 550. However, the ringing device 560 may be modified to produce a calling sound directly based on a call signal supplied to the apparatus 400. In the latter case, the third drive circuit 563 which regulates the supplying of an electric voltage to the ringing device 560 may be modified such that the circuit 563 is selectively placed in a first state thereof in which the circuit 563 can directly receive the call signal supplied to the apparatus 400 and a second state thereof in which the circuit 563 cannot do it. Normally, the circuit 563 is placed in the second state. In the call-signal check mode, the circuit 563 remains in the second state, so that no calling sound is produced. On the other hand, when the apparatus 400 is not placed in the call-signal check mode, or when, even in the call-signal check mode, a call signal being received is found to be not identical with the registered call signal and therefore the ringing device 560 is permitted to ring, the circuit 563 is placed in the first state. The CPU 550 switches the circuit 563 between the first and second states thereof. Upon initialization of the apparatus 400, the circuit 563 is placed in the second state. At Step T7, the circuit 563 is switched from the second state to the first state so that the circuit 563 can be supplied with the call signal being received. Thereafter, without any control of the CPU 550, the ringing device 560 can produce a calling sound having a sound pattern in accordance with the signal pattern of the call signal. In this case, therefore, Step T8 is not needed.

The T/F apparatus 400 does not produce any calling sound when receiving image information, i.e., when the facsimile machine thereof is being called. On the other hand, the apparatus 400 produces a calling sound when receiving sound information, i.e., when the telephone set thereof is being called. However, the apparatus 400 may be modified such that the apparatus 400 does not produce a calling sound when the telephone set is being called, for example, when the apparatus 400 is placed in the answering telephone mode. In the latter case, the NCU 132, the sound digitizer 572, and a portion of the RAM 554 in which digital sound signals are stored, and a portion of the computer 558 which controls the sound digitizer 572 cooperate with one another to function as a sound-information receiver which stores sound information or signals in that portion of the RAM 554. Meanwhile, the handset 16, the HOOK key 532, and the speaker 576 cooperate with one another to enable sound information supplied from the calling apparatus to be heard by the user of the apparatus 400. These members 16, 532, 576 function as elements of the sound-information receiver. The ringing device 560 may be modified in such a way that the device 560 rings whenever the sound-information receiver receives sound information, or that the device 560 rings only when the apparatus 400 permits the user to talk with the other person.

In the case where the T/F apparatus 400 is modified such that the apparatus 400 does not ring in the answering telephone mode, an additional step may be inserted between Steps T4 and T7 to judge whether the answering telephone mode has been selected on the apparatus 400. If a positive judgment is made at this additional step, the control of the CPU 550 directly goes to Step T11 without permitting the ringing device 560 to ring. At Step T11, the answering telephone operation is carried out as one of the other operations. On the other hand, if a negative judgment is made at the added step, the control goes to Step T7 to permit a ringing. Otherwise, a control program used to carry out the answering telephone mode may be arranged to inhibit any ringing. In the last case, a ringing once started is stopped when the answering telephone operation is started.

The T/F apparatus 400 can register only a single call signal corresponding to a call number for the facsimile machine thereof. However, the apparatus 400 may be modified to register a plurality of different call signals and identify the different call signals from each other. In the latter case, the apparatus 400 may register two or more call signals corresponding to different own call numbers (i.e., telephone numbers) for the telephone set thereof and/or two or more call signals corresponding to different own call numbers (i.e., facsimile numbers) for the facsimile machine thereof. The apparatus 400 may be modified to identify the call signals for the telephone set and the call signals for the facsimile machine, from each other, and/or each one of all the call signals for the telephone set and the facsimile machine, from the other call signals. In any case, the user can use the T/F apparatus 400 as if the single apparatus 400 had a plurality of telephone sets and/or a plurality of facsimile machines. In the case where the user wishes to use the T/F apparatus 400 as if the single apparatus 400 had a plurality of telephone sets, the apparatus 400 may be constructed to produce different calling sounds in response to different call signals, respectively, so that the user can recognize the telephone number currently being used by the calling apparatus, or who is being called by the calling person, from the other telephone number or numbers, or who is or are not being called. In addition, the T/F apparatus 400 may be constructed to establish the answering telephone mode with respect to some of the call signals and not to establish the same for the other call signal or signals. In the case where the user wishes to use the T/F apparatus 400 as if the single apparatus 400 had a plurality of facsimile machines, the apparatus 400 may be constructed to have a plurality of memories related with the own call signals, i.e., own call numbers, store a batch of image information supplied with one of the call signals, in one of the memories which corresponds to that call signal, and output the batch of image information stored in one of the memories in response to a user's output command specifying the call number corresponding to that memory.

While the third embodiment relates to the answering telephone and facsimile (T/F) apparatus 400, the features of the third embodiment may be achieved on a telephone set without any facsimile function, or on a facsimile machine without any telephone function.

Hereinafter, there will be described a fourth embodiment of the present invention. The fourth embodiment relates to an answering telephone and facsimile (T/F) apparatus 600 shown in FIG. 52, and has a hardware construction similar to that of the T/F apparatus 10 as the first embodiment. The same reference numerals as used in FIGS. 1 to 4 are used to designate the corresponding elements or parts of the fourth embodiment, and a repetitive description of those elements or parts is omitted. However, the T/F apparatus 600 is different from the T/F apparatus 10, as described below.

The T/F apparatus 600 is connected, via a private branch exchange ("PBX") 602 and an extension line 604, to one or more internal telephone sets, facsimile machines, and/or T/F apparatuses (not shown) possessed by the person (e.g., company) who possesses the apparatus 600. A plurality of different extension-line call numbers are allotted to the apparatus 600, according to a common numbering rule different from the common numbering rule according to which a plurality of different external-line call numbers are allotted to the apparatus 600 by the telephone company who possesses an external exchange 139.

An EEPROM 126 of the apparatus 600 has a registered code-number table memory 606, shown in FIG. 53, different from the memory 230 of the T/F apparatus 10 shown in FIG. 9, and a ROM 124 of the apparatus 600 stores a control program represented by the flow chart of FIG. 54 which is obtained by modifying the call-signal registration routine of FIG. 15 as described below. The flow chart of FIG. 54 includes, between Steps S233 and S234 of FIG. 15, additional Steps S250, S251, and S252, and includes Step S253 in place of Step S234.

The PBX 602 transmits an external-line call signal supplied thereto from the external exchange 139, without any addition to the call signal, to an NCU 132 of the T/F apparatus 600. On the other hand, when the PBX 602 receives an extension-line call signal via the extension line 604, the PBX 602 adds a signal identifying the extension-line call signal from the external-line call signals, and the thus modified call signal is supplied to the apparatus 600.

Figure 54:
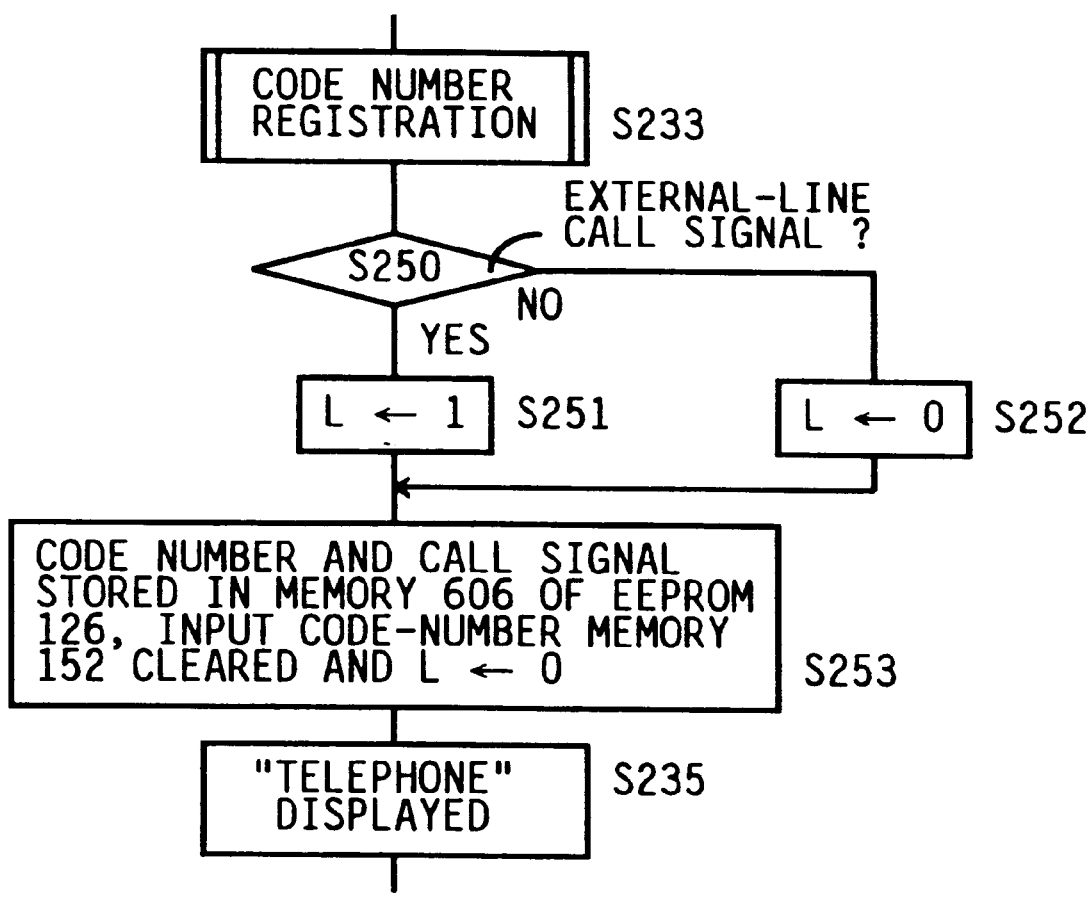
FIG. 54 is a flow chart corresponding to FIG. 15, representing a modified call-signal registration routine according to which one or more call signals are registered on the T/F apparatus of FIG. 52.

At Step S250 of FIG. 54, a CPU 120 of a computer 128 judges whether a call signal being supplied to the T/F apparatus 600 is an external-line call signal, by identifying whether the call signal being supplied includes the extension-line call-signal identifying information added by the PBX 602. If the call signal does not include the identifying information, a positive judgment is made at Step S250, so that the control of the CPU 120 goes to Step S251 to set a flag, L, of a RAM 122 to one, i.e., L=1. On the other hand, if the call signal includes the identifying information, a negative judgment is made at Step S250, so that the control of the CPU 120 goes to Step S252 to reset the flag L to zero, i.e., L=0. Following Step S251 or Step S252, the control goes to Step S253.

At Step S253, if the flag L has been set at L=1, the CPU 120 operates for calculating the average pattern of the external-line call signal based on the respective patterns of two cycles of the call signal stored in a first and a second signal-pattern memory 158, 160 of the RAM 122, and storing a code number stored in an input code-number memory 152 in a code-number memory area of the registered code-number table memory 606, and the calculated average pattern of the call signal in an external-line call-signal pattern memory area related with that code-number memory area. On the other hand, if the flag L has been set at L=0, the CPU 120 operates for calculating the average pattern of the extension-line call signal in the same manner as described above, and storing the code number in the same manner. However, the CPU 120 stores the calculated aver- age pattern of the extension-line call signal in an extension-line call-signal pattern memory area related with the code-number memory area. A code-number memory area is related with an external-line and an extension-line call-signal pattern memory area each of which is related via a memory pointer with a registered-code-number related memory 144a of a code-number related memory 144 of the RAM 122. At Step S253, the input code-number memory 152 is cleared and the flag L is reset to L=0.

Thus, the T/F apparatus 600 can register two or more own external- or extension-line call signals corresponding to two or more own external- or extension-line call numbers (i.e., telephone numbers) for the telephone set thereof, and/or two or more own external- or extension-line call signals corresponding to two or more own external- or extension-line call numbers (i.e., facsimile numbers) for the facsimile machine thereof. The T/F apparatus 600 functions as if a plurality of telephone sets and/or a plurality of facsimile machines were used, with respect to one or both of (a) the external communication apparatuses and (b) the internal communication apparatuses.

Additionally, the user can store, in different answering message memories 172 of different memories 144a, different answering messages for an external-line and an extension-line call number both related with a common code number corresponding to the memories 144a. Two different memories 144a for an external-line and an extension-line call number both related with a common code number, may be specified by the user by inputting, in addition to the common code number, different numbers respectively, through operation of an operator panel 98. Thus, the T/F apparatus 600 may operate in different manners corresponding to the respective contents of the two different memories 144a, when the apparatus 600 is called using the external-line call number by an external communication apparatus and when being called using the extension-line call number by an internal communication apparatus, respectively. Similarly, the apparatus 600 may operate in different manners corresponding to the respective contents of the two different memories 144a, when the apparatus 600 calls an external communication apparatus and when calling an internal communication apparatus, respectively.

In the T/F apparatus 600, an external-line and an extension-line call-signal pattern memory for a registered common code number are related with different memories 144a of the RAM 122, respectively. However, the two call-signal pattern memories for each registered code number may be related with a common memory 144a of the RAM 122. In the latter case, the T/F apparatus 600 operates in an identical manner corresponding to each registered code number, whether when the apparatus 600 is called using the external-line call number by an external communication apparatus or when being called using the extension-line call number by an internal communication apparatus. Similarly, the apparatus 600 operates in an identical manner corresponding to a code number input by the user, whether when the apparatus 600 calls an external communication apparatus or when calling an internal communication apparatus.

It is to be understood that the principles of the present invention may not be limited to telephone sets, facsimile machines, or telephone and facsimile (T/F) apparatuses, but may be applied to other sorts of communication apparatuses or systems such as wireless communication apparatuses.

It is to be understood that the present invention may be embodied with other changes, improvements, and modifications that may occur to those skilled in the art without departing from the scope and spirit of the invention defined in the appended claims.

What is claimed is:

1. A communication system comprising:

a communication apparatus;

a first exchanger which is connected, via a single communication line, to said communication apparatus, said first exchanger connecting said communication apparatus with a first group of other communication apparatuses to which different first call numbers are allotted according to a first numbering rule; and a second exchanger which is provided in said single communication line between said communication apparatus and said first exchanger, said second exchanger connecting said communication apparatus with a second group of other communication apparatuses to which different second call numbers are allotted according to a second numbering rule different from said first numbering rule, said communication apparatus comprising a data obtaining device which obtains a plurality of sets of first own-call-number data each set of which identifies a corresponding one of a plurality of different first own call numbers allotted to the communication apparatus according to said first numbering rule, each of said first own call numbers identifying the communication apparatus from said first group of other communication apparatuses to which said different first call numbers other than said first own call numbers are allotted according to said first numbering rule, said data obtaining device obtaining a plurality of sets of second own-call-number data each set of which identifies a corresponding one of a plurality of different second own call numbers allotted to the communication apparatus according to said second numbering rule, each of said second own call numbers identifying the communication apparatus from said second group of other communication apparatuses to which said different second call numbers other than said second own call numbers are allotted according to said second numbering rule, said communication apparatus further comprising at least one of (a) an information receiver which can receive information from said first and second groups of other communication apparatuses and (b) an information transmitter which can transmit information to said first and second groups of other communication apparatuses, said at least one of said information receiver and said information transmitter being operable in each of a plurality of different manners, said communication apparatus further comprising a plurality of memories related with said plurality of different manners, respectively, and at least one of (a) said information receiver receiving a batch of information from one communication apparatus of said first and second groups of other communication apparatuses and storing the received batch of information in one of said memories which corresponds to one of said first and second own call numbers identified by one of said sets of first and second own-call-number data obtained by said data obtaining device from said one communication apparatus via said single communication line, and (b) said information transmitter transmitting to one communication apparatus of said first and second groups of other communication apparatuses, a batch of information stored in one of said memories which corresponds to one of said first and second own call numbers identified by one of said sets of first and second own-call-number data obtained by said data obtaining device.

2. A communication system according to claim 1, wherein said data obtaining device comprises a signal detector which detects, as at least one of said sets of first own-call-number data and said sets of second own-call-number data, at least one of (a) a plurality of different first own call signals which are supplied thereto from said first exchanger via said single communication line and (b) a plurality of different second own call signals which are supplied thereto from said second exchanger via said single communication line, said different first own call signals identifying said different first own call numbers, respectively, said different second own call signals identifying said different second own call numbers, respectively, said first exchanger supplying, to said signal detector of said communication apparatus via said single communication line, one of said different first own call signals which corresponds to one of said different first own call numbers which is input by a user of each of said other communication apparatuses of said first group to call said communication apparatus, said second exchanger supplying, to said signal detector of said communication apparatus via said single communication line, one of said different second own call signals which corresponds to one of said different second own call numbers which is input by a user of each of said other communication apparatuses of said second group to call said communication apparatus.

3. A communication system according to claim 2, further comprising a memory which stores said at least one of said first and second own call signals detected by said signal detector.

4. A communication system according to claim 3, wherein said signal detector detects a call signal transmitted to the communication apparatus, said data obtaining device further comprising selecting means for selecting one of said first and second own call numbers which is identified by said call signal detected by said signal detector, based on said at least one of said first and second own call signals stored in said memory, said at least one of said information receiver and transmitter operating in one of said different manners which corresponds to the selected one own call number.

5. A communication system according to claim 1, wherein said communication apparatus comprises a telephone set as said at least one of said information receiver and transmitter, said different first own call numbers allotted to said communication apparatus according to said first numbering rule comprising a plurality of different first own telephone numbers allotted to said telephone set according to said first numbering rule, said different second own call numbers allotted to said communication apparatus according to said second numbering rule comprising a plurality of different second own telephone numbers allotted to said telephone set according to said second numbering rule.

6. A communication system according to claim 1, wherein said communication apparatus comprises a facsimile machine as said at least one of said information receiver and transmitter, said different first own call numbers allotted to said communication apparatus according to said first numbering rule comprising a plurality of different first own facsimile numbers allotted to said facsimile machine according to said first numbering rule, said different second own call numbers allotted to said communication apparatus according to said second numbering rule comprising a plurality of different second own facsimile numbers allotted to said facsimile machine according to said second numbering rule.

7. A communication system according to claim 1, wherein said communication apparatus comprises a telephone set and a facsimile machine as said at least one of said information receiver and transmitter, said different first own call numbers allotted to said communication apparatus according to said first numbering rule comprising at least one first own telephone number allotted to said telephone set according to said first numbering rule and at least one first own facsimile number allotted to said facsimile machine according to said first numbering rule and different from said at least one first own telephone number allotted to said telephone set, said different second own call numbers allotted to said communication apparatus according to said second numbering rule comprising at least one second own telephone number allotted to said telephone set according to said second numbering rule and at least one second own facsimile number allotted to said facsimile machine according to said second numbering rule and different from said at least one second own telephone number allotted to said telephone set.

8. A communication system according to claim 5, wherein said telephone set operates in a first one of said different manners which corresponds to each of (a) a first one of the different first own telephone numbers allotted to said telephone set according to said first numbering rule and (b) a first one of the different second own telephone numbers allotted to the telephone set according to said second numbering rule, and operates in a second one of said different manners which corresponds to each of (a) a second one of the different first own telephone numbers allotted to the telephone set according to said first numbering rule and (b) a second one of the different second own telephone numbers allotted to the telephone set according to said second numbering rule.

9. A communication system according to claim 6, wherein said facsimile machine operates in a first one of said different manners which corresponds to each of (a) a first one of the different first own facsimile numbers allotted to said facsimile machine according to said first numbering rule and (b) a first one of the different second own facsimile numbers allotted to the facsimile machine according to said second numbering rule, and operates in a second one of said different manners which corresponds to each of (a) a second one of the different first own facsimile numbers allotted to the facsimile machine according to said first numbering rule and (b) a second one of the different second own facsimile numbers allotted to the facsimile machine according to said second numbering rule.

10. A communication apparatus according to claim 1, wherein said second exchanger receives, as each of said sets of first own-call-number data supplied from said first exchanger via said single communication line, each of a plurality of first call signals respectively corresponding to said different first call numbers allotted to said communication apparatus according to said first numbering rule, and transmits said each first call signal to said communication apparatus, without adding any signal to said each first call signal, said second exchanger receiving, as each of said sets of second own-call-number data, each of a plurality of second call signals respectively corresponding to said different second own call numbers allotted to said communication apparatus according to said second numbering rule, and transmitting said each second call signal to said communication apparatus, with a signal indicating that said each second call signal is different from said first call signals.

11. A communication system according to claim 1, wherein said at least one of said information receiver and said information transmitter is operable in said each of said different manners at least two manners of which correspond to at least two numbers of said first own call numbers, respectively, and correspond to at least two numbers of said second own call numbers, respectively.

12. A communication system according to claim 1, wherein said at least one of said information receiver and said information transmitter is operable in said each of said different manners at least two first manners of which correspond to at least two numbers of said first own call numbers, respectively, and at least two second manners of which correspond to at least two numbers of said second own call numbers, respectively.

13. A communication system according to claim 1, wherein said data obtaining device comprises a data input device which is operable by a user for inputting at least one of said sets of first own-call-number data and said sets of second own-call-number data, so that said at least one of said information receiver and said information transmitter operates in one of said different manners which corresponds to one of said first and second own call numbers which is identified by said one set of own-call-number data input by said data input device.

14. A communication system according to claim 13, comprising said information receiver, wherein said communication apparatus further comprises an information reading device which reads the batch of information stored by said information receiver in said one memory which corresponds to said one own call number identified by said one set of own-call-number data input by said data input device.

15. A communication system according to claim 13, comprising said information transmitter, wherein said information transmitter transmits, to said one communication apparatus of said first and second groups of other communication apparatuses, the batch of information stored in said one memory which corresponds to said one own call number identified by said one set of own-call-number data input by said data input device.

16. A communication system according to claim 1, comprising said information transmitter, wherein said information transmitter transmits, to said one communication apparatus of said first and second groups of other communication apparatuses, the batch of information stored in said one memory which corresponds to said one own call number identified by said one set of own-call-number data obtained by said data obtaining device from said one communication apparatus via said single communication line.

17. A communication system according to claim 1, further comprising a data memory which stores said at least one set of own-call-number data input by said data input device.

18. A communication system according to claim 17, wherein said data input device is operable by said user for inputting a set of call-number data identifying a call number, said data obtaining device further comprising selecting means for selecting one of said first and second own call numbers which is identified by said set of call-number data input by said data input device, based on said at least one set of own-call-number data stored in said data memory, said at least one of said information receiver and transmitter operating in one of said different manners which corresponds to the selected one own call number.

19. A telephone system comprising:
   a telephone set;
   a first exchanger which is connected, via a single communication line, to said telephone set, said first exchanger connecting said telephone set with a first group of other telephone sets to which different first telephone numbers are allotted according to a first numbering rule; and a second exchanger which is provided in said single communication line between said telephone set and said first exchanger, said second exchanger connecting said telephone set with a second group of other telephone sets to which different second telephone numbers are allotted according to a second numbering rule different from said first numbering rule, said telephone set comprising a data obtaining device which obtains a plurality of sets of first own-telephone-number data each set of which identifies a corresponding one of a plurality of different first own telephone numbers allotted to the telephone set according to said first numbering rule, each of said first own telephone numbers identifying the telephone set from said first group of other telephone sets to which said different first telephone numbers other than said first own telephone numbers are allotted according to said first numbering rule, said data obtaining device obtaining a plurality of sets of second own-telephone-number data each set of which identifies a corresponding one of a plurality of different second own telephone numbers allotted to the telephone set according to said second numbering rule, each of said second own telephone numbers identifying the telephone set from said second group of other telephone sets to which said different second telephone numbers other than said second own telephone numbers are allotted according to said second numbering rule, said telephone set further comprising at least one of (a) an information receiver which can receive information from said first and second groups of other telephone sets and (b) an information transmitter which can transmit information to said first and second groups of other telephone sets, said at least one of said information receiver and said information transmitter being operable in each of a plurality of different manners, said telephone set further comprising a plurality of memories related with said plurality of different manners, respectively, and at least one of (a) said information receiver receiving a batch of information from one telephone set of said first and second groups of other telephone sets and storing the received batch of information in one of said memories which corresponds to one of said first and second own telephone numbers identified by one of said sets of first and second own-telephone-number data obtained by said data obtaining device from said one telephone set via said single communication line, and (b) said information transmitter transmitting, to one telephone set of said first and second groups of other telephone sets, a batch of information stored in one of said memories which corresponds to one of said first and second own telephone numbers identified by one of said sets of first and second own-telephone-number data obtained by said data obtaining device, wherein said at least one of said information receiver and said information transmitter is operable in said each of said different manners at least two manners of which correspond to at least two numbers of said first own telephone numbers, respectively, and correspond to at least two numbers of said second own telephone numbers, respectively.

20. A telephone system comprising:

a telephone set;

a first exchanger which is connected, via a single communication line, to said telephone set, said first exchanger connecting said telephone set with a first group of other telephone sets to which different first telephone numbers are allotted according to a first numbering rule; and a second exchanger which is provided in said single communication line between said telephone set and said first exchanger, said second exchanger connecting said telephone set with a second group of other telephone sets to which different second telephone numbers are allotted according to a second numbering rule different from said first numbering rule, said telephone set comprising a data obtaining device which obtains a plurality of sets of first own-telephone-number data each set of which identifies a corresponding one of a plurality of different first own telephone numbers allotted to the telephone set according to said first numbering rule, each of said first own telephone numbers identifying the telephone set from said first group of other telephone sets to which said different first telephone numbers other than said first own telephone numbers are allotted according to said first numbering rule, said data obtaining device obtaining a plurality of sets of second own-telephone-number data each set of which identifies a corresponding one of a plurality of different second own telephone numbers allotted to the telephone set according to said second numbering rule, each of said second own telephone numbers identifying the telephone set from said second group of other telephone sets to which said different second telephone numbers other than said second own telephone numbers are allotted according to said second numbering rule, said telephone set further comprising at least one of (a) an information receiver which can receive information from said first and second groups of other telephone sets and (b) an information transmitter which can transmit information to said first and second groups of other telephone sets, said at least one of said information receiver and said information transmitter being operable in each of a plurality of different manners, said telephone set further comprising a plurality of memories related with said plurality of different manners, respectively, and at least one of (a) said information receiver receiving a batch of information from one telephone set of said first and second groups of other telephone sets and storing the received batch of information in one of said memories which corresponds to one of said first and second own telephone numbers identified by one of said sets of first and second own-telephone-number data obtained by said data obtaining device from said one telephone set via said single communication line, and (b) said information transmitter transmitting, to one telephone set of said first and second groups of other telephone sets, a batch of information stored in one of said memories which corresponds to one of said first and second own telephone numbers identified by one of said sets of first and second own-telephone-number data obtained by said data obtaining device, wherein said at least one of said information receiver and said information transmitter is operable in said each of said different manners at least two first manners of which correspond to at least two numbers of said first own telephone numbers, respectively, and at least two second manners of which correspond to at least two numbers of said second own telephone numbers, respectively.

21. A facsimile system comprising:

a facsimile machine;

a first exchanger which is connected, via a single communication line, to said facsimile machine, said first exchanger connecting said facsimile machine with a first group of other facsimile machines to which different first facsimile numbers are allotted according to a first numbering rule; and a second exchanger which is provided in said single communication line between said facsimile machine and said first exchanger, said second exchanger connecting said facsimile machine with a second group of other facsimile machines to which different second facsimile numbers are allotted according to a second numbering rule different from said first numbering rule, said facsimile machine comprising a data obtaining device which obtains a plurality of sets of first own-facsimile-number data each set of which identifies a corresponding one of a plurality of different first own facsimile numbers allotted to the facsimile machine according to said first numbering rule, each of said first own facsimile numbers identifying the facsimile machine from said first group of other facsimile machines to which said different first facsimile numbers other than said first own facsimile numbers are allotted according to said first numbering rule, said data obtaining device obtaining a plurality of sets of second own-facsimile-number data each set of which identifies a corresponding one of a plurality of different second own facsimile numbers allotted to the facsimile machine according to said second numbering rule, each of said second own facsimile numbers identifying the facsimile machine from said second group of other facsimile machines to which said different second facsimile numbers other than said second own facsimile numbers are allotted according to said second numbering rule, said facsimile machine further comprising at least one of (a) an information receiver which can receive information from said first and second groups of other facsimile machines and (b) an information transmitter which can transmit information to said first and second groups of other facsimile machines, said at least one of said information receiver and said information transmitter being operable in each of a plurality of different manners, said facsimile machine further comprising a plurality of memories related with said plurality of different manners, respectively, and at least one of (a) said information receiver receiving a batch of information from one facsimile machine of said first and second groups of other facsimile machines and storing the received batch of information in one of said memories which corresponds to one of said first and second own facsimile numbers identified by one of said sets of first and second own-facsimile-number data obtained by said data obtaining device from said one facsimile machine via said single communication line, and (b) said information transmitter transmitting, to one facsimile machine of said first and second groups of other facsimile machines, a batch of information stored in one of said memories which corresponds to one of said first and second own facsimile numbers identified by one of said sets of first and second own-facsimile-number data obtained by said data obtaining device, wherein said at least one of said information receiver and said information transmitter is operable in said each of said different manners at least two manners of which correspond to at least two numbers of said first own facsimile numbers, respectively, and correspond to at least two numbers of said second own facsimile numbers, respectively.

22. A facsimile system comprising:

a facsimile machine;

a first exchanger which is connected, via a single communication line, to said facsimile machine, said first exchanger connecting said facsimile machine with a first group of other facsimile machines to which different first facsimile numbers are allotted according to a first numbering rule; and a second exchanger which is provided in said single communication line between said facsimile machine and said first exchanger, said second exchanger connecting said facsimile machine with a second group of other facsimile machines to which different second facsimile numbers are allotted according to a second numbering rule different from said first numbering rule, said facsimile machine comprising a data obtaining device which obtains a plurality of sets of first own-facsimile-number data each set of which identifies a corresponding one of a plurality of different first own facsimile numbers allotted to the facsimile machine according to said first numbering rule, each of said first own facsimile numbers identifying the facsimile machine from said first group of other facsimile machines to which said different first facsimile numbers other than said first own facsimile numbers are allotted according to said first numbering rule, said data obtaining device obtaining a plurality of sets of second own-facsimile-number data each set of which identifies a corresponding one of a plurality of different second own facsimile numbers allotted to the facsimile machine according to said second numbering rule, each of said second own facsimile numbers identifying the facsimile machine from said second group of other facsimile machines t o which said different second facsimile numbers other than said second own facsimile numbers are allotted according to said second numbering rule, said facsimile machine further comprising at least one of (a) an information receiver which can receive information from said first and second groups of other facsimile machines and (b) an information transmitter which can transmit information to said first and second groups of other facsimile machines, said at least one of said information receiver and said information transmitter being operable in each of a plurality of different manners, said facsimile machine further comprising a plurality of memories related with said plurality of different manners, respectively, and at least one of (a) said information receiver receiving a batch of information from one facsimile machine of said first and second groups of other facsimile machines and storing the received batch of information in one of said memories which corresponds to one of said first and second own facsimile numbers identified by one of said sets of first and second own-facsimile-number data obtained by said data obtaining device from said one facsimile machine via said single communication line, and (b) said information transmitter transmitting, to one facsimile machine of said first and second groups of other facsimile machines, a batch of information stored in one of said memories which corresponds to one of said first and second own facsimile numbers identified by one of said sets of first and second own-facsimile-number data obtained by said data obtaining device, wherein said at least one of said information receiver and said information transmitter is operable in said each of said different manners at least two first manners of which correspond to at least two numbers of said first own facsimile numbers, respectively, and at least two second manners of which correspond to at least two numbers of said second own facsimile numbers, respectively.

* * * * *